(12) United States Patent
Oh et al.

(10) Patent No.: US 7,702,233 B2
(45) Date of Patent: Apr. 20, 2010

(54) IMAGE PHOTOGRAPHING APPARATUS

(75) Inventors: Hyeong-Ryeol Oh, Seoul (KR);
He-Won Jung, Kyeonggi-do (KR)

(73) Assignee: Hysonic Co., Ltd., Kyeonggi-Do (KR)

( * ) Notice: Subject to any disclaimer, the term of this patent is extended or adjusted under 35 U.S.C. 154(b) by 697 days.

(21) Appl. No.: 10/596,591

(22) PCT Filed: Dec. 20, 2004

(86) PCT No.: PCT/KR2004/003364

§ 371 (c)(1),
(2), (4) Date: Jun. 16, 2006

(87) PCT Pub. No.: WO2005/060242

PCT Pub. Date: Jun. 30, 2005

(65) Prior Publication Data

US 2007/0154198 A1    Jul. 5, 2007

(30) Foreign Application Priority Data

| Dec. 19, 2003 | (KR) | 10-2003-0093980 |
| Mar. 26, 2004 | (KR) | 10-2004-0020818 |
| Apr. 16, 2004 | (KR) | 10-2004-0026082 |
| Apr. 16, 2004 | (KR) | 10-2004-0026083 |
| Apr. 16, 2004 | (KR) | 10-2004-0026084 |
| Jun. 9, 2004 | (KR) | 10-2004-0042166 |
| Jun. 16, 2004 | (KR) | 10-2004-0044459 |
| Jul. 1, 2004 | (KR) | 10-2004-0051123 |
| Aug. 11, 2004 | (KR) | 10-2004-0063158 |
| Aug. 19, 2004 | (KR) | 10-2004-0065453 |
| Dec. 10, 2004 | (KR) | 10-2004-0104065 |

(51) Int. Cl.
*G03B 13/34* (2006.01)
(52) U.S. Cl. .......................... 396/133; 396/75; 359/824
(58) Field of Classification Search .................. 396/85, 396/133, 73, 75, 130, 471, 493, 494; 359/824
See application file for complete search history.

(56) References Cited

U.S. PATENT DOCUMENTS

| 4,359,276 | A | * | 11/1982 | Tomori | 396/80 |
| 4,596,449 | A | * | 6/1986 | Iwata et al. | 359/696 |
| 4,623,233 | A | * | 11/1986 | Yamada et al. | 396/464 |
| 5,140,468 | A | * | 8/1992 | Kayanuma | 359/699 |
| 5,724,194 | A | * | 3/1998 | Ishikawa | 359/696 |
| 5,907,724 | A | * | 5/1999 | Uno et al. | 396/82 |
| 5,978,161 | A | | 11/1999 | Lemke | |
| 6,175,291 | B1 | * | 1/2001 | Kleinert et al. | 335/251 |

(Continued)

FOREIGN PATENT DOCUMENTS

JP    62180337 A    8/1987

(Continued)

*Primary Examiner*—Melissa J Koval
*Assistant Examiner*—Linda B Smith
(74) *Attorney, Agent, or Firm*—K&L Gates LLP

(57) ABSTRACT

An image photographing apparatus for automatically focusing a photographed image to improve the image quality. The image photographing apparatus automatically focuses the image through a zoom actuator for changing a zoom ratio and a focus actuator for controlling the focus to thereby enhance the image quality. Also, the image photographing apparatus adds a zooming function to diversify the application fields of image photographing.

75 Claims, 46 Drawing Sheets

U.S. PATENT DOCUMENTS

| | | | |
|---|---|---|---|
| 6,253,005 B1 * | 6/2001 | Bergmann et al. | 385/33 |
| 6,356,307 B2 * | 3/2002 | Ohkawara et al. | 348/360 |
| 6,456,444 B1 * | 9/2002 | Yumiki et al. | 359/696 |
| 6,819,500 B2 * | 11/2004 | Tsuzuki | 359/696 |
| 6,826,769 B2 * | 11/2004 | Hirokane et al. | 720/688 |

FOREIGN PATENT DOCUMENTS

| | | |
|---|---|---|
| JP | 2004077968 A | 3/2004 |
| KR | 20000044156 A | 7/2000 |
| WO | WO0045209 A1 | 8/2000 |

\* cited by examiner

THE OBJECT DOESNOT MOVE

THE OBJECT MOVES

IMAGE PHOTOGRAPHING APPARATUS

PRIORITY CLAIM

This application is a national stage application of International Application No. PCT/KR2004/003364, filed on Dec. 20, 2004 which claims priority to, and the benefit of, the following applications: Korean Patent Application Serial No. 10-2004-01014065, filed Dec. 10, 2004; Korean Patent Application Serial No. 10-2004-0065453 filed Aug. 19, 2004; Korean Patent Application Serial No. 10-2004-0063158, filed Aug. 11, 2004; Korean Patent Application Serial No. 10-2004-0051123, filed Jul. 1, 2004; Korean Patent Application No. 10-2004-0044459, filed Jun. 16, 2004; Korean Patent Application No. 10-2004-0042166, filed Jun. 9, 2004; Korean Patent Application No. 10-2004-0026084, filed Apr. 16, 2004; Korean Patent Application No. 10-2004-0026083, filed Apr. 16, 2004; Korean Patent Application No. 10-10-2004-0026082, filed Apr. 16, 2004; 10-2004-0020818, filed Mar. 26, 2004; and Korean Patent Application No. 10-2003-0093980, filed Dec. 19, 2003.

BACKGROUND OF THE INVENTION

The present invention relates to an image photographing apparatus, particularly to an image photographing apparatus having a simple and small structure mounted on a communication terminal.

FIG. 1 is a block diagram explaining the constitution of the conventional image photographing apparatus. As shown in FIG. 1, a mobile phone 100 comprises: a main frame 101; buttons 102 for operating the mobile phone, a screen 103 for displaying telephone numbers or images, and a camera module 104 for photographing images. The interior constitution of the camera module 104 is shown in FIG. 2. That is, the camera module 104 comprises a module case 201, a photographing element 203, a second lens group 206, and a third lens group 207. FIG. 3 is a view separating a photographing optical system 300, which comprises a moiré interference prevention filter 202, the first lens group 205, the second lens group 206 and the third lens group 207, from the camera module 200 to explain the function thereof. The photographing optical system 300 photographs an image of an object positioned on an object surface 301 on an image plane 303. Accordingly, the photographing element 203 is positioned on the image plane 303, and thus an object 302 on the object surface 301 is formed as an image 304 on the image surface 303.

As shown in FIG. 4 showing the conventional constitution, if an object 401 escapes from the object surface 301 and positions near the camera, the image of the object 401 is formed apart from the image surface 303. On the contrary, as shown in FIG. 5, if an object 501 escapes from the object surface 301 and positions far from the camera, the image 501 of the object escapes from the image plane and moves along the direction which is near the photographing optical system 300. As above, if the object escapes from the object surface initially set by the photographing optical system 300, the image of the object also escapes from the image plane 303. Thus, the photographed image is. out of focus and the quality of the photographed image becomes worse.

SUMMARY OF THE INVENTION

Thus, the object of the present invention is to provide an image photographing apparatus which can improve the quality of images by always focusing an image formed by a photographing element.

An image photographing apparatus according to the first view of the present invention to achieve the above object comprises:

a compensation lens group;

a f focusing driving part for fixing the compensation lens group;

a focus actuator transferring the focusing driving part to an optical axis for controlling the focus of the compensation lens group;

a fixing part for supporting the focus actuator;

a photographing element for photographing an image of an object passing the compensation lens group; and a controlling part for controlling the focus actuator and the photographing element, wherein the focus driving part comprises: a first lens barrel combined with the compensation lens group in its interior and forming a first male screw on its outer circumference; a second lens barrel combined with the focus actuator in its exterior and forming a first female screw, which is screw-combined with the first male screw on its inner circumference; and a tool groove installed on the first lens barrel to insert and rotate the tool.

Also, the focus actuator comprises:

a driving coil wound on one side of the focus driving part or the first zoom driving part to be fixed, and applied current from the controlling part; and a magnet fixed to the other side of the focus driving part or the first zoom driving part, wherein the polarity of the magnet is divided so that a magnetic flux passes over the flat part of the driving coil.

The focus actuator further comprises a restoration spring for restoring the focus driving part to the initial position.

A yoke is further installed between the magnet and the focus driving part to circulate the magnetic flux of the magnet.

Meanwhile, the focus actuator comprises:

a driving part for receiving a power source from the controlling part to generate a dynamic force moving along the direction orthogonal to the optical axis; and a cam part for receiving the dynamic force of the driving part to switch the dynamic force transferring the focus driving part in the direction of the optical axis, wherein the driving part comprises: a motor rotating by the power source supplied by the controlling part; a spur gear combined with a center shaft of the motor to be rotated; and a rotor forming a gear tooth combined with the spur gear and rotating by receiving the power source supplied by the controlling part. Also, it may comprise: a motor rotating by the power source supplied by the controlling part; a lead screw combined with a rotation shaft of the motor; and a screw holder combined with the lead screw to move along the direction orthogonal to the optical axis by rotation of the lead screw.

At this time, the cam part comprises an inclined surface formed on the driving part for ascending the focus driving part in the direction of the optical axis, wherein the focus driving part forming a prominence contacting to the inclined surface.

Also, the cam part further comprises a suspension member supported between the fixing part and the focus driving part to make the focus driving part movable in the direction of the optical axis and to guide the focus driving part to be driven in the direction of the optical axis.

The suspension member can be a plate spring or a wire spring, comprising an elastic transformed part transformed in the direction of the optical axis by narrowing the width between the fixing part and the focus driving part; a plurality of first holes; and first and second bosses inserted into a plurality of the first holes to fix the suspension member to the first zoom driving part and the focus driving part.

Meanwhile, the focus actuator comprising the suspension member comprises: a magnet fixed to the fixing part or the focus driving part; a driving coil fixed to the side of the fixing part or the focus driving part, where the magnet is not fixed, to be exposed to the magnetic field of the magnet, and, at the time of applying the current of the controlling part, wound to generate a force to drive the focus driving part in the direction of the optical axis by receiving the magnetic flux of the magnet; and a magnetic substance fixed to the side where the driving coil is fixed, and moving the focus driving part by force attracted to the magnetic force of the magnet to fix the focus driving part to a predetermined position.

Meanwhile, the focus actuator further comprises guide means for guiding the focus driving part to be driven in the direction of the optical axis, wherein an embodiment of the guide means comprises: a slide prominence formed on one side of the focus driving part in the direction of the optical axis; and a slide groove formed on the side where the slide prominence of the focus driving part is not formed for guiding the slide prominence to be moved in the direction of the optical axis.

Also, the other embodiment of the guide means may comprise a guide shaft slidably combined to a guide hole formed on the focus driving means, and may further comprise three or more guide parts formed on the fixing part in the direction of the optical axis to guide the outer circumferential surface of the focus driving part in the direction of the optical axis.

In addition, in order to remove a friction force between the guide shaft and the guide hole, the guide means comprises: a controlling signal generating part for generating a low frequency amplitude modulation control signal for preventing a friction force for an initial predetermined driving time of supplying current to the driving coil, and for generating a high frequency amplitude modulation control. signal after the initial predetermined driving time; and a pulse width modulation signal outputting part for outputting the low frequency amplitude modulation control signal generated by the controlling signal generating part and a pulse width modulating signal outputting part having a lower frequency section and a high frequency section which switch on/off according to the high frequency amplitude modulation control signal to drive the driving coil of the focus actuator.

Meanwhile, the focus actuator comprises a compensation driving part installed between the compensation lens group and the focus driving part to drive the compensation lens group; a compensating suspension member connected between the compensation driving part and the focus driving part to fix the compensation lens group to the focus driving part thereby become movable into the direction orthogonal to the. optical axis of the compensation lens group; a compensation actuator supported between the compensation driving part and the focus driving part to drive the compensation driving part in the direction orthogonal to the optical axis; a displacement sensor installed one side of the focus driving part for sensing the movement of the focus driving part in the direction orthogonal to the optical axis due to the hand trembling of the user; and a servo controller driving the compensating actuator according to the information of the displacement sensor to restore the focus driving part to the original state.

Herein, the compensating suspension member is a wire spring or a plate spring, and the compensation actuator comprises one of a voice coil motor, a piezoelectric element and a ultrasonic motor.

Meanwhile, the focus actuator further comprises an initial position fixing part for fixing the focus driving part to a preset initial position by a predetermined braking power, wherein the initial position fixing part comprises a first magnetic substance fixed to the side, where the magnet of the focus driving part is fixed, not to be exposed to the range of the magnetic line of force on the side, where the magnet of the focus driving part is not fixed, (within the range that the magnetic line of force of the magnet on the side, where the magnet of the focus driving part is not fixed, reaches), and attracts the magnet in order to fix the focus driving part to the initial position.

In addition, the focus actuator further comprises a specific magnification position fixing part for moving the focus driving part to a specific position so that the object image of the compensation lens group is projected with a specific magnification, wherein the specific magnification position comprises a second magnetic substance fixed to the side, where the magnet of the focus driving part is not fixed, not to be exposed to the range of the magnetic line of force, and attracts the magnet to fix the focus driving part to the initial position, in order to fix the focus driving part to a specific magnification position.

A technical problem to be solved according to the other view of the present invention comprises:
a compensation lens group;
a focus actuator for controlling the focusing of the compensation lens group;
a focus driving part transferred in the direction of an optical axis of the compensation lens group by the focus actuator;
a first zoom driving part for supporting the focus actuator;
a displacement lens group;
a second zoom driving part for supporting the displacement lens group;
a zoom actuator for driving the first zoom driving part to move the compensation lens group along a first moving trajectory, which is a zoom transition path, and driving the second zoom driving part to move the displacement lens group along a second moving trajectory, which is a path of a zoom transition path; and a controlling part for controlling the focus actuator, the zoom actuator and the photographing element.

Herein, the zoom actuator comprises: an actuation source; a first zoom driving member for driving the first zoom driving part to move a compensation lens group along a first moving trajectory, which is a zoom transition path; a second zoom driving member for receiving a dynamic force from the actuation source and driving the second zoom driving part to move the displacement lens group along a second moving trajectory, which is a zoom transition path; and restoration means for restoring the first zoom driving part and the second zoom driving part to the original state.

The actuation source comprises: a rotation driving part for generating a rotary force by control of the controlling part; and a rotor for receiving a dynamic force of the rotation driving part to be rotated. Also, the actuation source may comprises: a motor for receiving a power source from the controlling part to be rotated; a spur gear combined with a center shaft of the motor to be rotated; and a rotor forming a gear tooth combined with the spur gear. The actuation source may comprises: a motor for receiving a power source from the controlling part to be rotated; a lead screw combined with the rotation shaft of the motor; and a screw holder combined with the lead screw to move in the direction orthogonal to the optical axis by rotation of the lead screw.

Also, the zoom actuator comprises: an actuation source; a first zoom actuator for receiving a dynamic power from the actuation source and driving the first zoom actuation part to move a compensation lens group along with a first moving trajectory, which is a zoom transition path; and a second zoom actuator for receiving a dynamic power from the actuation source and driving the second zoom actuation part to move a displacement lens group along with a second moving trajectory, which is a zoom transition path.

The first zoom actuator comprises:

a first stator for receiving the power source from the controlling part and having a first coil for generating a magnetic field having first and second polarities which are divided into a plurality of sections and which are alternated; a first rotator having a first magnet having first and second polarities which are divided to be exposed to each divided magnetic field generated from the first coil, and performing a rotational motion at the time of applying the current to the first coil;

a first lens barrel for fixing the compensation lens group; and a first cam part for converting the rotational force of the first rotator to a feed force in the direction of the optical axis and transferring it to the first lens barrel.

Herein, the first stator comprises:

a first magnetic substance having a plurality of first cores respectively corresponding to the same first polarity divided from the first magnet;

a second magnetic substance having a plurality of second cores respectively corresponding to the same second polarity divided from the first magnet and respectively inserted into the first cores; and the first coil wound around the outer circumference of the first cores and the second cores while the second cores are combined between each first core.

The first rotator comprises:

a first magnet; and a first rotation barrel fixed by the first magnet and forming a first trajectory groove consistent with the first moving trajectory, which is the zoom transition path.

The first cam part comprises:

a first cam shaft fixed to the first lens barrel, and inserted into the first trajectory groove; and a first guide barrel forming a first slot for guiding the first cam shaft such that it only moves in the direction of the optical axis.

The second zoom actuator comprises:

a second stator for receiving a power source from the controlling part, and having a second coil for generating a magnetic field having first and second polarities which are divided into a plurality of sections and which are respectively alternated;

a second rotator having a second magnet in which first and second polarities are divided to be exposed to each divided magnetic field generated from the second coil, and performing a rotational motion at the time of applying current to the second coil;

a second lens barrel for fixing the compensation lens group; and a second came part for converting the rotational force of the first rotator to a feed force in the direction of the optical axis and transferring it to the second lens barrel.

The second stator comprises:

a third magnetic substance having a plurality of third cores respectively corresponding to the same first polarity divided from the second magnet;

a fourth magnetic substance having a plurality of fourth cores respectively corresponding to the same second polarity divided from the second magnet and respectively inserted into the third cores; and the second coil wound around the outer circumference of the third cores and the fourth cores while the fourth cores are combined between each third core.

Also, the second rotator comprises:

the second magnet; and a second rotation barrel fixed by the second magnet and forming a second trajectory groove consistent with the second moving trajectory, which is the zoom transition path.

The second cam part comprises:

a second cam shaft fixed to the second lens barrel and inserted into the first trajectory groove; and a second guide barrel forming a second slot for guiding the second cam shaft such that it only moves in the direction of the optical axis.

According to the preferable embodiment of the present invention, the quality of an image can be improved by always focusing the image automatically by using the zoom actuator which changes the zoom ratio and the focus actuator which controls the focus, and the applicable field of the image photographing can be more varied by adding the zoom function.

Additional features and advantages of the present invention are described in, and will be apparent from, the following Detailed Description of the Invention and the figures.

DETAILED DESCRIPTION OF THE INVENTION

Figure 1:
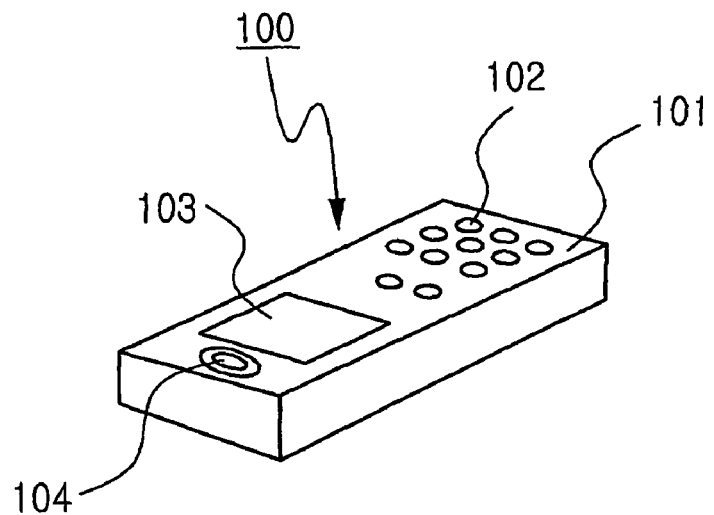
FIG. 1 is a block diagram of a mobile terminal having a general image photographing apparatus.
Figure 2:
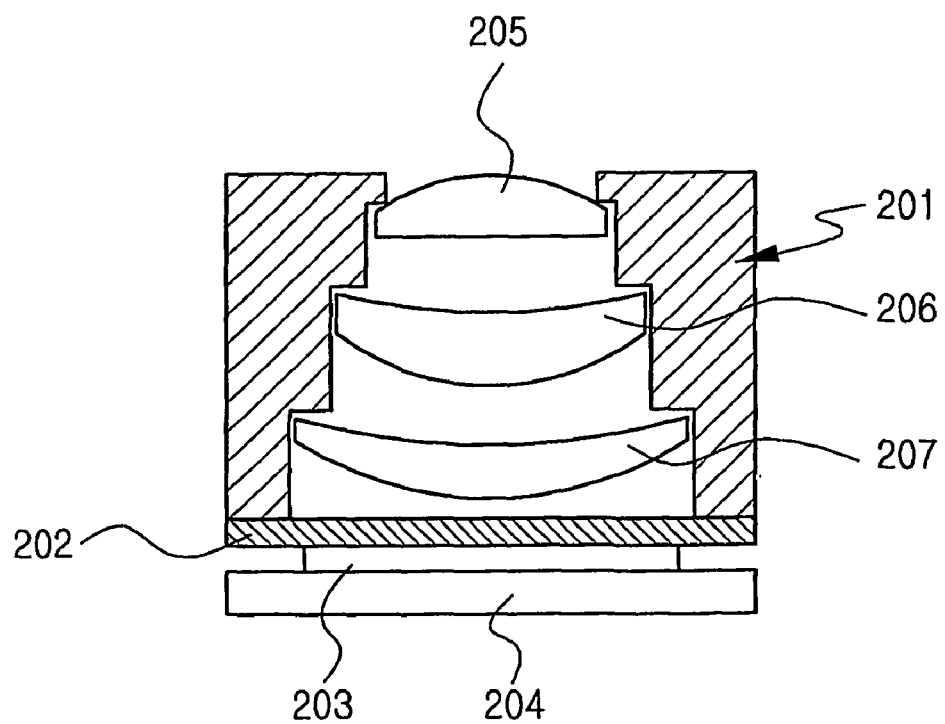
FIG. 2 is a block diagram of the image photographing apparatus in FIG. 1.
Figure 3:
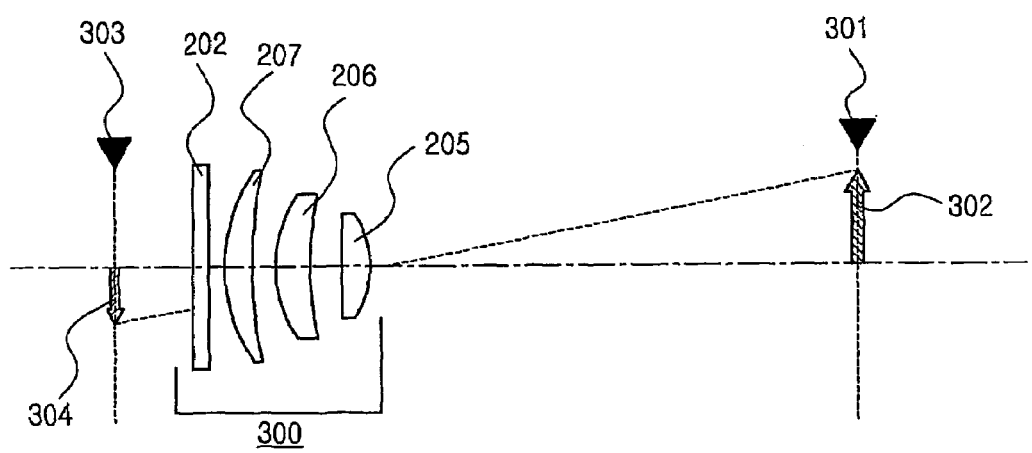
FIG. 3 is a view regarding FIG. 2 showing an object on an object plane which is in complete focus.

Hereinafter, the preferred embodiments of the present invention will be explained with reference to the accompanying drawings.

First Embodiment

FIGS. 6-9 are views showing the constitution of an image photographing apparatus according to the first embodiment of the present invention. Herein, the image photographing apparatus 600 according to the first embodiment of the present invention comprises:

a fixing lens group 605, 606 having an external lens barrel 601, a photographing element 602, a photographing element base 603, an ultraviolet protection filter 604 and a lens;

a compensation lens group 607 having one or more lenses;

a focus driving part 608 mounting the compensation lens group 607; and a guide shaft 609 guiding the transfer of the focus driving part 608.

In addition, a focus actuator 611 for moving the focus driving part 608 in the direction of an optical axis is installed between the focus driving part 608 and the external lens barrel 601. The focus actuator 611 further comprises a driving coil 703 for generating a driving force by flowing current installed outside of the focus driving part 608, a permanent magnet 702 and a yoke 701 increasing efficiency of the magnetic field generated by the permanent magnet 702.

Figure 6:
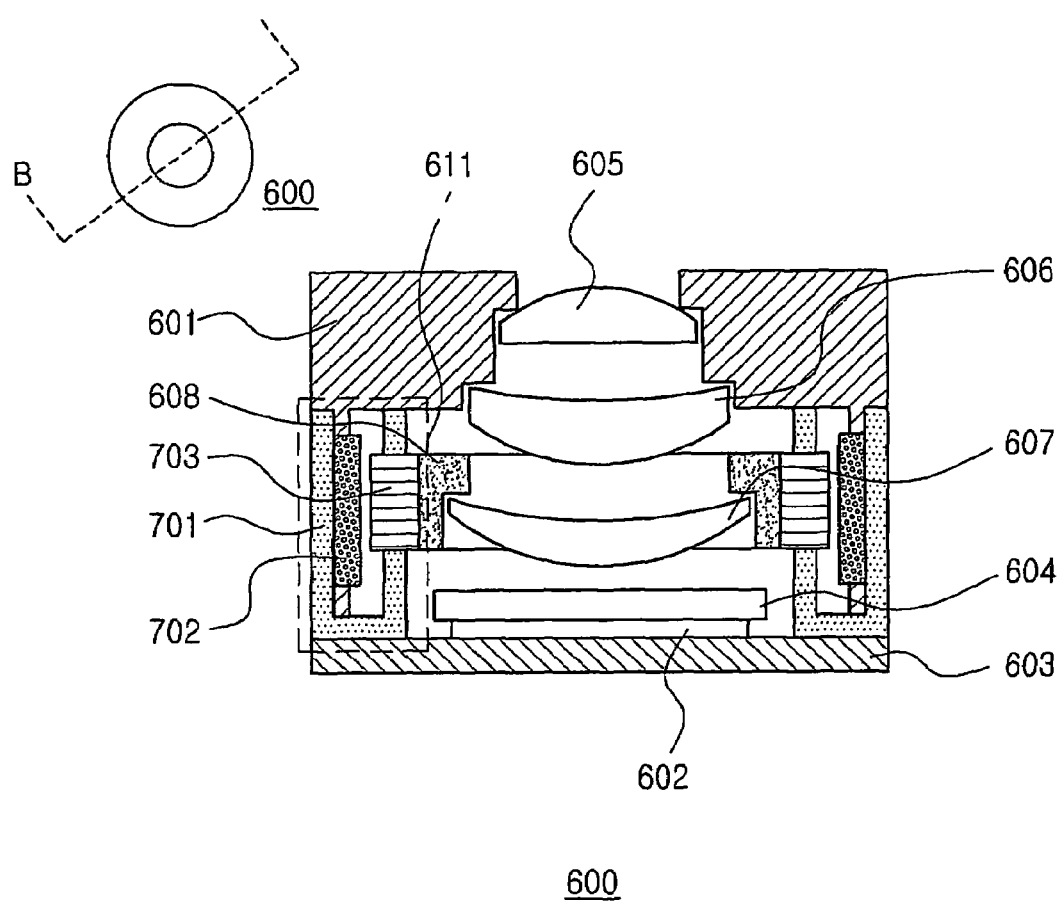
FIG. 6 .is a view showing the constitution of an image photographing apparatus according to the first embodiment of the present invention.
Figure 7:
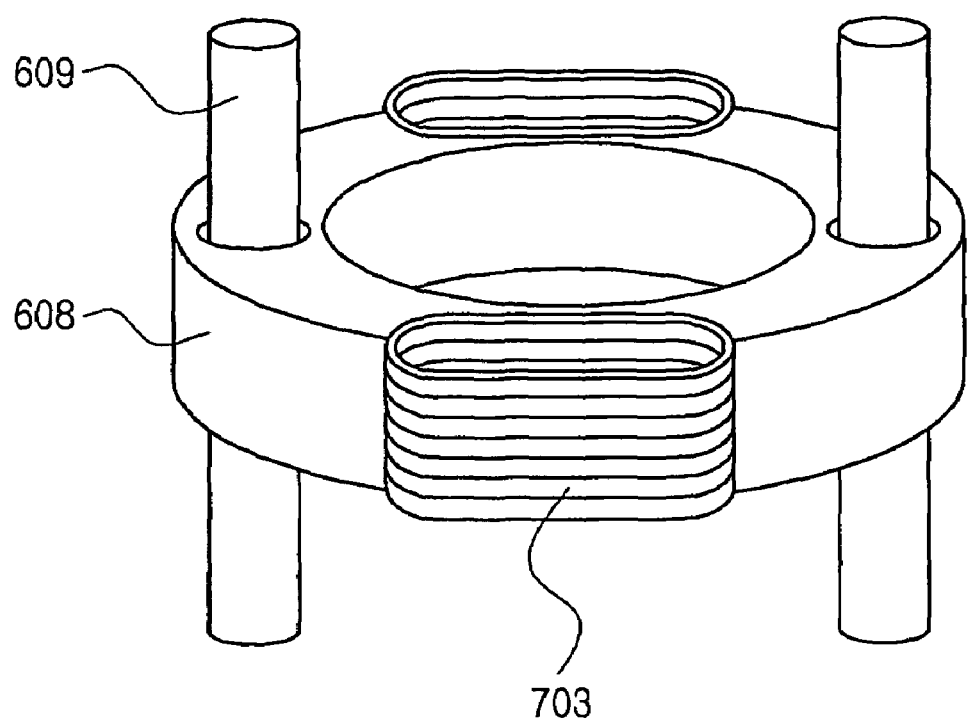
FIG. 7 is a three-dimensional view of a focus driving part of FIG. 6.

FIG. 7 is a view showing the constitution of the focus driving part 608 shown in FIG. 6 in detail. Herein, a symmetrically arranged guide shaft 609 penetrates into left and right sides of the driving part 608, and the driving coil 703 is symmetrically installed on the upper and the lower surfaces of the driving part 608.

The operation of a focus actuator 611 comprising the driving coil 703, the magnet 702 will be explained by referring to FIGS. 8 and 9. The permanent magnet 702 has N and S polarities polarized along its direction of thickness, and the permanent magnet 702 is mounted inside of one side of the yoke 701. The magnetic line of force 801 from the permanent magnet rotates along the yoke 701 to return to the magnet 702, thereby having a closed magnetic flux which does not lose the magnetic line of force to the outside. A conductive line 802 which can flow the current is installed in the permanent magnetic flux 702. If the current is flown from one end to the other end of the conductive line 802, by the cooperation of the current flowing the conductive line 802 with the line of magnetic force 801, the conductive line 802 receives a force in the direction vertical to the line of the magnetic force 801 and the conductive line 802, that is, a first direction 803 and a second direction 804. For example, if the current is flown from the end TA to the end TB, the conductive line receives a force of pushing in the first direction 803, and the current is flown in the opposite direction, the conductive line receives a force in the second direction 804. By the above operational principle, the size and the direction of the current flowing the conductive line are controlled, and thus the size and the direction of the force applied to the conductive line 802 are controlled.

Figure 8:
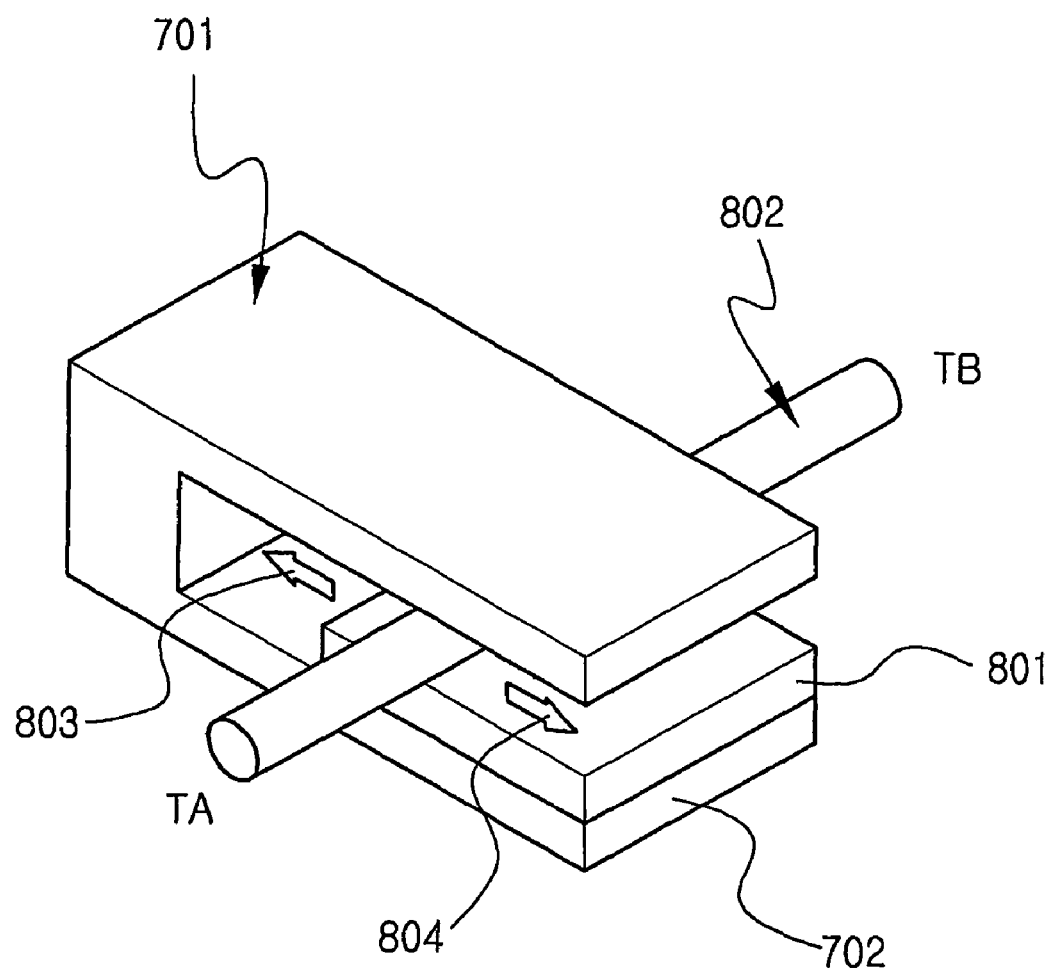
FIG. 8 is a view explaining the principle of generating a driving force by electromagnetic force of the focus actuator shown in FIG. 6.
Figure 9:
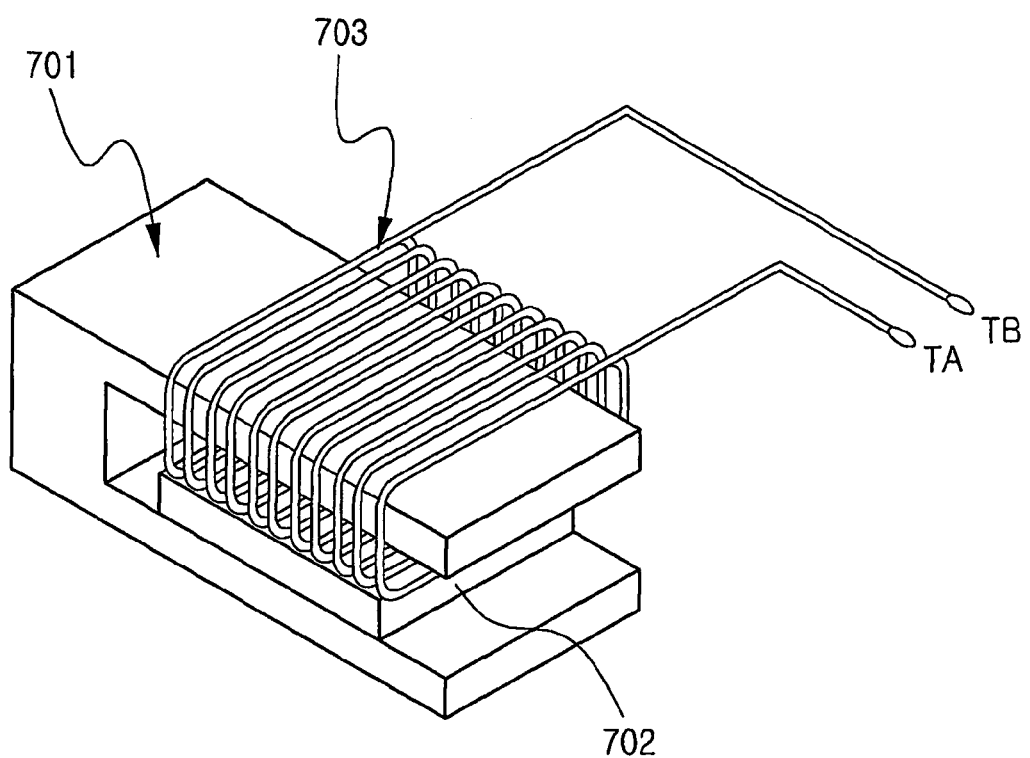
FIG. 9 is a block diagram of a coil, a permanent magnet and a yoke assembly applying the principle of generating the electromagnetic driving force of the focus actuator shown in FIG. 6.

FIG. 9 is a view showing the state that the driving coil 703 wound by conductive line to increase the generation of the driving force shown in FIG. 8 is installed in the magnet 702 and the yoke 701. By this constitution, the driving force generated in the driving coil 703 increases in proportion to the number of time of winding the driving coil 703, and the size and the direction applied to the driving coil 703 are controlled by controlling the size and the direction of the current flowing between the ends TA and TB of the driving coil 703.

The operation of the present invention using the principle of the electromagnetic force will be explained by referring to FIG. 6. According to the current applied to the driving coil 703 of the focus actuator 611 installed in the focus driving part 608, the driving coil 703 receives a force in the upper or lower direction according to the direction of the current, as shown in FIG. 6, and this force is transferred to the focus driving part 608. The motion of the first zoom driving part 608 is in constraint by the guide shaft in FIG. 7, and the focus driving part 608 moves to the upper or lower direction along the guide shaft. The moving direction of the focus driving part depends on the flowing direction of the current.

Figure 10:
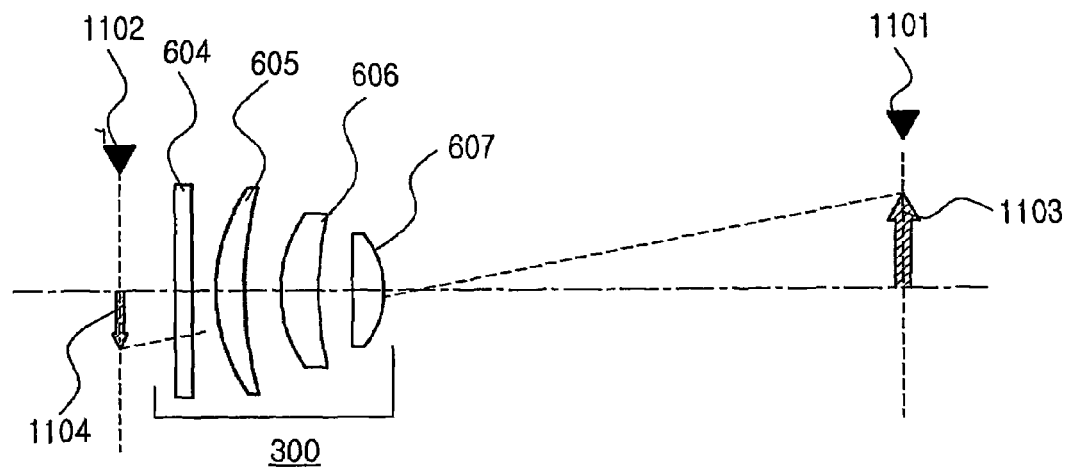
FIG. 10 is a block diagram showing the focus driving part shown in FIG. 6 in the initial position, and an object on an object plane in complete focus.
Figure 11:
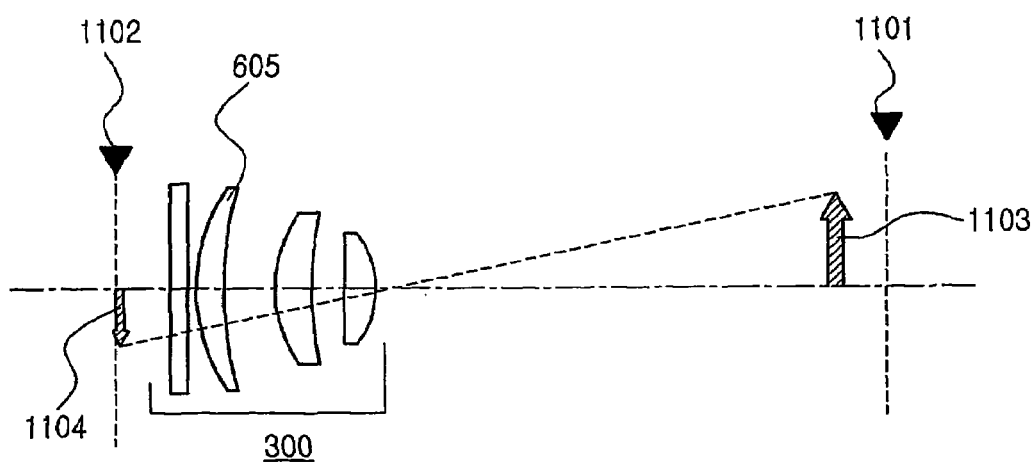
FIGS. 11 and 12 are views explaining the optical operation of the focus driving part shown in FIG. 6.
Figure 12:
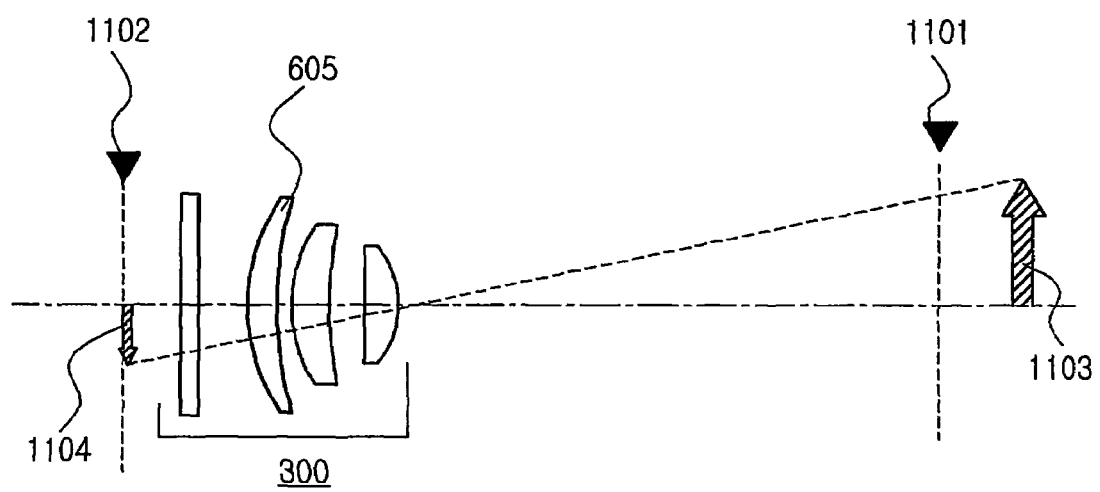

FIGS. 10-12 are views showing an optical effect according to the movement of the focus driving part 608. The compensation lens group 607 mounted on the focus driving part 608 can move to the left or right according to the direction of the current applied to the driving coil 703, as shown in FIG. 10. That is, as shown in FIG. 10, if the compensation lens group 607 is in the initial position, an image 1104 of an object 1103 positioned on a predetermined object plane 1101 is formed on an image plane 1102, which is solely determined by an optical system 300. Herein, the optical system 300 comprises the object plane 1101, the fixing lens group 605, 606, a compensation lens group and the ultraviolet protection filter 604. Thus, the photographing element 602 positions on the image plane 1102.

Figure 4:
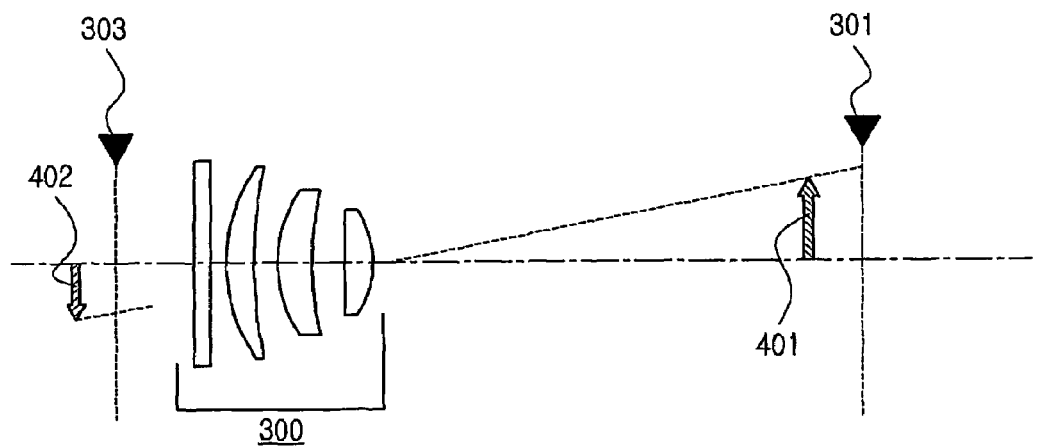
FIG. 4 is a view regarding FIG. 2 showing an object moved near from a camera moves to a camera.
Figure 5:
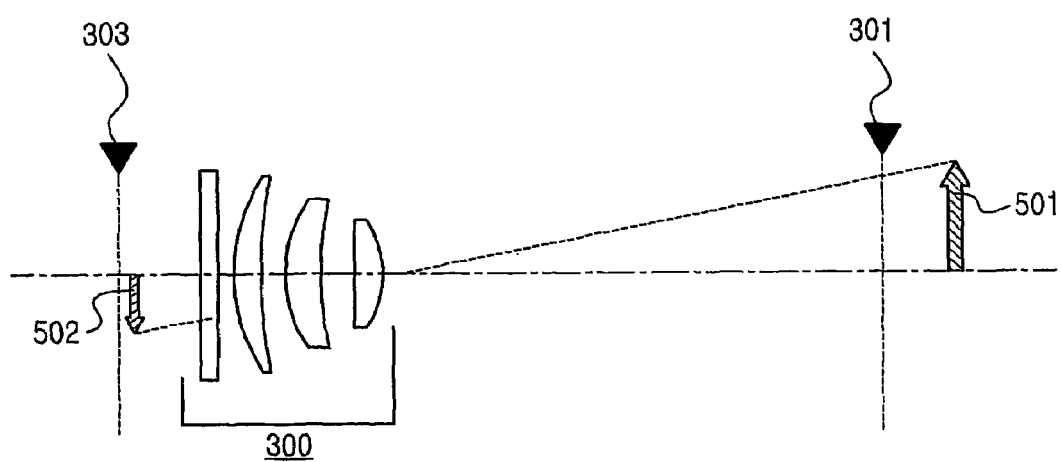
FIG. 5 is a view regarding FIG. 2 showing an object moved in the direction far from the camera.

FIG. 11 explains the optical operation if an object becomes adjacent from the object plane 1101 to the photographing lens group. If the object 1103 becomes adjacent from the object plane 1101 to the optical system 300, the image of the object 1101 Ls formed while escaping from the image plane 1102. by the principle of FIG. 4. However, by transferring the focus driving part 608 to move the compensation lens group 607, the image 1104 positions on the image plane 1102 again.

FIG. 12 explains the operation that if the object 1103 moves from the object plane 1101 in the direction apart from the optical system 300. In this case, if the image moves from the image plane 1102 to the direction which is near the optical system 1100, the compensation lens group 607 is transferred by the focus driving part 608, so that the image 1104 can be positioned on the image plane 1101 again. That is, the object 1103 escapes the object plane 1101, the image always positions on the image plane 1102 by the transfer of the compensation lens group 607 due to the transfer of the focus driving part 608. By the above operation, an image in complete focus is photographed on the photographing element 602 positioned on the image plane 1102 regardless of the position of the object.

Figure 13:
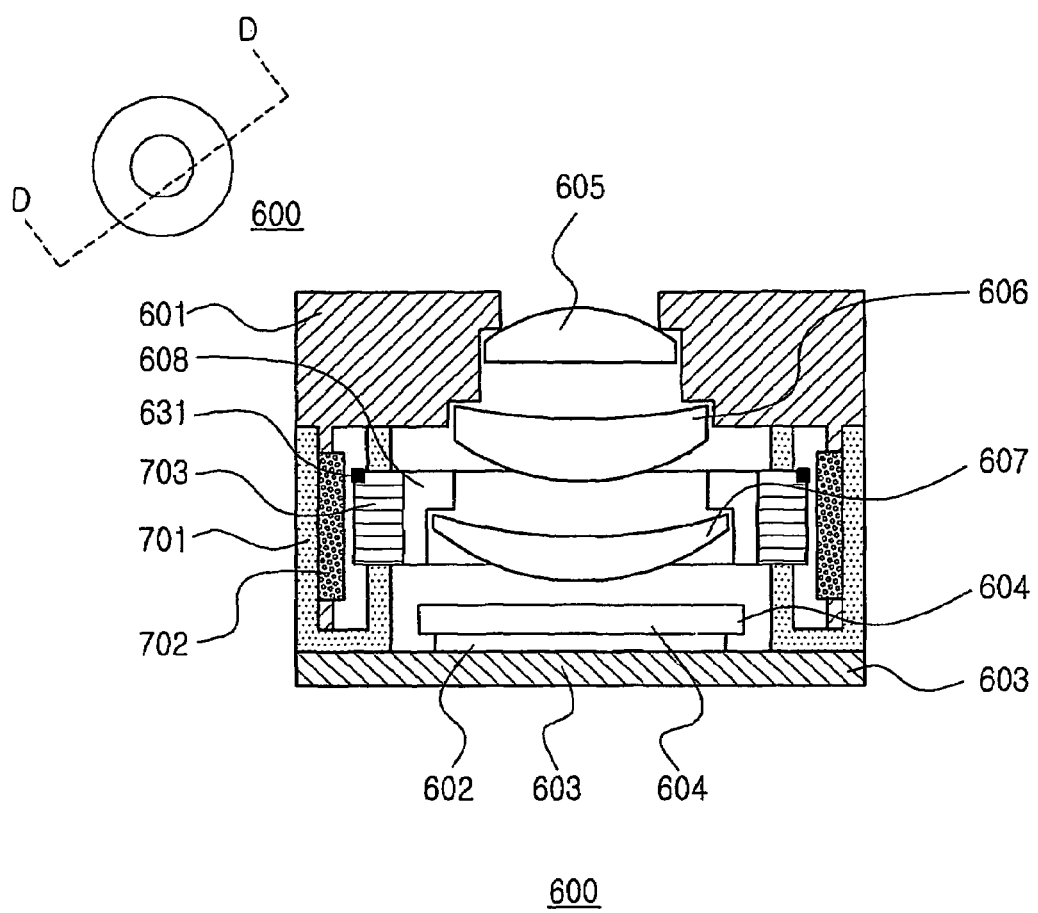
FIG. 13 is a view showing the structure that an iron core is installed in the focus actuator shown in FIG. 6 so that the focus driving part receives a force in a specific direction by a cooperation of the permanent magnet with the yoke.

FIG. 13 is a view showing the mounting state of an iron plate 631 of the first embodiment shown in FIG. 6 of the present invention. A driving coil 703 generates a force in a specific direction, and the iron plate 631 applies to the focus driving part 608 a force in the direction opposite to a specific direction. As an example of applying this embodiment to the constitution of the first view of the present invention, in the cross-section in a predetermined direction taken along line D-D, the image photographing apparatus 600 comprises a driving part 608 mounting an external lens barrel 601, a photographing element 602, a photographing element base 603, an ultraviolet protection filter 604, fixing lens groups 605, 606, a compensation lens group 607 and a driving part 608. Also, the image photographing apparatus further comprises a focus actuator 611 having a yoke 701, a permanent magnet 702, a driving coil 703, and an iron plate 631 installed in a predetermined part of the driving coil.

The operation of the image photographing apparatus 600 having the identical structure in the first view of the present invention as shown in FIGS. 6 and 13 is identical. Accordingly, the detailed description thereof will be omitted.

At this time, the iron plate 631 attached to a predetermined position of the driving coil 703 is installed between the magnet 702 and the yoke 701, and the iron plate 631 receives a force generated by the magnetic line of force of the magnet 702 and the yoke 701. Thus, the force by the magnetic line of force of the yoke 701 operates in the center direction of the magnet which has the strongest magnetic force, and this force attracts the iron plate 631 to the center direction of the magnet 702. Accordingly, the focus driving part 608 receives the force of the center direction of the magnet. Thus, as shown in the drawings, if current is not applied to the driving coil 703, the focus driving part 608 moves in the direction of the photographing direction. A force in the direction opposite to the force generated by the iron plate 631 is provided to the driving coil, and the focus driving part 608 moves by the difference between the force corresponding to the force generated by the iron plate 631 and the force operated by the driving coil 703. Therefore, the flowing direction of the current supplied to the driving coil 703 is fixed and the size of the current is controlled, and thus the position of the focus driving part 608 is controlled.

Figure 14:
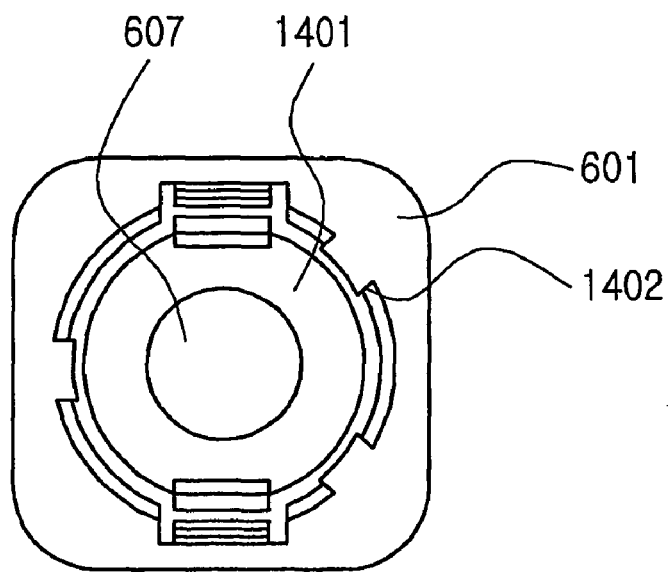
FIG. 14 is a cross-sectional view showing the constitution of an embodiment of guide means installed in the focus driving part in FIG. 6.

FIG. 14 is a view showing an embodiment of guide means of a focus driving part shown in FIG. 6. Herein, the guide means 1400 is formed on the focus driving part 608 in the direction of the optical axis, and comprises three or more guide prominences 1402 for guiding an outer circumferential surface of the lens barrel 1401, which fixes the compensation lens group 607 in the direction of the optical axis.

Figure 15:
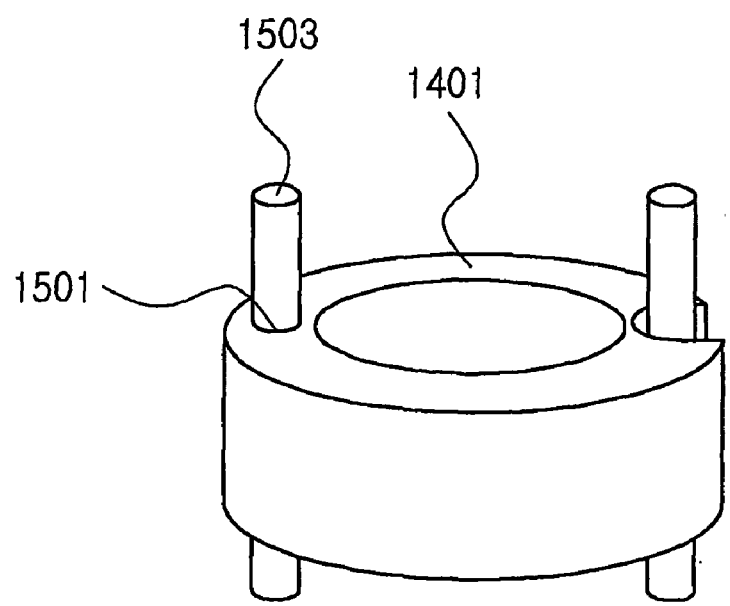
FIG. 15 is a perspective view showing the other embodiment of the guide means installed in the focus driving part of FIG. 6.

Also, the other embodiment of the guide means 1500 comprises a guide shaft 1503 slidably combined with a guide hole 1501 formed on the lens barrel 1401 as shown in FIG. 15. That is, a guide shaft 1503 guiding the lens barrel 1401 in straight is required.

At this time, there exists a friction force in the connecting part of the guide shaft 1503 and the lens barrel 1401, that is, between the guide hole 1501.

Figure 16:
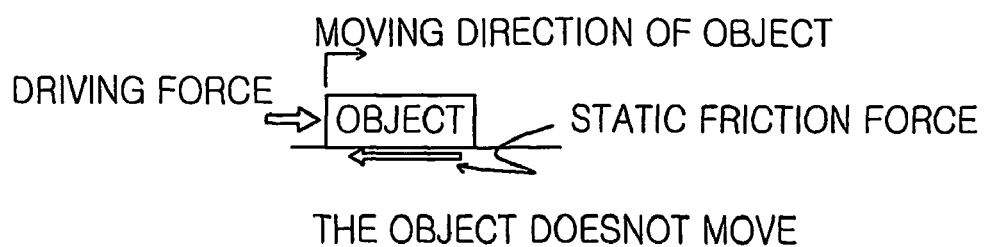
FIG. 16 is a view regarding FIG. 15 showing the friction state between a guide shaft and a guide groove at the time of suspending the focus driving part.
Figure 17:
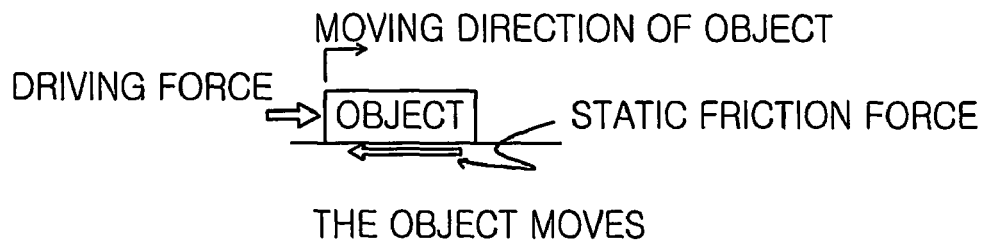
FIG. 17 is a view regarding FIG. 15 showing the friction state between a guide shaft and a guide groove at the time of moving the focus driving part.

FIG. 16 is a view showing a static friction of an object by driving force which can be applied to the present invention, and FIG. 17 is a view showing a dynamic friction force of an object by driving force which can be applied to the present invention. Also, FIG. 18 is a view showing the correlation between acceleration and a driving force of an object by driving force which can be applied to the present invention.

As shown in FIGS. 16 and 17, there are two formations of the friction force, that is, a static friction force and a dynamic friction force. The static friction force, which operates when the lens barrel 1401 is suspended and then starts to move, operates when the lens barrel moves, and is bigger than the dynamic friction force. Thus, if the lens barrel 1401 starts to move, the lens barrel 1401 moves only if the applied the force is bigger than the static friction force.

Figure 18:
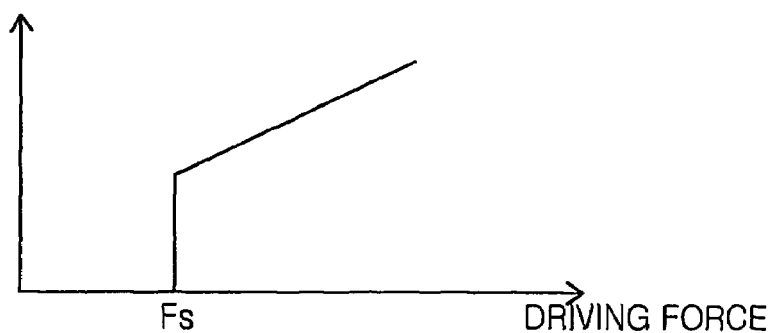
FIG. 18 is a view showing the correlation between acceleration and a driving force of an object by a driving force of the focus driving part regarding FIG. 16.

By referring to FIG. 18, if the driving force applied to an object gradually increases, the object does not move until the driving force is bigger than the static friction force Fs. At the moment that the driving force exceeds the static friction force Fs, the object rapidly moves. That is, the static friction force is smaller than the dynamic friction force so that the object moves, the friction resisting the movement rapidly decreases, and thus the acceleration of the object rapidly increases. Due to the physical cause, the object does not move under the driving force less than a specific range, but if the driving force exceeds a specific range, the object moves with a big acceleration. Thus, it is difficult to control the object to move with a quite small displacement.

Figure 19:
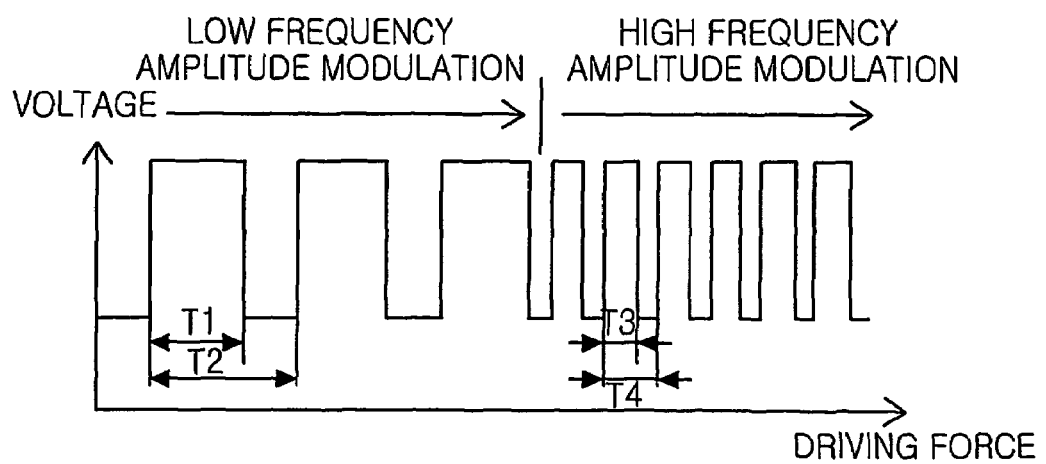
FIG. 19 is a wave form chart of a pulse width modulation pulse supplied with the controlling part in FIG. 6.

FIG. 19 is a view showing a controlling part 2000 controlling current supplied to a driving coil of the image photographing apparatus shown in FIG. 6.

That is, in order to resolve the problem in controlling the fine position due to the friction between the guide shaft 1503 and the guide hole 1501 shown in FIG. 15, as shown in FIG. 19, the controlling part uses a PWM waveform comprising a low frequency amplitude modulation waveform and a high frequency amplitude modulation waveform. At the beginning of driving of the controlling part, a PWM signal of the low frequency amplitude modulation waveform is generated for a predetermined time. After the predetermined time, a PWM signal having the frequency identical to the prior one is outputted. In other words, a PWM frequency having a plurality of frequencies is used, and the time of using the PWM of the low frequency is to resolve the static frequency. The PWM of each frequency has the identical duty ratio. That is, t1/t2=t3/t4.

Figure 20:
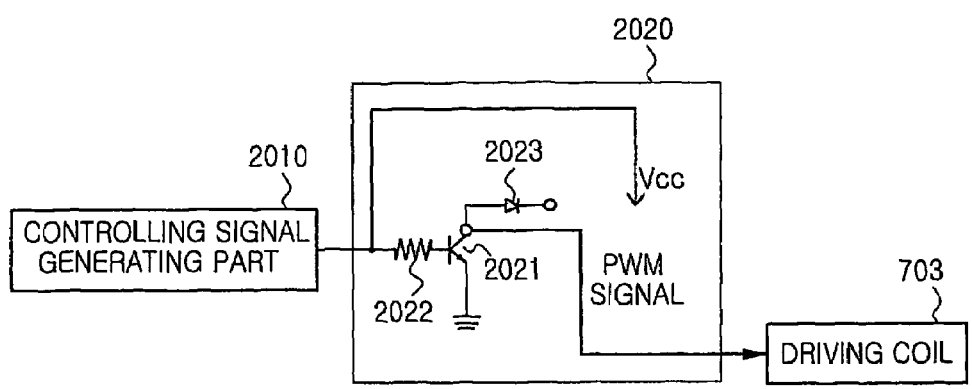
FIG. 20 is a circuit diagram showing the constitution of the FIG. 6 in detail.

Namely, FIG. 20 is a circuit diagram showing the constitution of the controlling part generating the PWM waveform comprising the low frequency amplitude modulation waveform and the high. frequency amplitude modulation waveform shown in FIG. 19.

Herein, the controlling part 2000 comprises a controlling signal generating part 2010 and a pulse width modulating pulse outputting part 2020.

At the beginning of driving the controlling signal generating part 2010, it generates a low frequency amplitude modulation controlling signal for preventing friction for a predetermined time, and after the predetermined time, the controlling signal generating part 2010 generates a high frequency amplitude modulation controlling signal. According to the embodiment of the present invention, it is preferable for the low frequency amplitude modulation controlling signal and the high low frequency amplitude modulation controlling signal to have the identical duty ratio.

The pulse width modulating signal outputting part 2020 switches on/off according to the low frequency amplitude modulation control signal and the high frequency amplitude modulation control signal generated by the controlling signal generating part 2010 thereby outputting a pulse width modulating signal having a low frequency section and a high frequency section.

The controlling signal generating part 2010 comprises a digital signal processing device, a micro computer and an FPGA.

It is preferable for the low frequency section of the pulse width modulating signal to use a frequency adjacent to the bandwidth in the dynamic feature of the driving part, which is the frequency that the second lens barrel can perform a fine reaction to each pulse of the pulse width modulation pulse.

The pulse width modulating signal outputting part 2020 comprises a transistor 2021, a resistor 2022 and a diode 2023.

The transistor 2021 comprises an emitter connected to the ground, a base for receiving the low frequency amplitude modulation control signal and the high frequency amplitude modulation control signal generated by the controlling signal generating part 2010, and a collector connected to a driving element. The resistor 2022 is connected between the transistor 2010 and the base. The diode 2023 is connected between the collector of the transistor 2021 and the power source Vcc.

Figure 21:
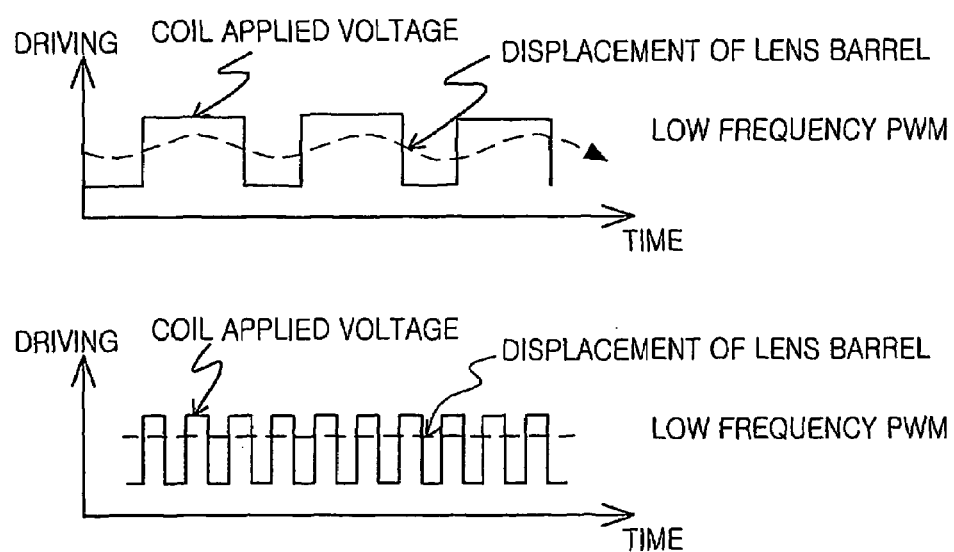
FIG. 21 is a view showing a displacement of a focus driving part according to the coil applied voltage at the time of supplying with the controlling part in FIG. 6.

Hereinafter, the operation of the focus driving part by each PWM frequency will be explained by referring to FIG. 21. FIG. 21 is a view showing the displacement of a lens barrel according to the coil applied voltage of the embodiment of the present invention.

The low frequency section of the two signal waveforms uses a frequency, in which a lens barrel 1401 can perform the fine reaction to each pulse of the PWM pulses, that is, a frequency adjacent to the band with in the dynamic characteristics of the focus driving part 608. Accordingly, although the lens barrel 1401 cannot completely follow each of the driving pulses, the driving profile in overall becomes in the state of finely following the applied 25 pulses. That is, the driving profile is in the state of fine vibration. By the fine vibration, the static friction between the focus driving part 608 and the guide hole 1501 is resolved. In other words, focus driving part is in the dynamic friction state, so that the conversion from the static friction to the dynamic friction, which is generated at the beginning state of the driving, disappears. Also, the rapid starting due to the rapid reduction of the friction force generated at the beginning stage of the driving is resolved.

When the smooth movement is completed by the PWM of the low frequency, the PWM signal of the high frequency is applied to stably suspend in the position causing the displacement by applying the PWM signal of the high frequency.

Figure 22:
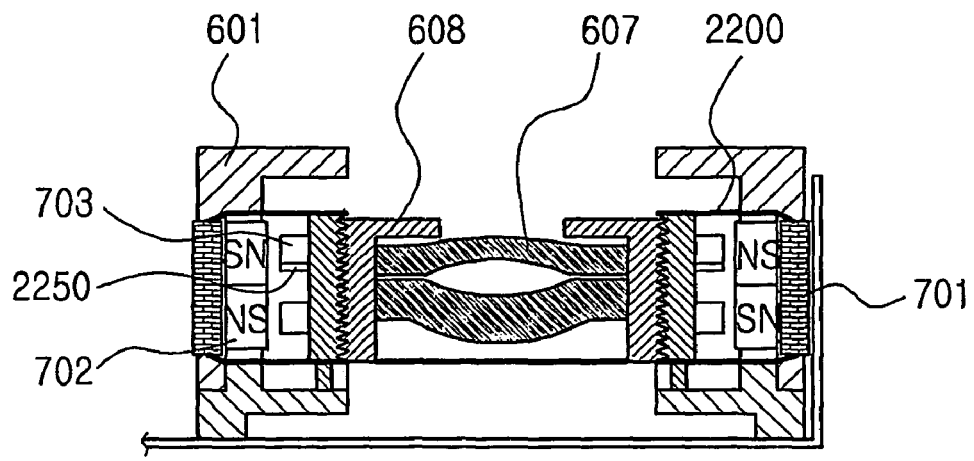
FIG. 22 is a longitudinal view showing the constitution of a suspension member installed in the focus actuator in FIG. 6.
Figure 23:
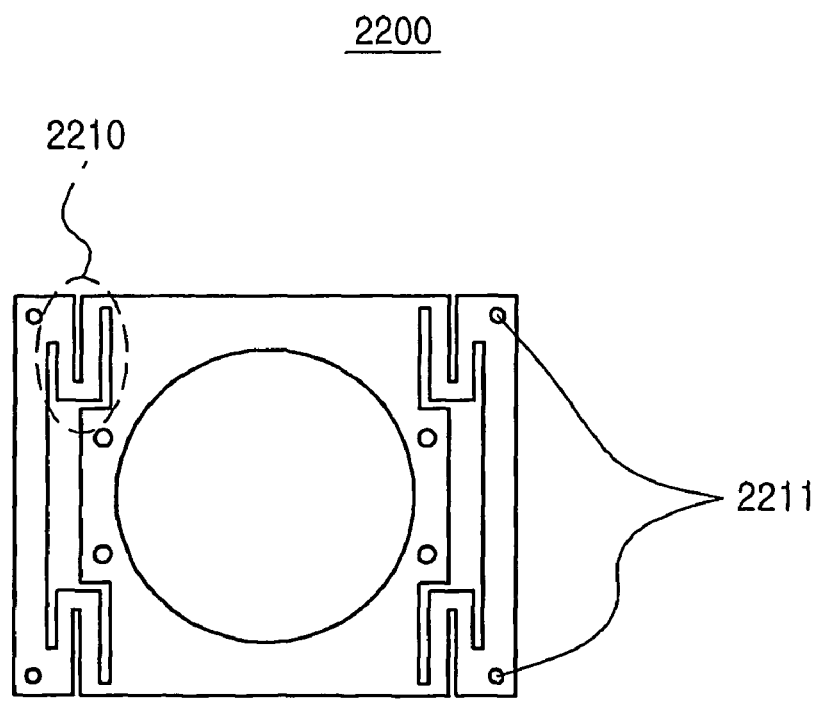
FIG. 23 is a plan view showing the suspension member in FIG. 22.
Figure 24:
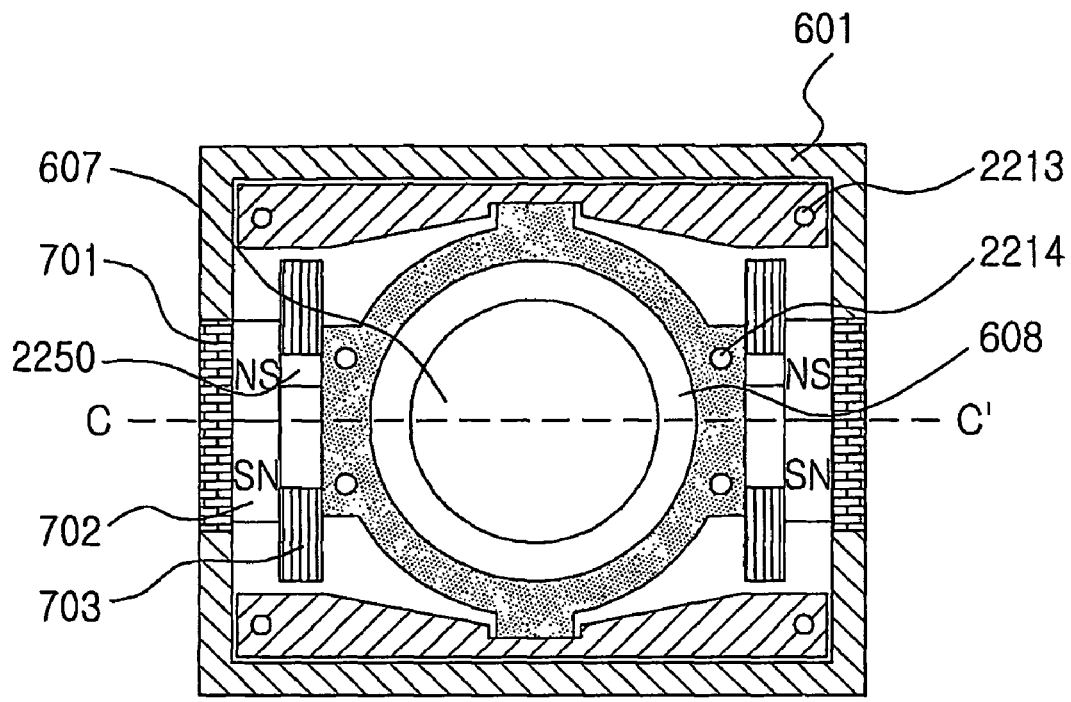
FIG. 24 is a longitudinal view showing the constitution of the focus actuator mounting the suspension member in FIG. 23.
Figure 25:
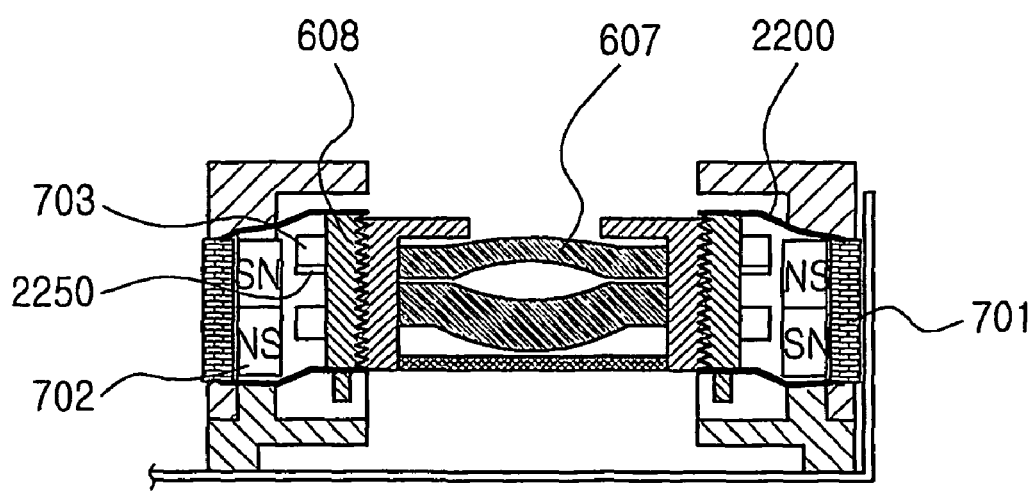
FIG. 25 is a longitudinal view showing the operational state of the suspension member in FIG. 22.

FIG. 22 is a longitudinal view showing the constitution of a focus actuator mounting a suspension member for driving the focus driving part 608 shown in FIG. 6 in the direction of an optical axis, and FIG. 23 is a view showing a plate spring 2200 as an example of the suspension member in FIG. 22. FIG. 24 is a view showing a cross-sectional view showing a state of mounting the. suspension member, and FIG. 25 is a view showing an operating state of the plate spring 2200 according to the driving of the focus actuator shown in FIG. 23.

As shown in FIG. 22, the suspension member 2200 is supported between an external lens barrel 601 and the focus driving part 608 so that the focus driving part 608 is in the state which can be movable along the direction of the optical axis, and limits the focus driving part 608 such that the driving in the direction excluding the driving direction becomes difficult, to thereby limit the focus driving part 608 to be accurately driven along the direction of the optical axis.

That is, the suspension member ordinarily comprises a plate spring and a wire spring, but the embodiment of the present invention comprises the plates spring 2200.

The plate spring 2200 has a shape which narrows the width between the portion fixed to the external lens barrel 601 and the portion fixed to the focus driving part 608, and which can be easily transformed forward the direction of the optical axis. Thus, the plate spring 2200 elastically supports the first zoom driving part 608 to be moved into the direction of the optical axis.

Also, as shown in FIGS. 23 and 24, the plate spring 2200 is fixed to four or more places of the focus driving part, thereby functioning as a guide to prevent the focus driving part 608 from moving in the direction orthogonal to the optical axis.

That is, an elastic transformed part 2210 for the easier transformation in the direction of the optical axis and a plurality of first holes 2211 are formed on the plate spring 2200, and a first boss 2213 and a second boss 2214, which are inserted into the first holes 2211 to fix the plate spring 2200, are respectively formed on the focus driving part 608 and the external lens barrel 601.

The first boss 2213 and the second boss 2214 are made of plastic. They pass the first holes 2211 and then are fixed to the plate spring 2200 by ultrasound fusion or thermal fusion.

Herein, as shown in FIG. 22, the focus actuator 611 comprises a magnet 702 fixed to an external lens barrel 601 or a focus driving part 608; a driving coil 703 fixed to one of the external lens barrel 601 and the focus driving part 608, where the magnet 702 is not fixed, to be exposed to the electromagnetic force of the magnet 702, and wound to receive the magnetic flux of the magnet 702 at the time of applying current, thereby generating the force of driving the focus driving part 608 in the direction of the optical axis; a magnetic substance 2250 fixed to one of the external lens barrel 601 and the focus driving part where the driving coil 701 is fixed, to generate a force of attracting the focus driving part 608 opposite to the direction of the force of the. driving coil. generated by the magnetic force of the magnet 702 and the driving coil 703, and to position the focus driving part to be in the initial position when a power source is not applied to the driving coil. At the time of supplying the power source from the controlling part 2000, the driving coil 701 receives a magnetic force of the magnet 702 to generate an electromagnetic force according to Fleming's left-hand rule, thereby driving the focus driving part 608 in the direction of the optical axis.

A yoke 701 is further attached to the backside of the magnet 702 for effectively circulating the magnetic flux.

Meanwhile, the magnetic substance 2250 generates an attracting force of the magnet 702 with regard to the part having the strongest magnetic force in the magnet 702, and the force attracts the focus driving part 608 in the direction of the initial position, that is, the direction opposite to the driving coil 701. Accordingly, in the initial state that the current is not applied to the driving coil 701, the first zoom driving part 608 is maintained .in its position to be in the lowest surface. The magnetic substance 2250 provides a restoration force which restores the focus driving part 608 to the initial position again while driving the focus driving part 608 in the direction of the optical axis. Accordingly, the magnetic substances 2250 functions to secure the initial position when the current is not applied to the driving coil, and functions to generate the spring force at the time of driving.

Hereinafter, the operation of the embodiment of the present invention having the above constitution will be explained.

A user pushes a photographing button by a key pad installed on a communication apparatus, a controlling part 2000 drives a photographing element, which is not shown, and the photographing element photographs an image of an object passing the compensation lens group 607. The photographed image signal of the photographing element is transferred to the controlling part.

If the photographed image is unclear, the controlling part, which received the image, applies a power source for adjusting focusing to a driving coil 701.

If the power source is applied to the driving coil 701, an electromagnetic force according to Fleming's left-hand rule is generated by magnetic flux from the magnet 702, and the driving coil 702 moves to a direction of an optical axis. Accordingly, the focusing of the compensation lens group 607 is adjusted, and thus the photographed image becomes clearer.

During this process, as shown in FIG. 25, a plate spring 2200 guides such that the focus driving part 608 is accurately driven in the direction of the optical axis, and the magnetic substance 2250 functions as a spring. Thus, the function of the plate spring 2200 as a spring is minimized, but the plate spring 2200 functions as a guide to limit a straight line motion of the focus driving part.

The magnetic substance 2250 attracts the focus driving part 608 by force attracted to the magnet 702 in the direction opposite to the force generated by the coil, thereby providing a restoration force which can restore the focus driving part 608 to the initial position.

Figure 26:
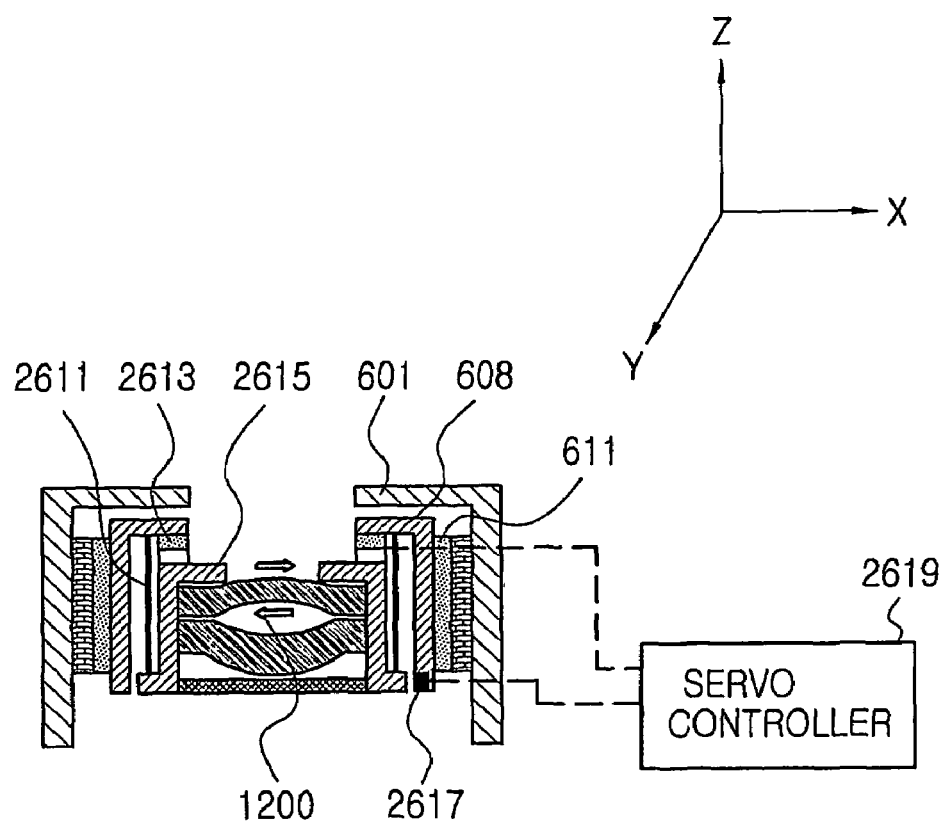
FIG. 26 is a longitudinal view showing the constitution of a compensation actuator regarding FIG. 6.
Figure 27:
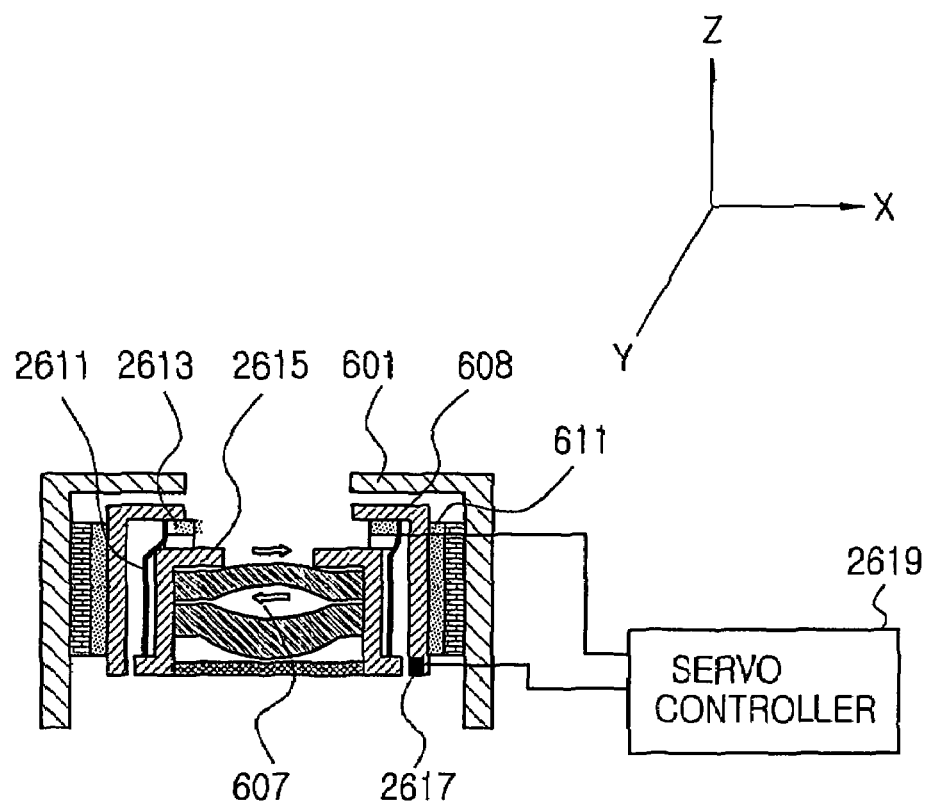
FIG. 27 is a longitudinal view showing the operational state of FIG. 26.

FIG. 26 is a view showing the installing state of a compensation actuator for preventing an image, which is generated in the direction orthogonal of the optical axis, from being out of focus due to the trembling of hands, and FIG. 27 is a view showing the operation state of FIG. 26.

Herein, the image photographing apparatus shown in FIG. 6 further comprises a compensation driving part 2615 for supporting the compensation lens group 2615; a compensation suspension member 2611 for fixing the compensation driving-part 2615 to moved into the direction that the compensation lens group 607 is orthogonal to the optical axis; a compensation actuator 2613 supported by the focus driving part 608 to drive the compensation driving part 2615 in a direction orthogonal to the optical axis; a displacement sensor 2617 for sensing the movement of the compensation driving part in the direction orthogonal to the optical axis; and a servo controller 2619 for receiving information of the displacement sensor 2617 and driving the compensation actuator 2613 to restore the compensation driving part 2615 to the original state.

The compensation suspension member 2611 is made of a wire spring or a plate spring.

The compensation actuator 2613 drives the compensation actuator 2615 on an X-Y plane, which is orthogonal to the direction of the optical axis.

The compensation actuator 2613 may comprise a voice coil motor, a piezoelectric element or an ultrasound motor.

Hereinafter, the operation of the compensation driving part 2615, the compensation actuator 2613, the compensation suspension member 2615, the displacement sensor 2617 and the servo controller 2619 for adjusting focus of an image due to the trembling of hands will be explained by referring to FIG. 27.

During photographing an object, if a user's hands holding a photographing apparatus tremble, the photographing apparatus relatively vibrates with regard to the object. On the basis of the photographing apparatus, the image of the object becomes in the state of relatively vibrating with regard to the photographing apparatus. At this time, the displacement sensor 2617 installed in a predetermined position in the photographing apparatus senses the movement of the photographing apparatus and transmits it to the servo controller 2619.

If the photographing apparatus vibrates, the servo controller 2619 operates the compensation actuator 2613 in the direction of removing the vibration of the object image for the photographing apparatus, consequently, the vibration of the object image due to the hand trembling is removed. Thus, an optimized object image can be photographed.

Figure 28:
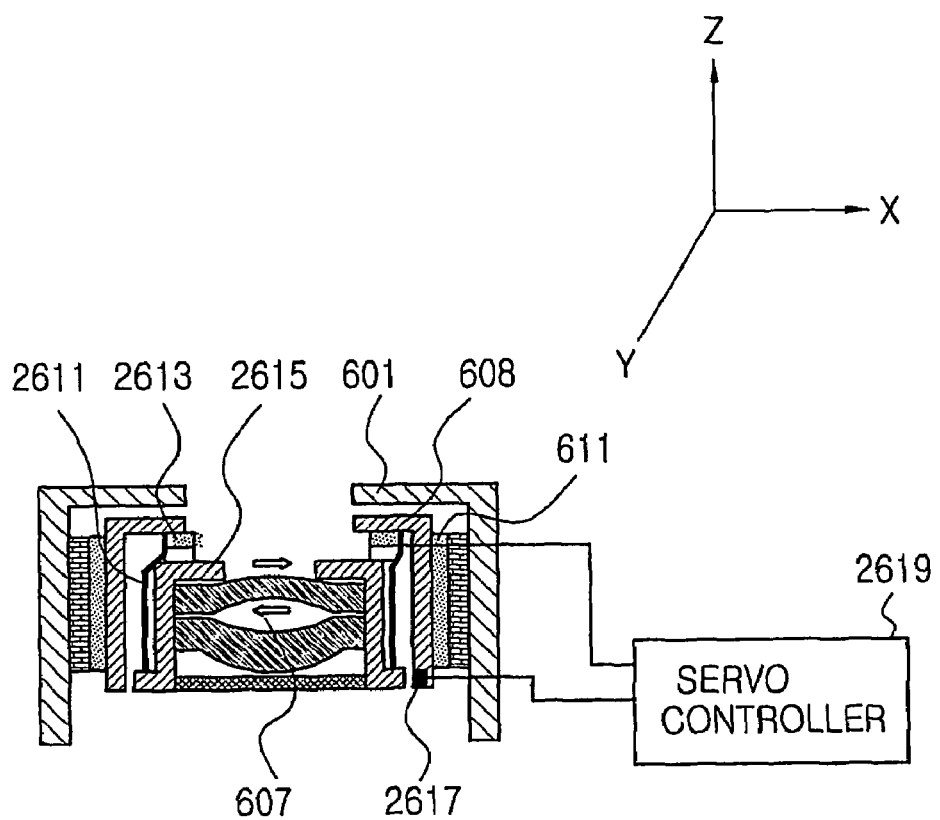
FIG. 28 is a view showing the state that an initial position fixing part and a specific magnification position fixing part is installed in the focus actuator in FIG. 6.
Figure 29:
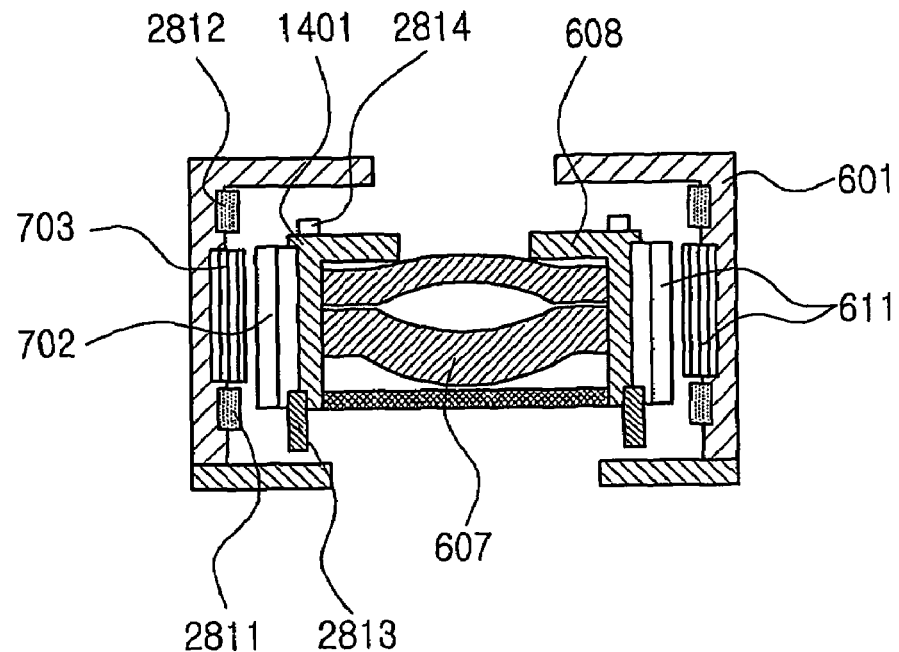
FIGS. 29 and 30 are views regarding FIG. 28 explaining the operational state of the initial position fixing part and the specific magnification position fixing part.
Figure 30:
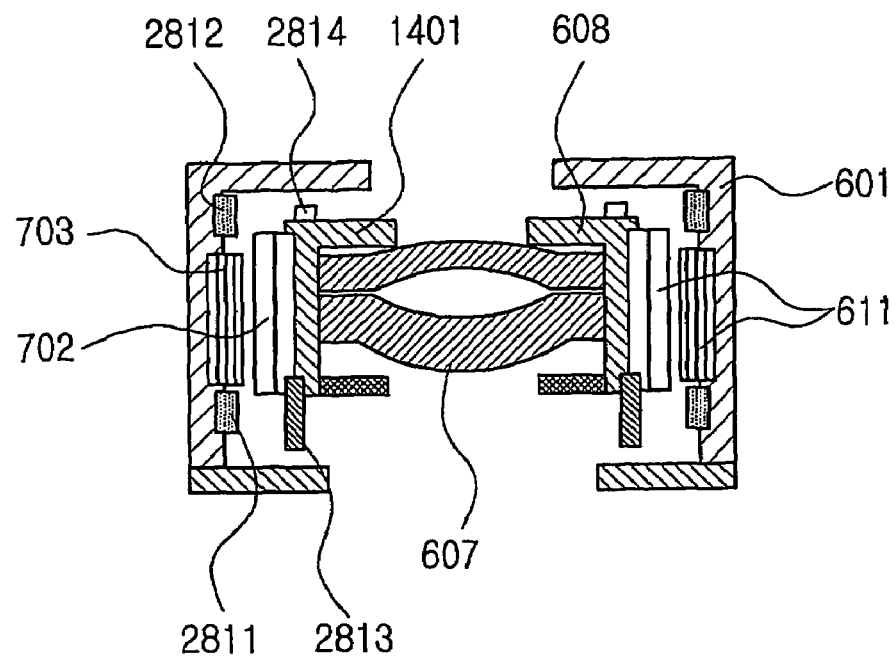

FIG. 28 is a view showing the installing stage of an initial position fixing part and a specific focus position fixing part on the focus actuator shown in FIG. 6. FIGS. 29 and 30 are views showing the operation state of the initial position fixing part and the specific focus position fixing part shown in FIG. 28.

In FIG. 28, the focus actuator 611 further comprises an initial position fixing part 2811 for fixing the focus driving part 608 to the initial position by a predetermined brake power, and the initial position fixing part 2811 comprises a first magnetic substance fixed so as not to be exposed to the range of the line of magnetic force of the magnet 702 on the side where the magnet 702 and for fixing the focus driving part 608 to the initial position by attracting the magnet 702.

Also, the focus actuator 611 further comprises a close-up position fixing part 2812 .for moving the focus driving part 608 to a specific position so that the object image of the compensation lens group 607 is in complete focus with a specific close-up distance, wherein the close-up position fixing part 2812 comprises a second magnetic substance fixed so as not to be exposed to the range of the line of magnetic force of the magnet 702 on the side where the magnet 702 and for fixing the focus driving part 608 with a specific magnification position by attracting the magnet 702

That is, the initial position fixing part 2811 comprises the first magnetic substance fixed to the external lens barrel 601 so as not to be exposed to the range of the line of magnetic force of the magnet 702 and for fixing the lens barrel 1401 by attracting the magnet 702.

Also, the close-up position fixing part 2812 for moving the lens barrel 1401 to a specific position is installed so that the compensation lens group 607 projects the object image by a specific magnification. The specific magnification is set to the position where the close-up photographing is performed.

The close-up position fixing part 2812 comprises the second magnetic substance fixed to the external lens barrel 601 so as not to be exposed to the range of the line of magnetic force of the magnet 702 and for moving the compensation lens group 607 to a specific magnification position by attracting the magnet 702.

Meanwhile, the lower end of the lens barrel 1401 forms a first stopper 2813 horizontally contacting to the external lens barrel 601, and the upper end forms a second stopper 2814 horizontally contacting to the external lens barrel 601 thereby maintaining an optical arrangement of the compensation lens group 607 at the moment that the lens barrel 1401 contacts to the upper end of the external lens barrel 601.

The key pad of the communication apparatus comprises a photographing button (not shown) and a close-up photographing button (not shown) for photographing an image by driving the photographing element. If the general photographing button is pushed, the controlling part 2000 drives the photographing element to photograph an image of an object and applying current to the driving coil at the same time to execute the mode for correcting a focusing error.

If the close-up photographing button is pushed, the controlling part 2000 applies big current to the driving coil 703 to move the lens barrel 1401 to the side of the initial position fixing part 2811.

That is, in the state that the current is not applied to the driving coil 703,-as shown in FIG. 29, the first magnetic substance 2811 attracts the magnet 702 to position the lens barrel 1401 at the lowest end of the external lens barrel 601. Accordingly, the first stopper 2813 contacts to the bottom of the lens barrel 1401.

If the user pushes the general photographing button by the key pad installed on the communication apparatus, the controlling part 2000 applies the current for moving the lens barrel 1401 to the general photographing position to the driving coil 703.

If a power source is applied to the driving coil 703, an electromagnetic force driving the magnet 702 and the lens barrel 1401 is generated by the effect of the current flowing through the driving coil 703 affected by the magnetic flux generated from the magnet 702. The controlling part 2000 adjusts the direction and the voltage of the current to ascend and to move the lens barrel 1401 to the general photographing position.

Also, the controlling part 2000 drives the photographing element to photograph the image of an object photographed by the photographing element through the compensation lens group 607.

The photographing element converts the photographed image to an electrical signal to transfer to the controlling part 2000 in the main frame through a flexible PCV.

If the photographed image is not clear, the controlled part 2000, which received the image, applies a fine adjusting current to a power source for executing the focus adjustment to the driving coil 703. The controlling part 2000 adjusts the fine direction and the voltage of the current to ascend or descend the lens barrel 1401 to make the image photographed on the image photographing part to become clearer.

Meanwhile, if the user pushes the close-up photographing button by the key pad installed on the communication apparatus, the controlling part 2000 applies current for moving the lens barrel 1401 to the close-up photographing position to the driving coil 703.

If a power source is applied to the driving coil 703, an electromagnetic force driving the magnet 702 and the lens barrel 1401 is generated by the effect of the current flowing through the driving coil 703. As shown in FIG. 30, the controlling part 2000 adjusts the direction and the voltage of the current to move the lens barrel 1401 to the close-up photographing position. After the lens barrel 1401 moves, the second magnetic substance 2812 fixed to the external lens barrel 1401 attracts the magnet 702, and thus the lens barrel is fixed to the close-up photographing position. At this time, the second stopper 2814 contacts to the upper end of the external lens barrel 601 to stabilize the position of the lens barrel 1401.

The controlling part 2000 drives the photographing element to the object image photographed on the photographing element by the compensation lens group 607. The photographing element converts the photographed image to an electrical signal to transfer to the controlling part 2000 in the main frame through a flexible PCV.

Second Embodiment

Figure 31:
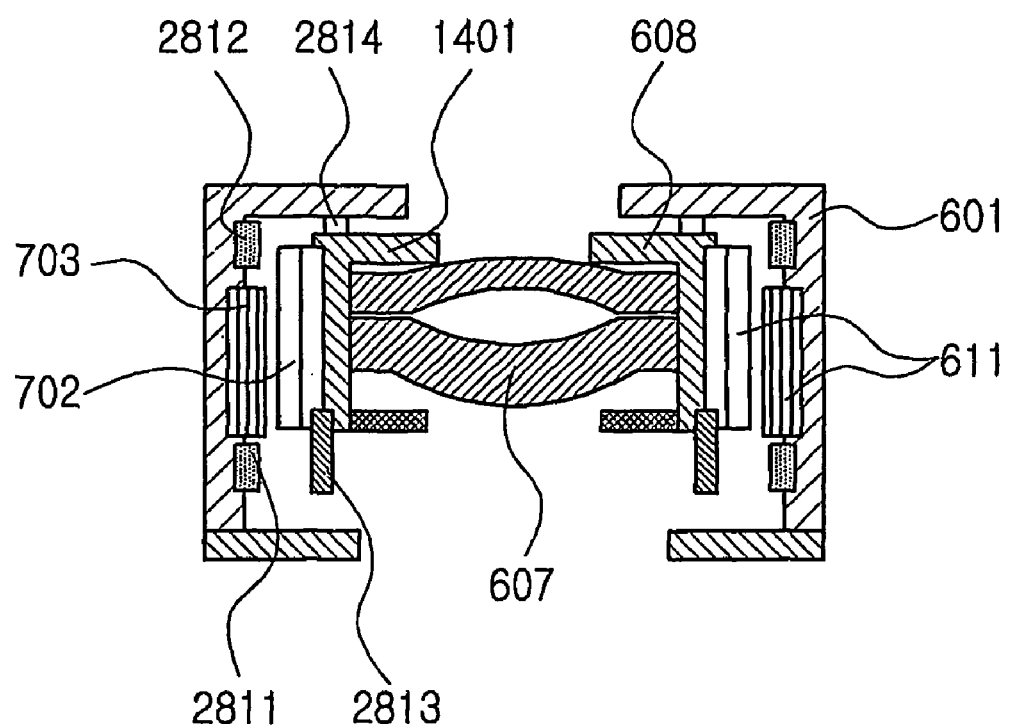
FIG. 31 is a longitudinal view showing the state that a zoom driving part and a zoom actuator are installed in the image photographing apparatus according to the second embodiment of the present invention.
Figure 32:
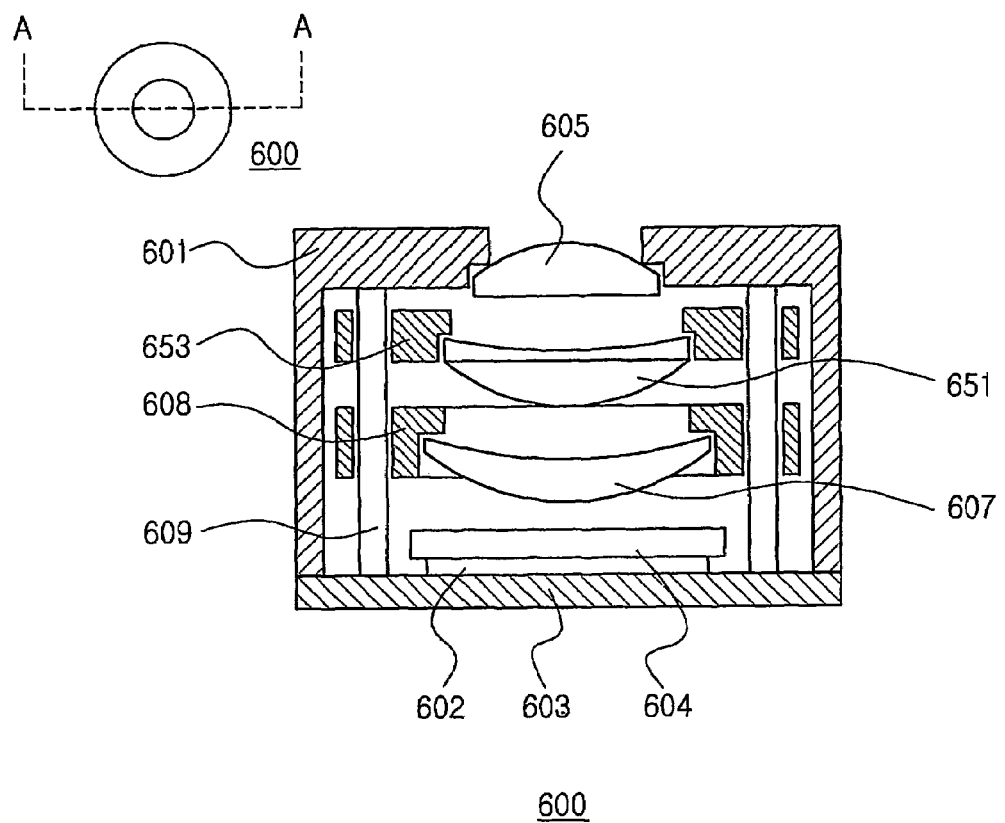
FIG. 32 is a view showing the constitution of the zoom actuator in FIG. 31.

FIGS. 31 and 32 are views showing the constitution of an image photographing apparatus according to the second embodiment of the present invention. That is, FIGS. 31 and 32 are views showing the mounting state of a zoom lens group 651 varying a magnification, a zoom driving part 653 and a zoom actuator. By referring to FIG. 31, in a predetermined cross-sectional view of the image photographing apparatus taken along the line A-A, the image photographing apparatus 600 comprises a zoom driving part 653 having an external lens barrel 601, a photographing element 602, a photographing element base 603, an ultraviolet protection filter 604, a fixing lens group 605, a zoom lens group 651, a compensation lens group 607, and the zoom lens group 651; a focus driving part 608 mounting the compensation lens group 607; and a guide shaft 609 guiding the transfer of the two driving parts.

The image photographing apparatus 600 in a predetermined cross-sectional view taken along the other line B-B, which is different from the cross-section taken along the line A-A, will be explained by referring to FIGS. 32 and 33. A zoom driving coil 711 and the focus driving coil 703 are respectively attached to the outside of the zoom driving part 653 and the focus driving part 608, and the zoom driving coil 711 and the focus driving coil 703 are installed to electromagnetically cooperate with a magnet 702 and a yoke assembly 701. Each of the two driving parts 608 and 653 has the structure similar to FIG. 7. Also, the two driving coils 703 and 711 operate by the principle explained in FIGS. 8 and 9. That is, according to the direction and the size of the current applied to the two driving coil 703 and 711, the two driving parts 608 and 653 respectively attaching the two driving coils move along the guide shaft 609.

Accordingly, the displacement lens group 651 mounted on the zoom driving part 653 and the compensation lens group 607 mounted on the focus driving part 608 can move along the optical axis of the image photographing apparatus 600.

The operation of the optical system according to the above constitution will be explained in FIGS. 33-35.

The displacement lens group 651 mounted on the second zoom driving part 653 and the compensation fens group 607 mounted on the first zoom driving part 608 can independently move in the left and right directions by respectively controlling the current applied to the two driving coils 703 and 711 attached to the driving part, as shown in the drawings.

Figure 33:
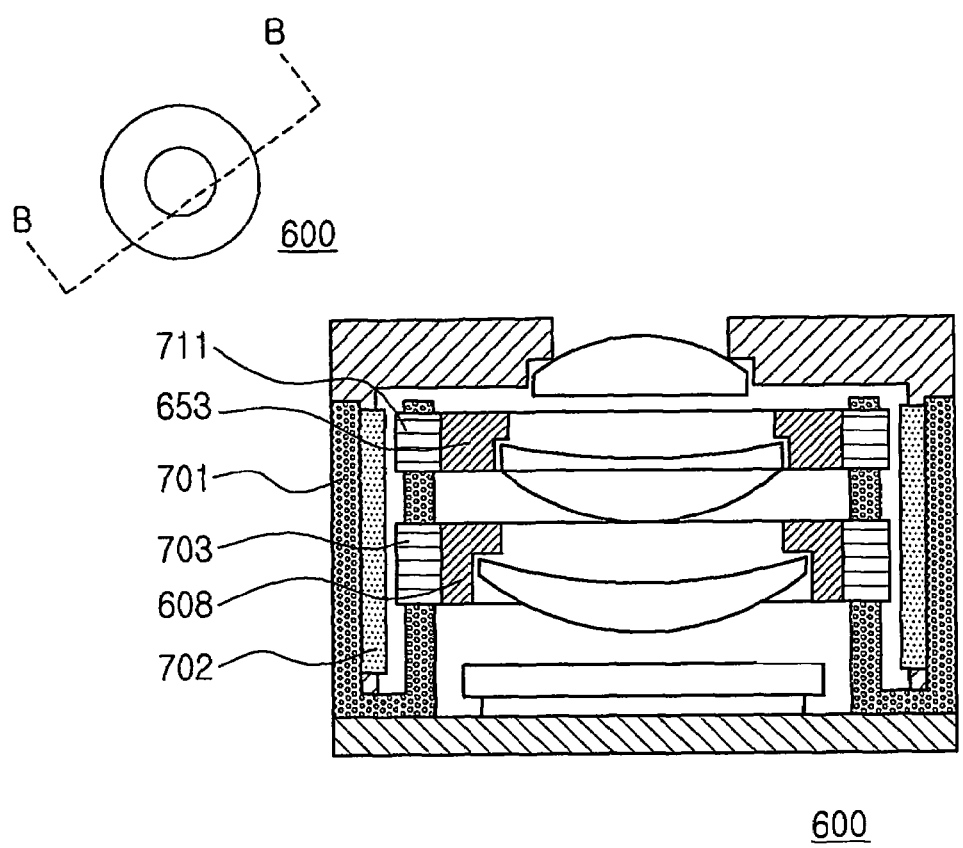
FIG. 33 is a view showing that an image is formed on the photographing element when the zoom driving part shown in FIG. 31 is in the initial position and the object is on the object plane in complete focus.
Figure 34:
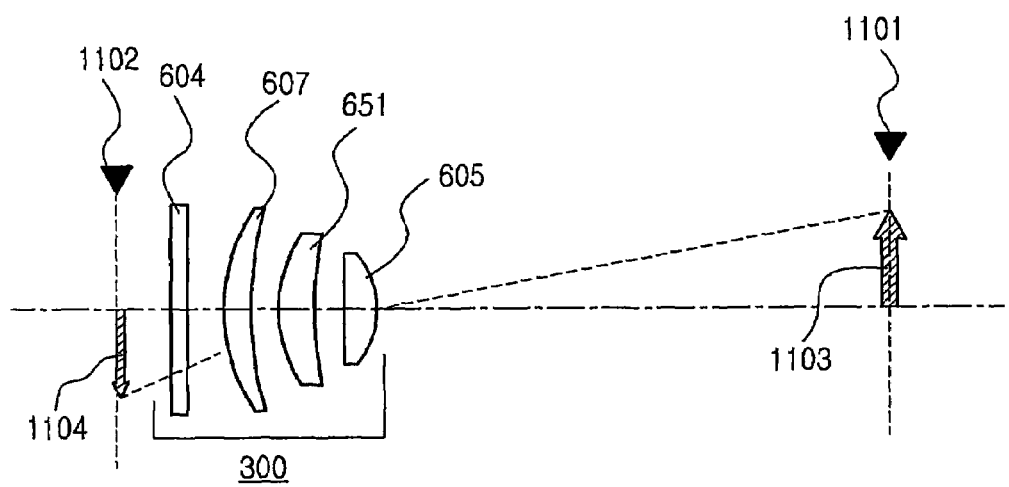
FIGS. 34 and 35 are views explaining the optical operation of the zoom driving part shown in FIG. 31.

As shown in FIGS. 32, 33 and 34, if the displacement lens group 651 and the compensation lens group 607 are in the initial position, respectively, an object 1103 positioned on a predetermined object plane 1101 forms an image 1104 on an image plane 1102, which is solely determined by the optical system 300 consisting of the object plane 1101, the fixing lens group 605, the displacement lens group 651, the compensation lens group 607, and the moiré interference prevention filter. Accordingly, the photographing element 602 is positioned on the image plane 1102.

Figure 35:
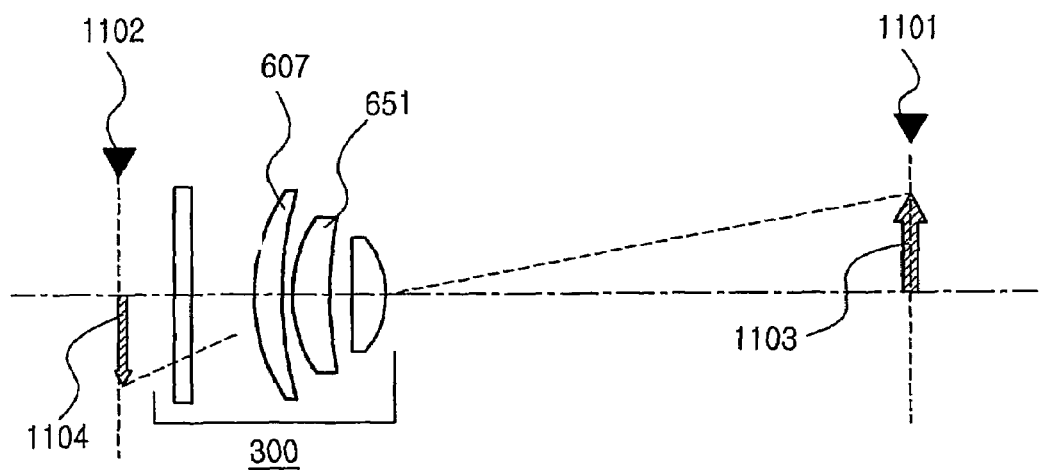
Figure 36:
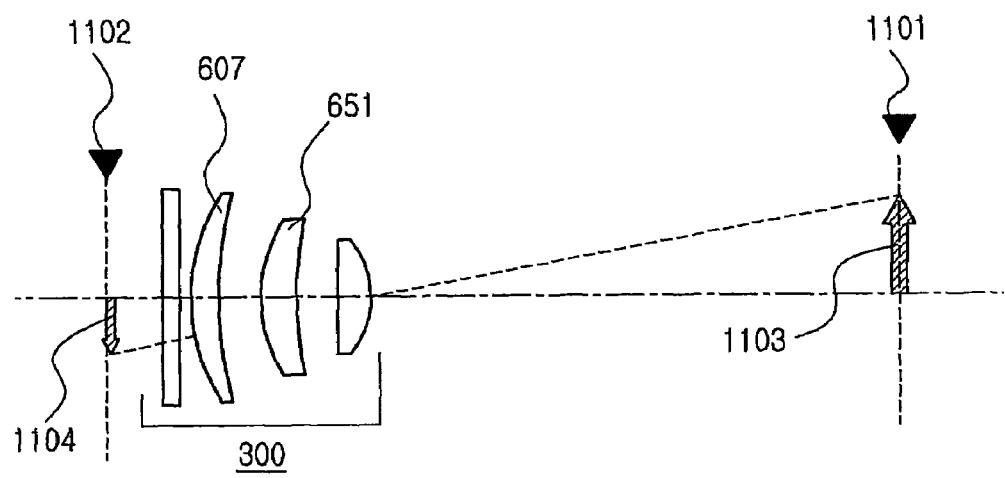
FIG. 36 is a longitudinal view showing the state that the brake device is installed on the zoom actuator shown in FIG. 31.

FIGS. 34 and 35 show an example of adjusting the compensation lens group 607 to move the displacement lens group 651 to a predetermined position, and to position the image of the object 1103 on the image plane 1102, thereby enlarging the image of the object 1103. An image 1104 bigger than the image in FIG. 33 is formed on the image plane 1102.

FIG. 35 shows an example of adjusting the compensation lens group 607 to move the displacement lens group 651 to a predetermined position, and to locate the image of the object 1103 on the image plane 1102, thereby making the image of the object 1103 smaller. An image 1104 smaller than the initial image is formed on the image plane 1102.

In the structure of the second embodiment of the present invention shown in FIG. 31, if the zoom actuator is not driven, FIGS. 37-40 comprises a brake device for fixing the position of the focus driving part 608. As an embodiment applying the brake device to the first or the second embodiment of the present invention, in the cross-sectional view in a predetermined direction (taken along the line C-C), the image photographing element 602 comprises a focus driving part mounting an external lens barrel 601, a photographing element 602, a photographing element base 603, an ultraviolet protection filter 604, fixing lens group 605, a compensation and zoom lens groups 607 and 651; a brake driving part 621; a rotation centering shaft of the brake driving part 621; a spring 625 adding a spring force to the brake driving part 621; and a brake coil 623 driving the brake driving part 621.

Figure 37:
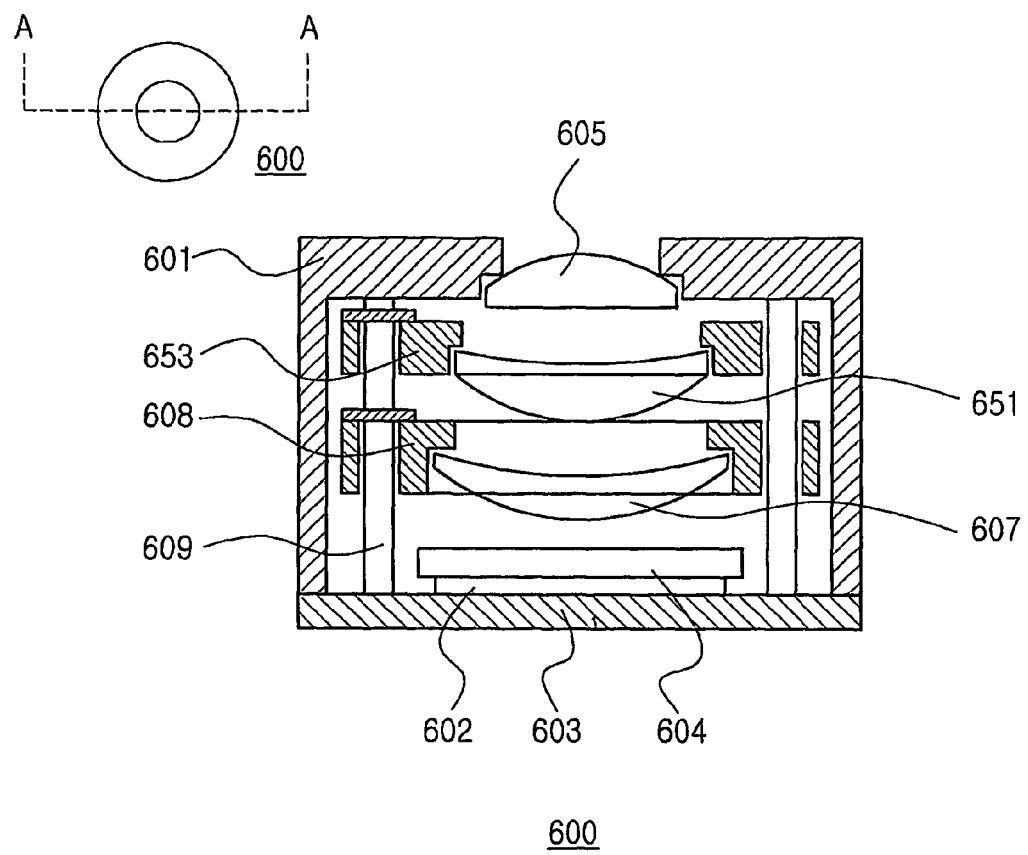
FIG. 37 is a three-dimensional diagram of the brake device in FIG. 36.

The detailed structure of the brake device comprising the above elements will be explained by referring to FIG. 37. The brake driving part 621 has a structure which can rotate centering the rotation centering shaft 622, and a spring 625 contacting the brake driving part 621 in one direction is installed at the upper portion of the brake driving part 621. One end of the spring contacts to one portion 2002 inside of the external lens barrel 601, and the other end contacts to a prominence formed on one portion of the brake driving part 621. The spring provides the brake 621 with a force of rotating the brake 621 in a clock-wise direction. A magnet 627 is inserted into a plane of the brake driving part 621, and a brake coil 623 adjacent to the position where the magnet 627 is inserted, and wound several times. The brake coil 623 is attached to a predetermined position inside of the external lens barrel 601.

Figure 38:
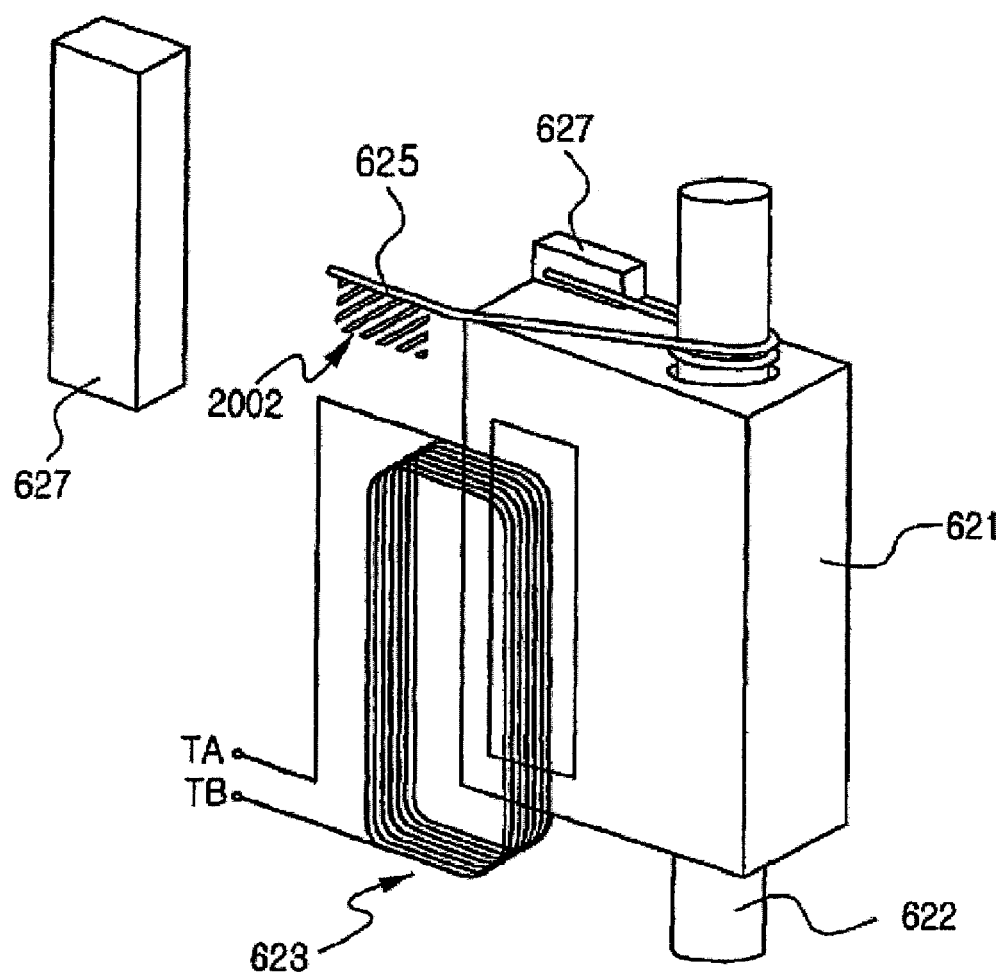
FIG. 38 is a view showing the structure of fixing the zoom driving part when current is not applied to the brake device shown in FIG. 36.

The operation of the brake device will be explained by referring to FIGS. 38 and 39. In the initial state without flowing current to the brake coil 623, the brake driving part 621 becomes the state contacting to a brake contacting part 629 installed in a predetermined position of the focus driving part 608. During this state, the focus driving part 608 cannot move due to the friction force between the brake driving part 621 and the brake contacting part 629.

Figure 39:
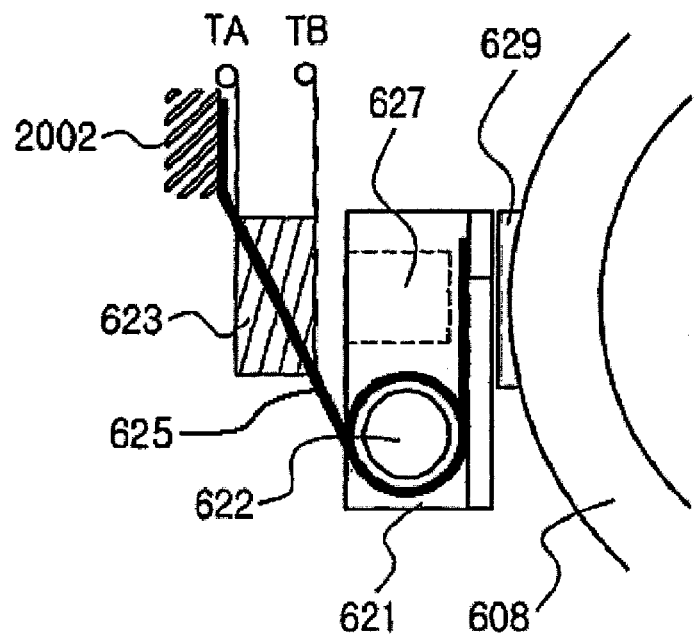
FIG. 39 is a view showing the state that when the current is applied to the brake device shown in FIG. 36, the brake part is separated from the zoom driving part so that the zoom driving part freely moves.

As shown in FIG. 39, if flowing a predetermined current to the brake coil 623, the brake driving part 621 is attracted to the brake coil 623 by the cooperation of the magnetic force generated from the brake coil 623 and the electromagnetic force of the magnet 627 inserted into the brake driving part 621. Accordingly, the brake driving part 621 falls apart from the brake contacting part 629, and the first zoom driving part 608 can freely move.

This embodiment of the present invention explains that the brake device is installed in the first zoom driving part 608, but the brake device can be installed in the second driving part 653.

Third Embodiment

Figure 40:
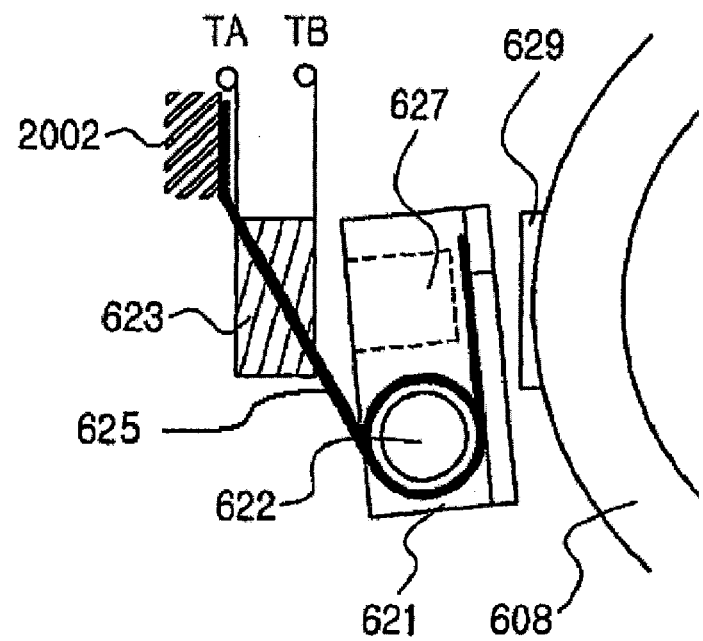
FIG. 40 is a longitudinal view showing the constitution of an image photographing apparatus according to the third embodiment of the present invention.

FIG. 40 is a view showing the constitution of an image photographing apparatus according to the third embodiment. The image photographing apparatus according to the present invention by referring to FIG. 40 comprises a compensation lens group 4200; a focus actuator 4300 for adjusting the focus of the compensation lens group 4200; a focus driving part 4250 installed between the compensation lens group and the focus actuator 4300 for setting the initial position of the compensation lens group 4200; a compensation driving part 4400 for supporting the focus actuator 4300; a zoom driving part 4700 for supporting the zoom lens group 4600 and the displacement lens group 4600; a zoom actuator 4500 for driving the compensation driving part 4400 to move the compensation lens group 4200 along a first moving trajectory, and driving the zoom driving part 4700 to move the displacement lens group 4 600 along a second lens group 4200; a photographing element 4800 for photographing an image of an object passing the compensation lens group 4200 and the displacement lens group 4600; and a controlling part 2000 for controlling the focus actuator 4300, the zoom actuator 4500 and the photographing element 4800.

In this embodiment of the present invention, the zoom actuator 4500 can be embodied by using various shapes of driving elements. Thus, the zoom actuator is schematized without indicating a specific shape of the driving element, while focusing its function.

Also, the image photographing apparatus 4000 further comprises restoration means for restoring the compensation driving part 4400 and the zoom driving part 4700 to their original state.

Such image photographing device 4000 further comprises a fixing lens group 4100 and a fixed lens barrel 4110 for fixing the fixing lens group 4100 on an optical axis which is identical to the compensation lens group 4200 and the displacement lens group 4600.

Figure 41:
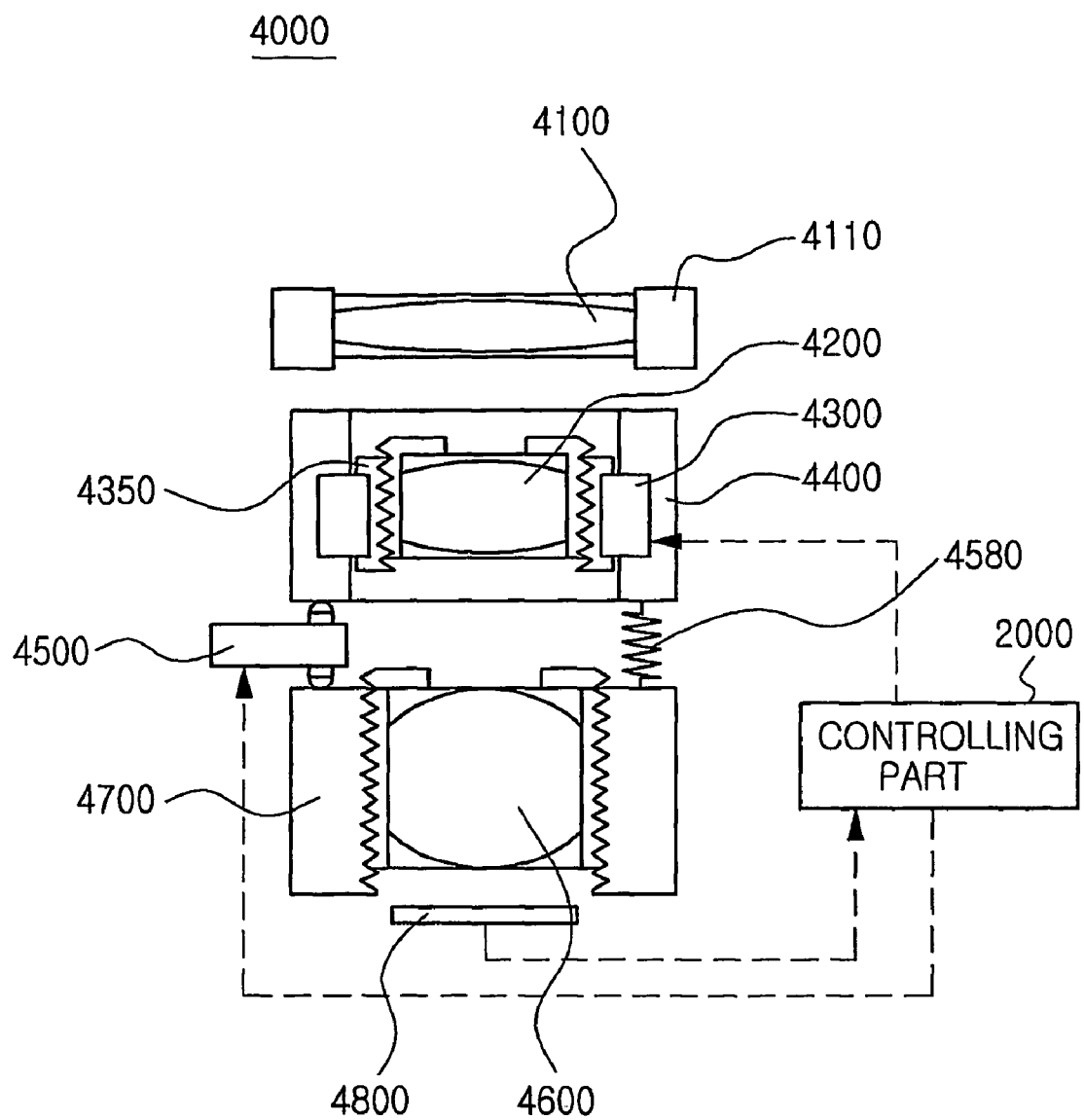
FIG. 41 is a longitudinal view showing the constitution of an embodiment of the focus driving part and the focus actuator shown in FIG. 40.
Figure 42:
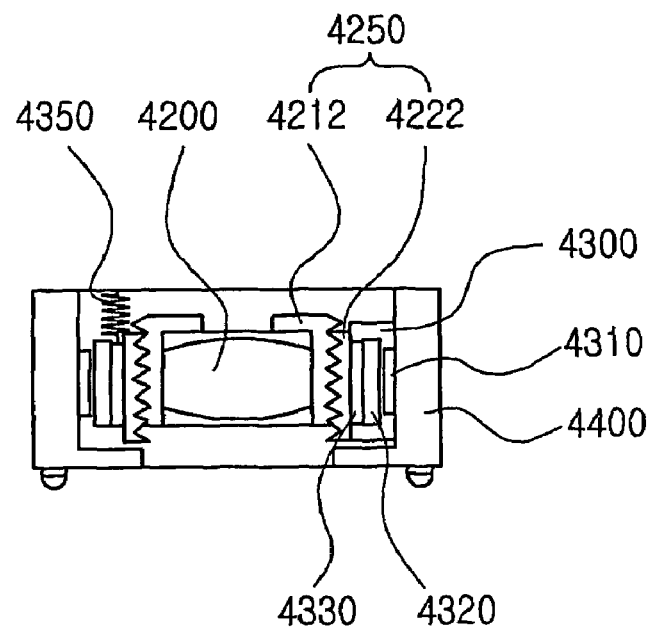
FIG. 42 is a cross-sectional view showing the constitution of the focus driving part and the focus actuator shown in FIG. 40.

FIG. 41 is a view showing the constitution of a compensation lens group 420.0, a focus driving part 4250 and a compensation driving part 4400 shown in FIG. 40, and FIG. 42 is a cross-sectional view of FIG. 41. As shown in FIGS. 41 and 42, the focus driving part 4250 comprises a first lens barrel 4210 combined with the compensation lens group in its interior and forming a first male screw on its outer circumference; and a second lens barrel 4220 combined with the focus actuator in its exterior and forming. a first female screw, which is screw-combined with the first male screw 4212 on its inner circumference.

A tool groove 4214 is formed on, the first lens barrel 4210 to insert and to rotate a tool. By inserting the tool into the tool groove and rotating it, the height of the first lens barrel 4210 is adjusted to fix the optimum initial position of the compensation lens group 4200.

The focus actuator 4300 comprises a driving coil 4310 wound on one side of the focus driving part 4205 or the first zoom driving part to be fixed, and receiving current from the controlling part; and a magnet 4320 fixed to one side of the focus driving part 4250 or the first zoom driving part 4400, wherein the polarity of the magnet is divided so that the magnetic flux passes over the flat part of the driving coil 4310.

The focus actuator 4300 further comprises a restoration spring 4350 restoring the focus driving part 4250. to the initial position.

A yoke 4330 for circulating the magnetic flux of the magnet 4320 is further attached to one side of the magnet 4320.

When current is supplied to the driving coil 4310 of the focus actuator 4300, a magnetic flux is generated. Since the first embodiment of the present invention detailedly explains the process of moving the focus driving part 42,50 in the direction of the optical axis due to the magnetic flux and the polarity of the magnet 4320, the detailed explanation of this process will be omitted.

Figure 43:
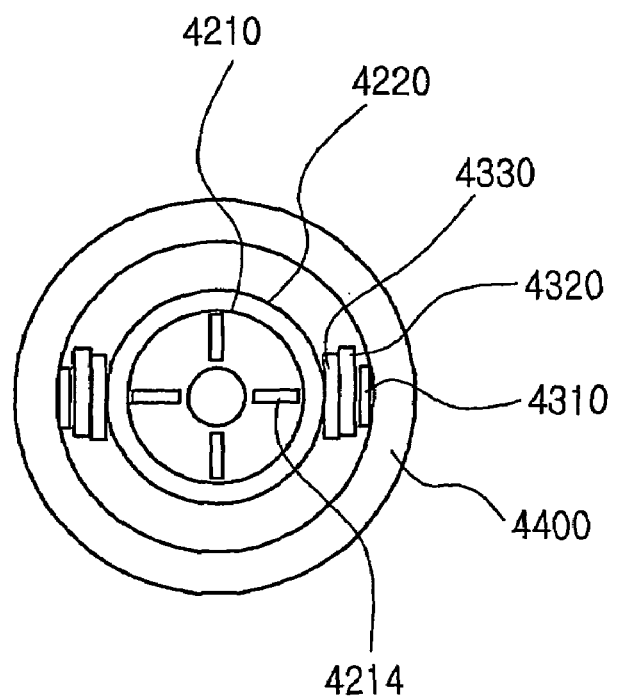
FIG. 43 is a longitudinal view showing the constitution of another embodiment of the focus driving part and the focus actuator in FIG. 40.

FIG. 43 is a view showing the other embodiment of the focus actuator 4300 shown in FIG. 40, and FIGS. 44-46 show the constitution of the focus actuator 4300 shown in FIG. 43. The actuator shown in FIGS. 43-46 has a structure similar to the focus actuator shown in FIG. 40. Accordingly, an identical reference number for an identical constitution will be used.

That is, as shown in FIG. 43, the focus actuator 4300 comprises a compensation lens group 4200 consisting of a plurality of lenses to pass an image of an object with a specific magnification; a focus driving part for arranging the compensation lens group 4200 in a direction of an optical axis; a driving part 4360 for receiving a power source provided from the outside to generate a dynamic force moving in the direction orthogonal to the optical axis; a cam part for receiving the dynamic force of the driving part 4360 to transfer the focus driving part 4250 in the direction of the optical axis; and a controlling part 2000 for controlling the driving part 4360.

As shown in FIG. 42, the focus driving part 4250 comprises a first lens barrel 4210 combined with the compensation lens group in its interior and forming a first male screw on its outer circumference; and a second lens barrel 4220 forming a female screw 4222, which is screw-combined with the male screw 4212. A tool groove 4214 is formed on the first lens barrel 4210 to insert and to rotate a tool.

Figure 44:
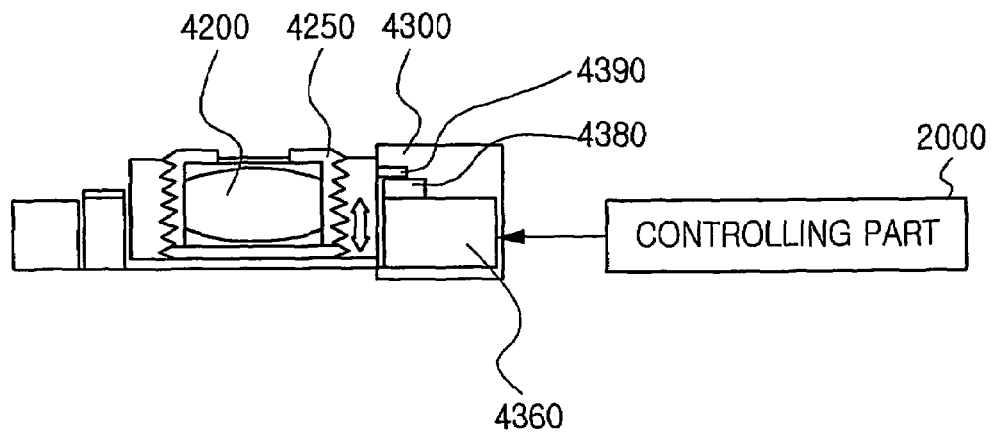
FIG. 44 is a longitudinal view showing the constitution of the first embodiment according to the focus actuator in FIG. 43.

Meanwhile, as shown in FIG. 44, the driving part 4360 comprises a yoke 4361*a*; a coil 4363*a* wounded on the yoke 4361*a* and receiving a power source from the controlling part 2000 for magnetizing the yoke 4361*a*; and a rotor 4365*a* rotatably installed on the yoke 4316*a* thereby facing the yoke 4316*a*, and consisting of a magnet rotating according to the direction to which the current applied to the coil 4363*a*.

The principle of rotating the rotor 4365*a* is similar to a step motor, and by controlling a phase of a voltage applied from the controlling to the coil 4363*a*, the rotor 4365*a* can be controlled by the direction rotating the rotor. The rotor 4365*a* is installed in the center of the rotation of the focus driving part 4250.

Figure 45:
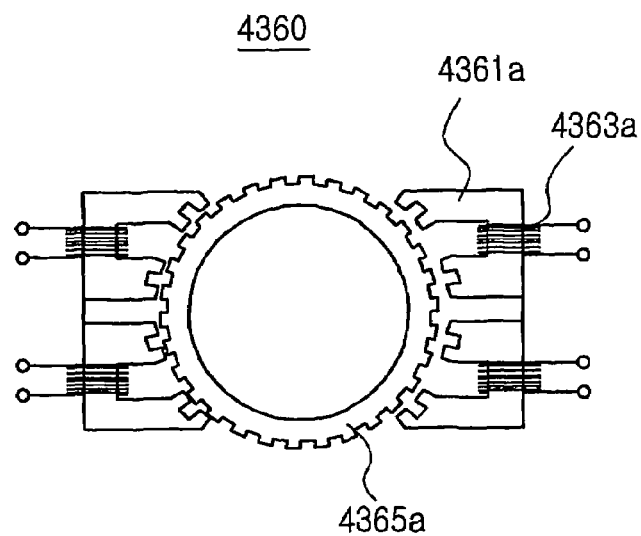
FIG. 45 is a longitudinal view showing the second embodiment according to the focus actuator in FIG. 43.

As shown in FIG. 45, the driving part 4360 according to the other embodiment of the present invention comprises a motor 4361*b* rotating by receiving a power source from a controlling part 2000; a spur gear 4362*b* combined with a rotating shaft 4365*b* of the motor 4361*b* to be rotated; and a rotor 4364*b* forming a gear tooth 4363*b* combined with the spur gear 4362*b*.

Figure 46:
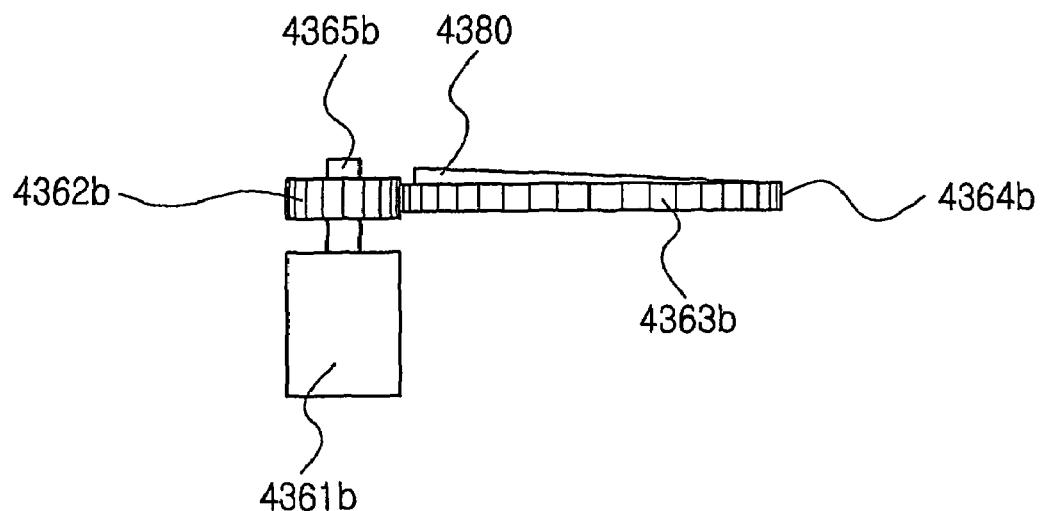
FIG. 46 is a longitudinal view showing the constitution of the third embodiment according to the focus actuator in FIG. 43.

Also, as shown in FIG. 46, the driving part 4360 comprises a motor 4361*c* rotating by receiving a power source from the controlling part 2000; a lead screw 4363*c* combined with a rotating shaft 4362*c* of the motor 4361*c*; and a screw holder 4364*c* combined with the lead screw 4363*c* to move in the direction orthogonal to an optical axis by rotation of the lead screw 4364*c*.

This focus actuator 4300 comprises a second restoration spring 4350 for restoring the focus driving part 4250 to the initial position.

Meanwhile, the cam part comprises an inclined surface 4380 formed on the driving part 4360 to ascend the focus driving part 4250 in the direction of the optical axis. The focus driving part 4250 further comprises a prominence 4390 contacting to the inclined surface 4380.

The operation of the focus driving part 4250 and the focus actuator 4300 having the above constitution will be explained.

If the power source of the controlling part 2000 is not applied to the driving part 4360, the focus driving part 4250 is fixed to the initial position by the restoration spring 4350.

If a user pushes a photographing button by the key pad installed on the communication apparatus, the controlling part 2000 photographs an object image passing the compensation lens group 4200. The photographing element (not shown) converts the photographed image to an electrical signal to transfer the image to the controlling part 2000 through a flexible PCV.

If the photographed image is unclear, the controlling part 2000, which received the image, applies a power source for adjusting focusing to a driving coil 701.

If the power source is supplied to the driving part 4360 shown in FIG. 44, the current is applied from the controlling part 2000 to the coil 4363*a* to magnetize the yoke, thereby rotating the rotor 4365*a* comprising the magnet. Accordingly, the inclined surface 4380 formed on the rotor 4365*a* ascends the prominence 4390 of the focus driving part 4250.

For the driving part 4360 shown in FIG. 45, when current is supplied from the controlling part 2000 to the motor 4361*b*, the spur gear 4362*b* combined with the rotating shaft 4365*b* of the motor 4361*b* is rotated to rotate the rotor 4364*b* by the gear tooth 4363*b*. Accordingly, the inclined surface 4380 formed on the rotor 4363*b* ascends the prominence 4390 of the focus driving part 4250.

For the driving part 4360 shown in FIG. 46, if the power source is supplied from the controlling part 2000 to the motor 4361*c*, the lead screw 4363*c* combined with the rotation shaft 4362 of the motor 4361*c* is rotated to move the screw holder 4364*c*. The screw holder 4364*c* moves along the guide shaft 4365*c* so that the inclined surface 4380 ascends the prominence of the focus driving part 4250.

Accordingly, since the compensation lens group 4200 is ascended or descended in the direction of the optical axis, the image photographed by the photographing element becomes clearer.

Figure 47:
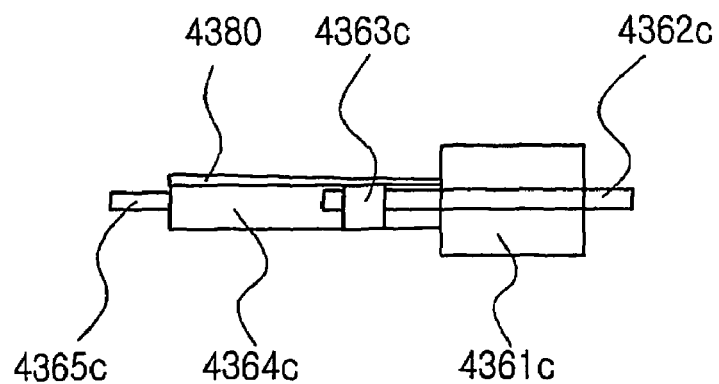
FIG. 47 is a longitudinal view showing the other embodiment of the focus driving part and the focus actuator in FIG. 43.

Meanwhile, FIG. 47 is the other embodiment of the focus actuator of FIG. 40. The focus actuator 4250 may comprise a piezoelectric element 4300 connected to the compensation lens group 4200 and the compensation driving part 4400, and receiving the current from the controlling part 2000 to drive the focus driving part 4250 in the direction of the optical axis.

Figure 48:
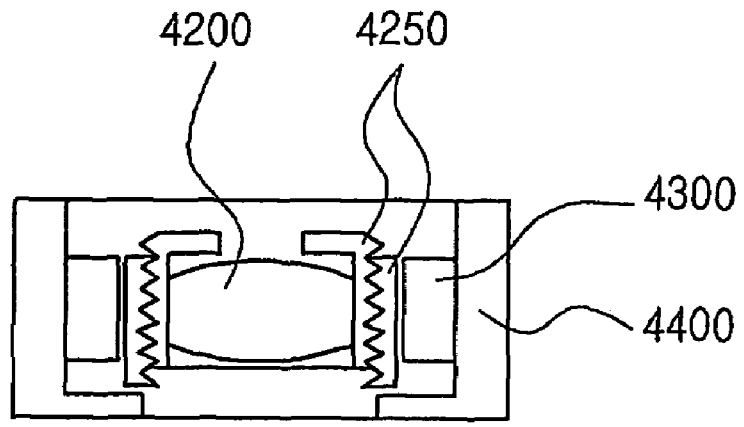
FIG. 48 is a view showing the constitution of the zoom actuator shown in FIG. 43.

FIG. 48 is a view showing the zoom actuator 4500 in FIG. 40. It schematically shows the function without the substantial shape, since various kinds of driving elements can be used to carry out the zoom actuator 4500.

Figure 49:
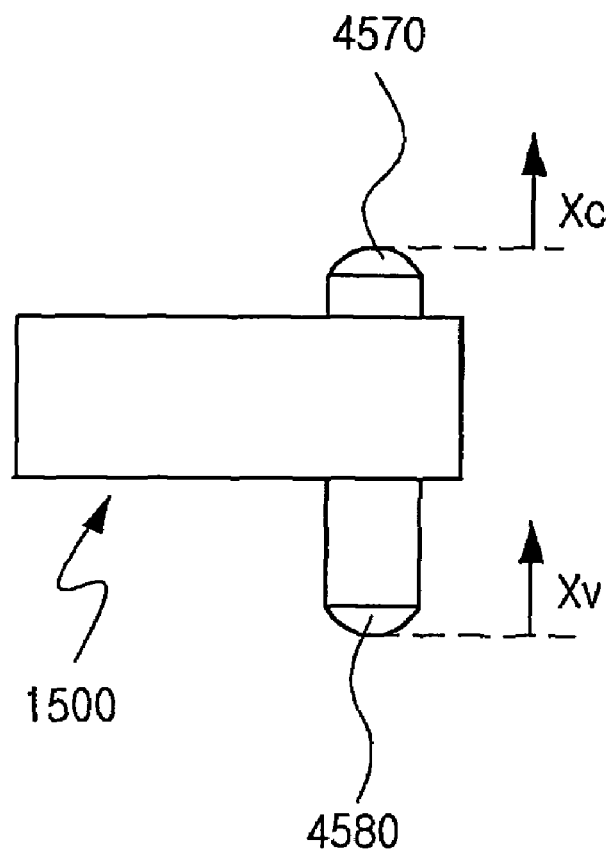
FIG. 49 is a view showing a moving trajectory, which is a zoom transition path of the displacement lens group for the zoom actuator in FIG. 48.

FIG. 49 is a view showing a moving trajectory of the zoom actuator and the displacement shown in FIG. 30. FIGS. 50-55 are views detailedly showing the constitutions of the zoom actuator 4500, the first zoom driving part 4400 and the second driving actuator 4700 shown in FIG. 48.

The zoom actuator 4500 shown in FIG. 48 comprises an actuation source; a compensation driving member 4570 for driving the compensation driving part 4400 to move the compensation lens group 4200 along the first moving trajectory 4202, which is the zoom transition path; and a zoom driving member 4580 for driving the zoom driving part 4700 to move the displacement lens group 4600 along the second moving trajectory 4602, which is the zoom trajectory path.

The actuation source comprises a rotation driving part 4510 for generating a rotation force by the control of the controlling part 2000; and a rotor 4500 rotated by receiving a dynamic force of the rotation driving part 4510.

The compensation driving member 4570 comprises a first inclined surface 4572 ascending the first zoom driving part 4400 by rotation of the rotor 4550 to move the compensation lens group 4200 along the first moving trajectory 4202, which is the zoom transition path.

In addition, the zoom driving member 4580 comprises a second inclined surface 4582 ascending the second zoom driving part 4700 by rotation of the rotor 4550 to move the displacement lens group 4600 along the second moving trajectory 4602, which is the zoom transition path.

Figure 50:
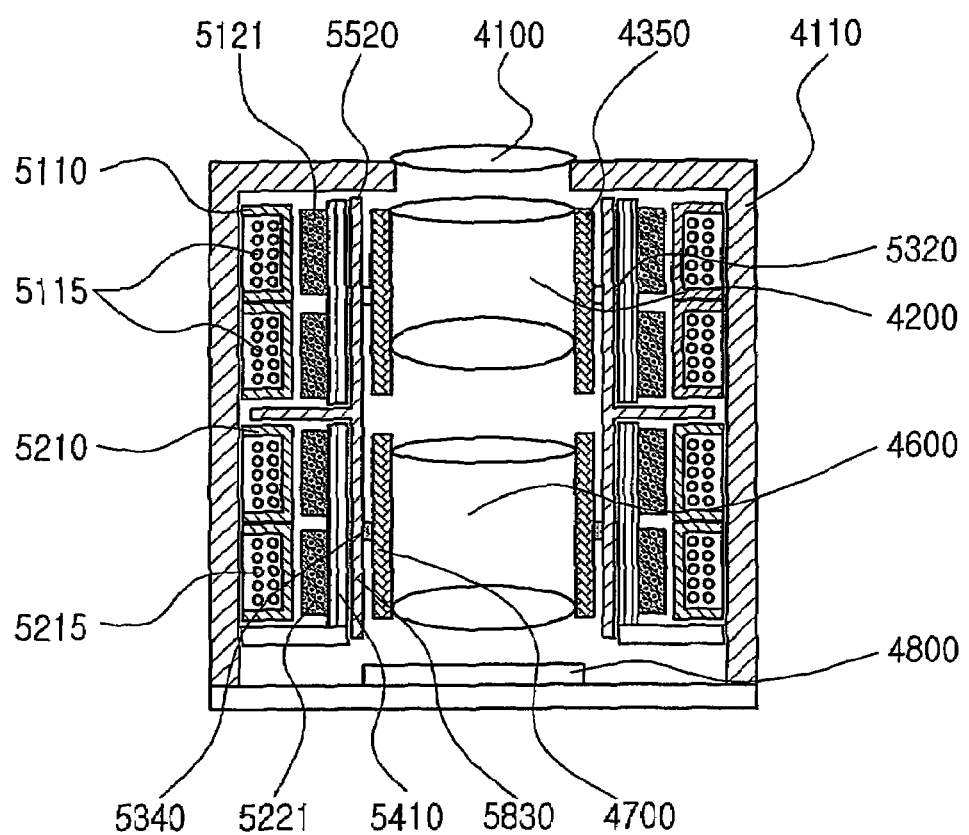
FIG. 50 is a view showing the first embodiment of the zoom actuator shown in FIG. 48.

FIG. 50 is a top view showing the actuation source of the zoom actuator shown in FIG. 48 detailedly, and FIGS. 51-55 is perspective views showing the constitution of the actuation driving part shown in FIG. 50.

In FIG. 50, the zoom actuator comprises a fixing lens group 4100; a fixed lens barrel 4110 to which a the fixing lens group 4100 is fixed; a compensation lens group 4200 in which the zoom magnification is varied according to a gap adjustment between the fixing lens group 4100; a compensation actuator for moving the compensation lens group 4200 along the first moving trajectory 4202, which is the zoom transition path; a displacement lens group 4600 in which the zoom magnification is varied according to a gap adjustment between the compensation lens group 420; a zoom actuator for moving the displacement lens group 4600 along the second moving trajectory 4202, which is the zoom transition path; a photographing element 4800 fixed to the fixed lens barrel 4110 for photographing an object image passing the fixing lens group 4100, the compensation lens group 4200 and the displacement lens group 4600; and a controlling part for controlling the compensation actuator, the zoom actuator and the photographing element 4800.

Figure 51:
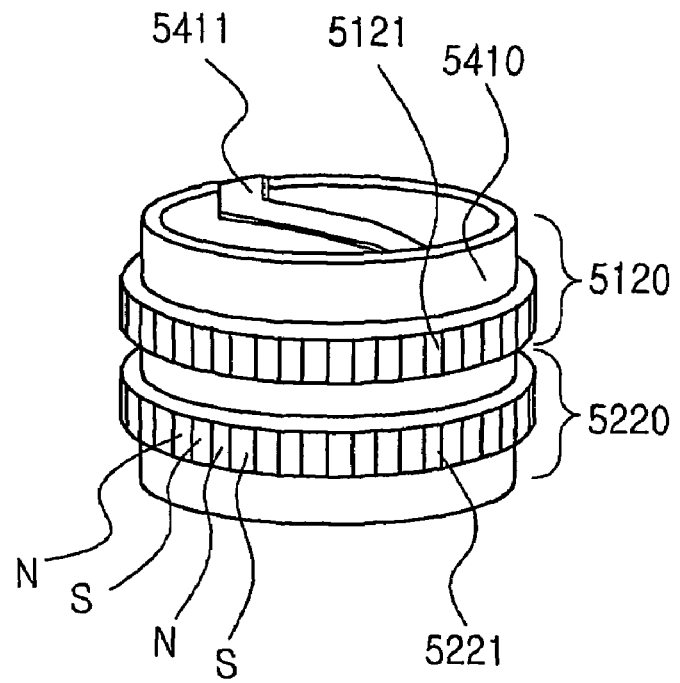
FIG. 51 is a perspective view showing the first zoom driving part, and the first rotator and the second rotator of the second zoom driving part shown in FIG. 50.
Figure 52:
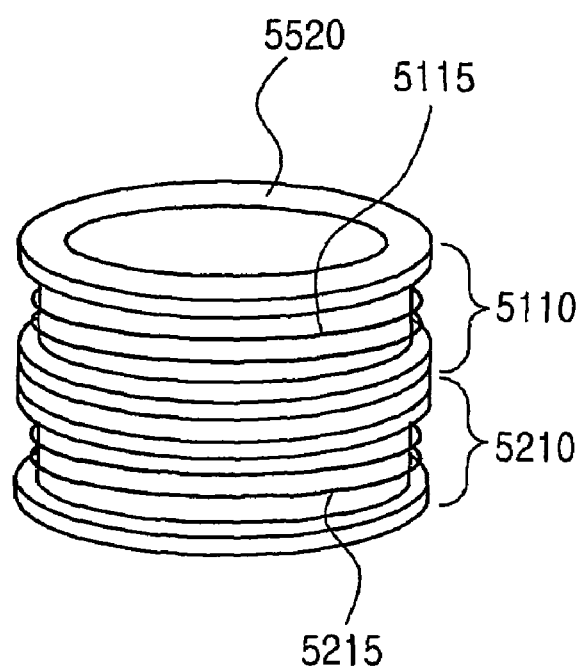
FIG. 52 is a perspective view showing a first stator of the constitution of the first zoom driving part and the first stator of the second zoom driving part shown in FIG. 50.
Figure 53:
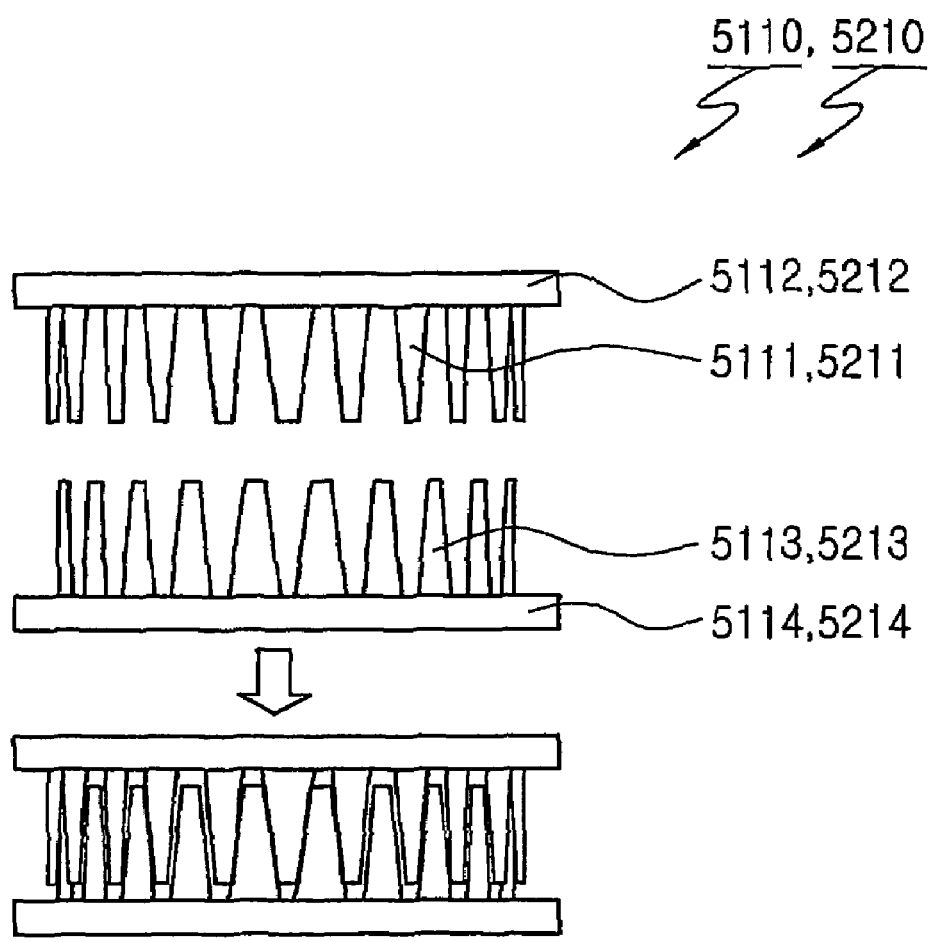
FIG. 53 is a view showing the exploded state of the zoom actuator shown in FIG. 50.

That is, FIG. 51 is a perspective view showing the constitution of the rotator of the zoom actuator shown in FIG. 50, and FIG. 52 is a perspective) view showing-the constitution of the stator of the zoom actuator if FIG. 50, and FIG. 53 is an exploded view of FIG. 52.

Figure 54:
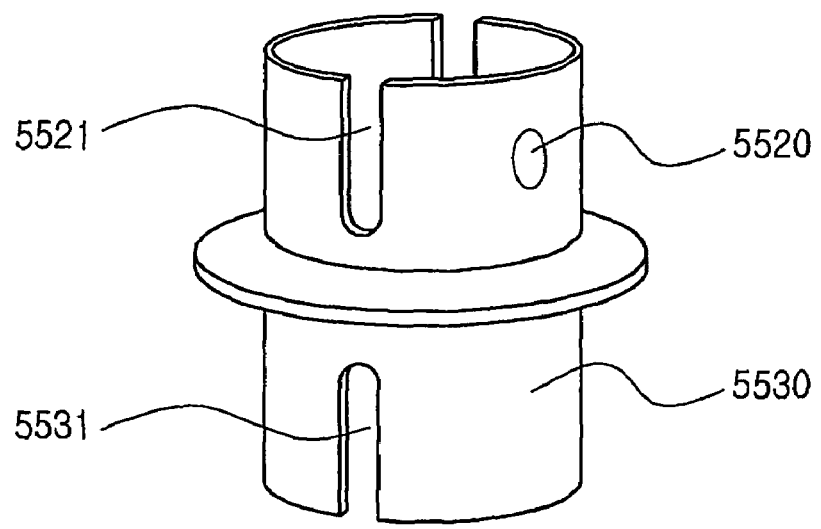
FIG. 54 is a perspective view showing the first zoom driving part, and the first guide barrel and the second guide and the second guide barrel shown in FIG. 50.
Figure 55:
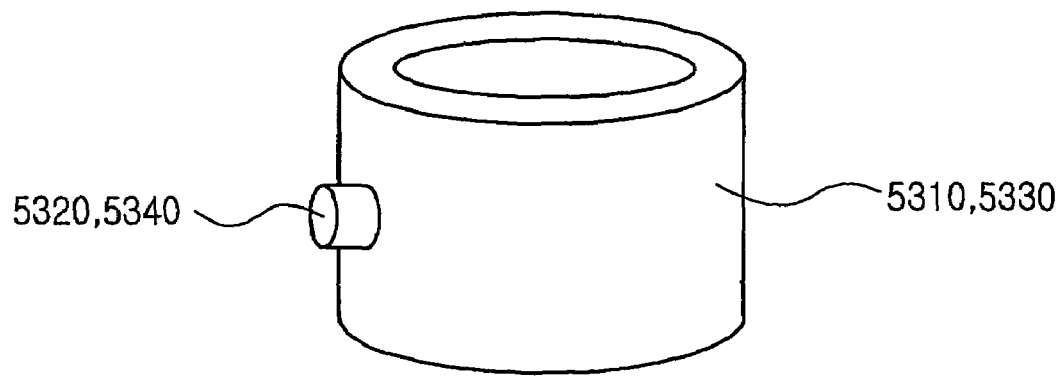
FIG. 55 is a perspective view showing the first zoom driving part, and the first lens barrel and the second lens barrel of the second zoom driving part.

Herein, the stator shown in FIG. 52 is constituted by laminating two members shown in FIG. 53. FIG. 54 is a perspective view showing the first guide barrel and the second guide barrel shown in FIG. 50. FIG. 55 is a perspective view of the first lens barrel and the second lens barrel shown in FIG. 50. The rotator shown in FIG. 51 and the stator shown in FIG. 52 become a pair to constitute an actuator, and the zoom actuator shown in FIG. 50 comprises two pairs of actuators.

As shown in FIGS. 51-55, the zoom actuator comprises a stator 5520 for receiving a power source from the controlling part and having coils to generate a magnetic field having first and second polarities, which are divided into a plurality of sections and which are alternated; two ring-shaped magnets 5121, 5221 which are integrally assembled and in which its polarity is divided into a first polarity and a second polarity, so as to be exposed to the magnetic field generated from the coils 5515, 5215; an assembly member 5410 for assembling the two ring-shaped magnets to have a 90 degree of phase; an upper part 5120 of the rotator 5410 for receiving a rotation force when current is applied to the first coil 5115; a lower part 5220 of the rotator for receiving a rotation force when current. is applied to the second coil 5215; a rotator assembling member 5410 for integrally assembling the two rotators to have 90 degree of phase difference with each other; a pair of a first rotator and a first stator for driving the compensation driving part; a first lens barrel 5310 for fixing the compensation lens group 5200; and a first cam part for converting the rotation force of the first rotator 5210 to a feed force in the direction of an optical axis to and transferring it to the first lens barrel.

As shown in FIG. 53, the stator is constituted by laminating two members, each layer comprising a magnetic substance 5112 having a plurality of upper cores 5111, which are respectively correspond to the identical first polarity divided from the magnets 5121, 5220; a magnetic substance 5114 having a plurality of lower cores 5113, which are respectively inserted into the upper cores 5111; and a coil 5115 wound on an outer circumference of a combined substance of the upper core 5111 with the lower core 5113.

The first rotator 5120 comprises a first rotation barrel forming a first trajectory groove 5411 consistent with the first moving trajectory.

The cam part comprises a first cam shaft 5320 fixed to the first lens barrel 5310 and inserted into the first trajectory groove 5411; and a first guide barrel 5520 forming a first slot 5521 for guiding the first cam shaft 5320 such that it only moves in the direction of the optical axis.

A pair of the second rotator and the second stator has the identical shape of the pair, of the first rotator and the first stator, and operates with the identical principle. The second rotator comprises a third lens barrel 5330 for fixing the zoom lens group 4600; and a second cam part for converting the rotation force of the second rotator 5220 to feed force in the direction of the optical axis to transfer it to the third lens barrel 5330.

The second rotator 5220 comprises a second rotation barrel 5530 forming a second trajectory groove consistent with the second moving trajectory.

The second cam part comprises a second cam shaft 5340 fixed to the fourth lens barrel 5320 and inserted into the second trajectory groove; and a second guide barrel 5530 forming a second slot for guiding the second cam shaft 5340 such that it only moves in the direction of the optical axis.

The key pad of the communication apparatus forming the above image photographing apparatus comprises a button for executing the zooming and a button for photographing an object image.

Meanwhile, the controlling part carries out the zoom variation by driving the first and second zoom actuators to move the compensation lens group 4200 along the first moving trajectory 4202, and by moving the displacement lens group 4600 along the second moving trajectory 4602.

When the user pushes the photographing button installed in the key pad of the communication apparatus, the controlling part 'drives the photographing element 4800 to photograph the image of the object passing the fixing lens group 4100, the compensation lens group 4200 and the displacement lens group 4600. The photographing element 4800 converts the photographed image to an electrical signal to transfer to the controlling part in the main frame through a flexible PCV.

Meanwhile, if the user wishes to change the magnification of the object image photographed on the photographing element 4800, the user pushes the button for executing the zooming function installed on the key pad.

Accordingly, the controlling part applies a power source to the first stator and the second stator of the compensation actuator and the zoom actuator to generate the magnetic field.

When the magnetic field is generated in the first stator, magnetic forces having a first polarity and a second polarity are respectively formed on an upper core 5111 and a lower core 5113 simultaneously, and the magnetic forces by the first and second polarities generate a rotary force in a clockwise rotation or a counter-clockwise rotation to the magnet 5121 according to the current applied to the stator. The stator divided into two portions of an upper part 5110, which cooperates with the upper magnet 5121 of the rotator, and a lower part 5210, which cooperates with the lower magnet 5221 of the rotator. The current having a pulse shape is applied to the two coils 5115, 5215 wound on the upper and lower parts of the stator by the above cooperations so that the two coils have a 90 degrees of phase, the stator rotates in a clockwise rotation or a counter-clockwise rotation.

As the first rotation barrel 5410 rotates, the first cam shaft 5320 having an end inserted into the first trajectory groove 5411 receives a force moving in the direction of the optical axis. The first cam shaft 5320 is guided to the first slot 5521 of the first guide barrel 5520 such that it only moves in the direction of the optical axis.

When the first cam shaft 5320 moves, the first lens barrel 5310 and the compensation lens group 4200 move in the direction of the optical axis. Accordingly, the compensation lens group 4200 moves along the first moving trajectory 4202, which is the zoom magnification transition path.

Meanwhile, the second stator and the second rotator have the constitution and the effect identical to those of the first stator and the first rotator to rotate the second rotation barrel 5420.

As the second rotation barrel 5420 rotates, the second cam shaft 534 0 having an end inserted into the second trajectory groove receives a force moving in the direction of the optical axis. The second cam shaft 4340 is guided to the second slot 5531 of the second guide barrel 5530 and drives only in the direction of the optical axis.

Meanwhile, when the second cam shaft 5340 moves, the third lens barrel 5330 and the compensation lens group 4200 move in the direction of the optical axis. Accordingly, the compensation lens group 4200 moves along the second moving trajectory 4602, which is the zoom magnification transition path.

As explained above, the zoom magnification by the fixing lens group 4100, the compensation lens group 4200 and the zoom lens group 4600 changes.

Figure 56:
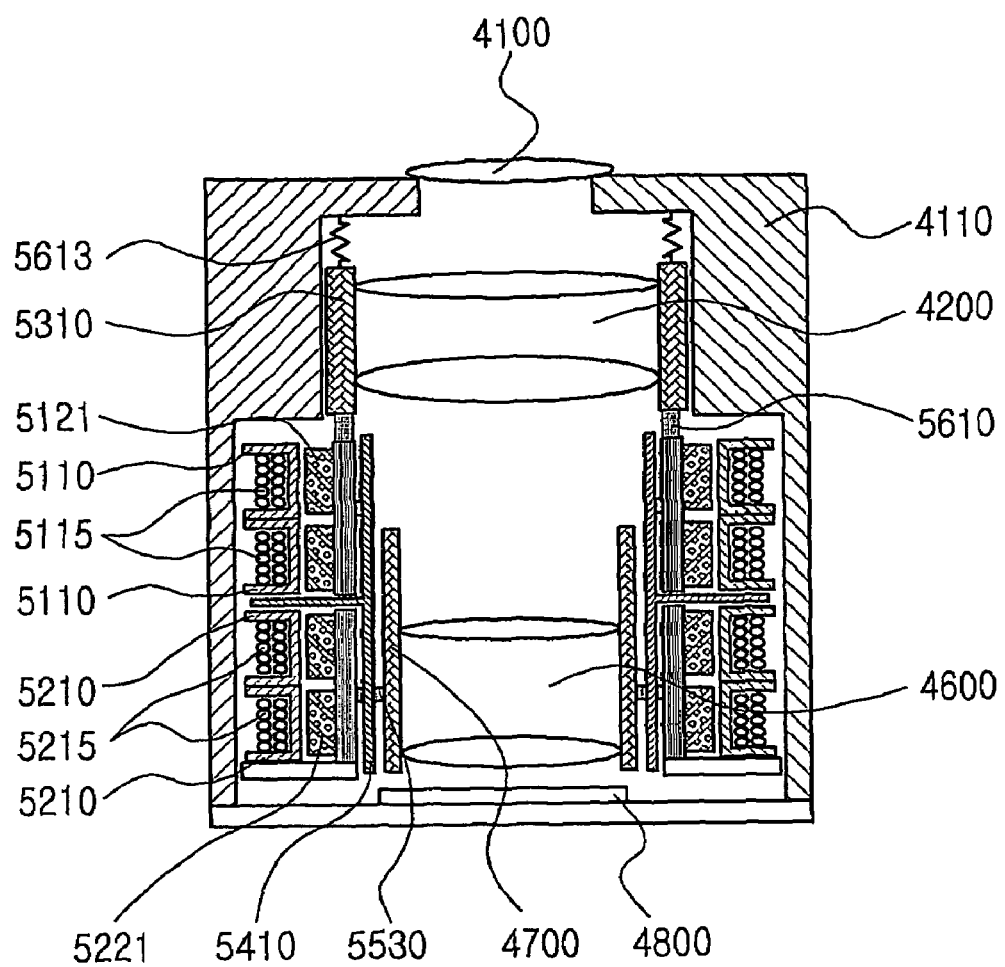
FIG. 56 is a view showing the other embodiment of the first cam part in the zoom actuator shown in FIG. 48.
Figure 57:
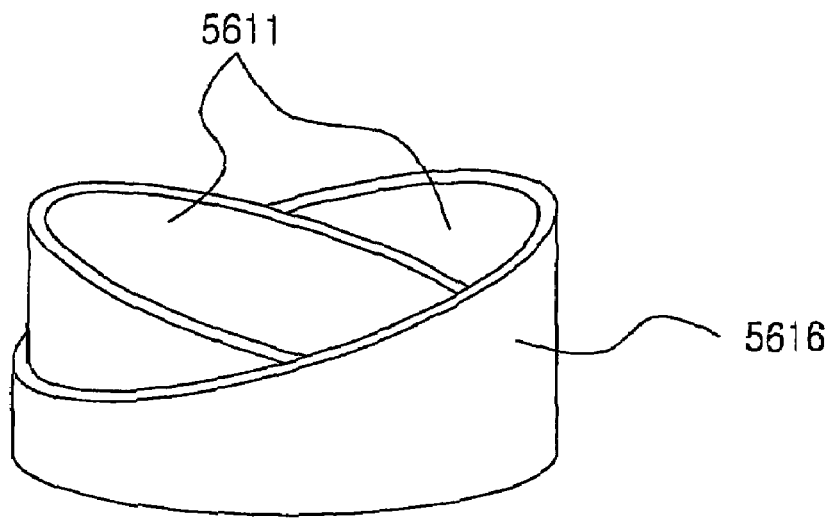
FIG. 57 is a perspective view of a cam barrel shown in FIG. 56.

FIG. 56 is a view showing the second embodiment of the zoom actuator shown in FIG. 50, and FIG. 57 is a perspective view showing the cam part of the compensation actuator shown in FIG. 56. FIG. 56 shows the other embodiment of the first cam part of the image photographing apparatus shown in FIG. 50, and FIG. 57 is a perspective view of the cam barrel shown in FIG. 56.

The first cam part shown in this figure comprises a cam barrel 5610 formed on a cross-section of the first rotation barrel 5410 and forming a cam surface 5611 for moving the first lens barrel 5310 along the first moving trajectory; and an elastic member generating a predetermined elasticity for pushing the first lens barrel 5310 to the cam barrel 5610.

The cam surface 5611 is formed as a double row in the symmetrical position, and two first lens barrels 5310 are installed, said lens barrels respectively contacting to the cam surface 5611. Accordingly, the cam barrel 5610 can make 360-degree rotation. The elastic member consists of a compression spring 5613.

By the cam barrel 5610 formed on the first lens barrel 5310, the radius of the first lens barrel 5310 becomes larger. Accordingly, the radius of the compensation lens group 4200 fixed in the first lens barrel 5310 can become larger. Thus, a high quality of image can be photographed.

Figure 58:
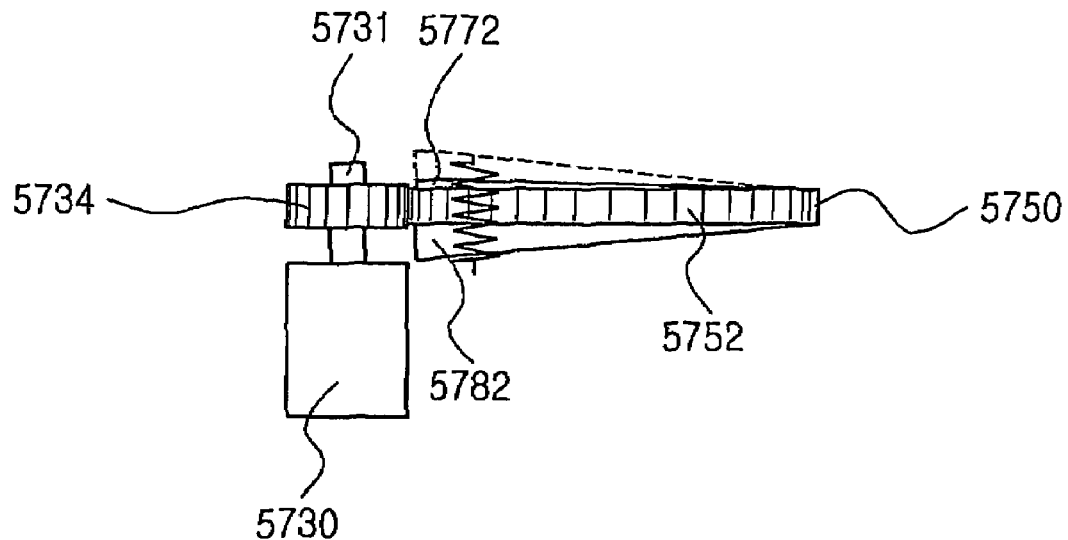
FIG. 58 is a view showing the other embodiment of the driving source of the zoom actuator shown in FIG. 43.
Figure 59:
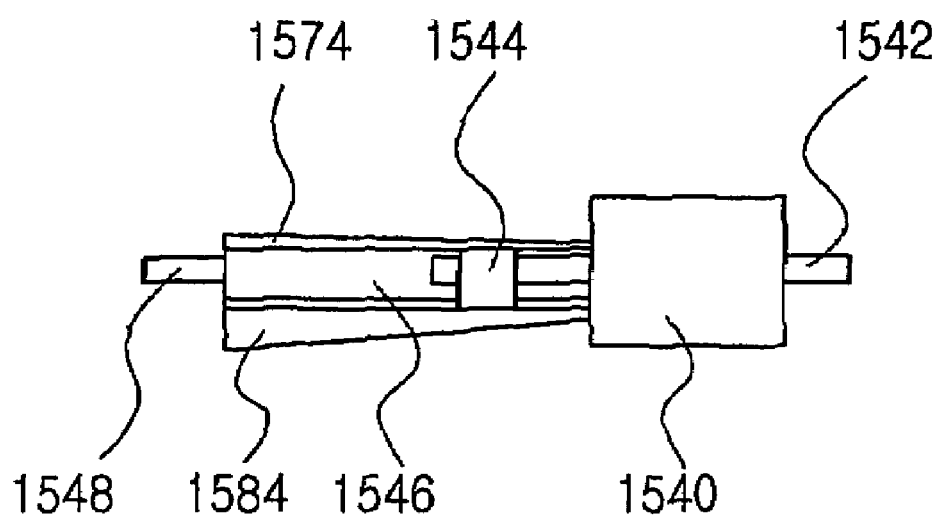
FIG. 59 is a view showing the other embodiment of the driving source of the zoom actuator shown in FIG. 43.

FIG. 58 is a view showing the second embodiment of the zoom actuator shown in FIG. 50, and FIG. 59 is a view showing the third embodiment of the zoom actuator shown in FIG. 50.

That is, as shown in FIG. 58, the other embodiment of the zoom actuator comprises a motor 5730 rotated by receiving a power source from the controlling part; a spur gear 5734 combined with a center shaft 5731 of the motor 5730 to be rotated; and a rotor 5750 forming a gear tooth combined with the spur gear 5764.

As shown in FIG. 59, the other embodiment of the zoom actuator comprises a motor 5840 rotated by receiving a power source from the controlling part; a lead screw 5844 combined with a rotation shaft 5852 of the motor 5840; and a screw holder 5846 combined with the lead screw 5844 to move in the direction orthogonal to the optical axis by rotation of the lead screw 5844. The screw holder 5846 comprises a guide shaft 5848 for guiding the movement of the screw holder 5846.

The compensation driving member 5870 comprises a third inclined surface 6874 formed on the screw holder 5846 and ascending the compensation driving part 4400 in the direction of the optical axis when the screw holder 5846 moves in the direction orthogonal to the optical axis in order to move the compensation lens group 4200 along the first moving trajectory 4202, which is the zoom transition path.

Also, the second zoom driving member 4700 comprises a fourth inclined surface 6874 formed on the screw holder 5846 and ascending the second zoom driving part 4700 in the direction of the optical axis when the screw holder 5846 moves in the direction orthogonal to the optical axis in order to move the second zoom lens group 4700 along the second moving trajectory 4602, which is the zoom transition path.

Hereinafter, the operation of the image photographing apparatus according to the third embodiment of the present invention having the above constitution will be explained.

First of all, if the power source is not applied from the controlling part to the focus actuator 4300, the focus actuator 4300 is fixed to the initial position by the restoration spring 4350.

If the user pushes the photographing button on the key pad installed on the communication apparatus, the controlling part drives the photographing element 4800 to photograph the object image passing the fixing lens group 4100, the compensation lens group 4200 and the displacement lens group 4600. The photographing element 4800 converts the photographed image to an electrical signal to transfer it to the controlling part 2000 in the main frame through a flexible PCV.

If the photographed image is not clear, the power source for the focusing adjustment is applied to the focus actuator 4300.

For the focus actuator shown in FIG. 41, when the current is applied to the driving coil 4310, a driving force which ascends or descends the compensation lens group 4200 in the direction of the optical axis by repulsive force of the magnetic flux of the magnet 4320 generated in the driving coil 4310. Due to the driving force, the position of the compensation lens group 4200 is finely varied so that the image photographed on the photographing element 4800 can become clearer.

Meanwhile, if the user pushes the zoom photographing button on the key pad installed on the communication apparatus, the controlling part drives the zoom actuator 4500 to execute the zoom mode which varies the position of the compensation lens group 4200 and the displacement lens group 4600.

For the zoom actuator 4500 shown in FIGS. 50-59, the controlling part carry out the zoom transition by driving the first and the second zoom actuators to move the compensation Lens group 4200 along the first moving trajectory 4202, and by moving the displacement lens group 4600 along the second moving trajectory 4602.

For the zoom actuator 4500 shown in FIG. 58, if the current is supplied from the controlling part to the motor 5730, the spur gear 5734 combined with the center shaft 5732 of the motor 5730 rotates to rotate the rotor 5750 through the gear tooth 5752. Accordingly, the first inclined surface 5772 formed on the rotor 5750 moves the compensation driving part 4400 along the first moving trajectory 4202.

For the zoom actuator 4500 shown in FIG. 59, if the power source is supplied from the controlling part to the motor 5840, the lead screw 5844 combined with the rotation shaft 5842 of the motor 5840 rotates to move the screw holder 5846. The screw holder 5846 moves along the guide shaft 5848 so that the third inclined surface 5874 moves the first zoom driving part 4400 along the first moving trajectory 4202, and the fourth inclined surface 5884 moves the second zoom driving part 4700 along the second moving trajectory 4602.

As such, the zoom mode is executed which enlarges the object image passing the fixing lens group 4100, the compensation lens group 4200 and the zoom lens group 4600 to be photographed.

After executing the zooming function, the photographing element 4800 converts the photographed image to the electrical signal and transfer it to the controlling part in the main frame through a flexible PCV, and the controlling part drives the focus actuator after the zooming function to make the image quality clearer.

Figure 60:
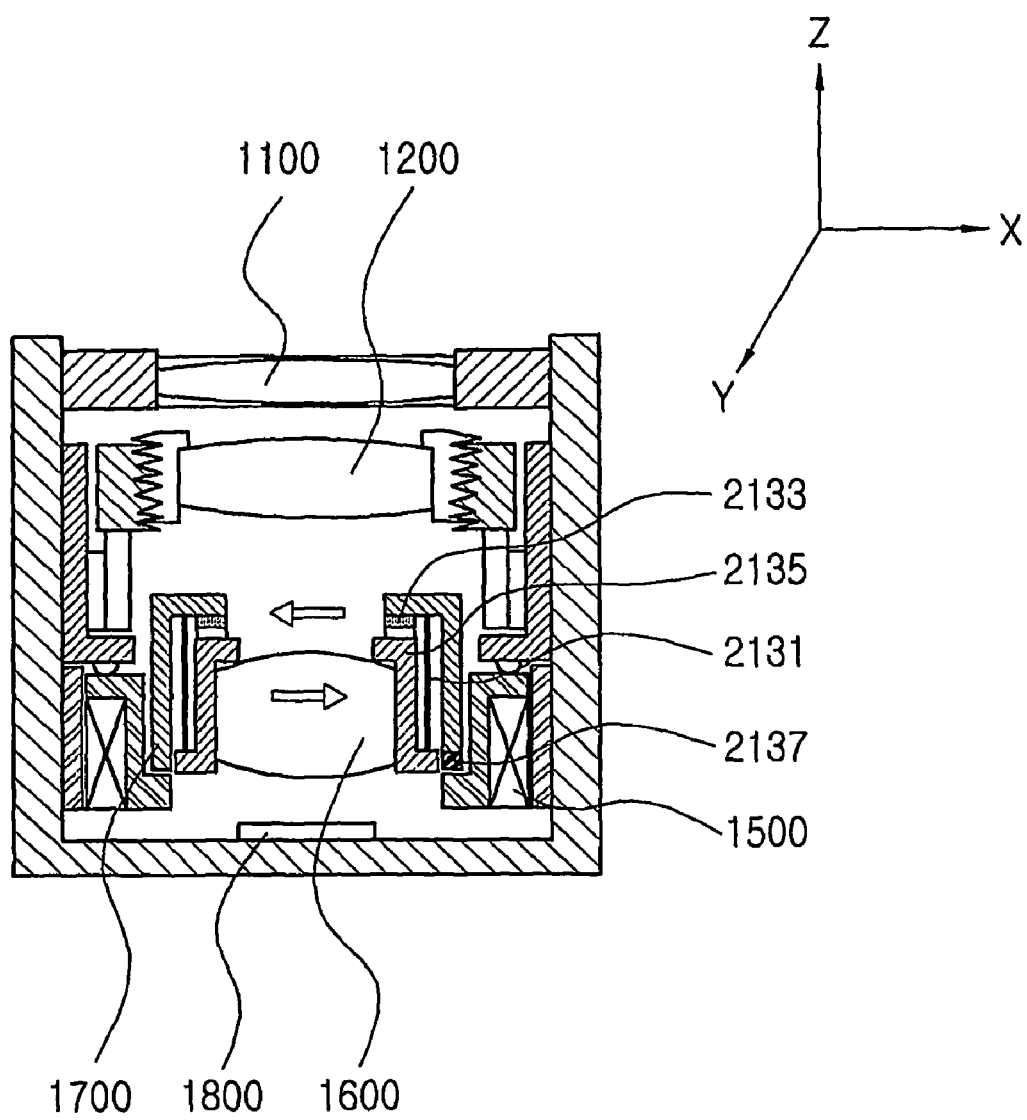
FIG. 60 is a longitudinal view showing the state that the compensation actuator is installed in the displacement lens group of FIG. 43.

FIG. 60 is a view showing the state of the compensation driving part 2611, the compensation suspension member 2613 and the compensation actuator 2615 which are supported by the displacement lens group 4600 to be installed.

In FIG. 60, the degree of the diffusion of the image to the quantity of hand trembling depends on the distance between the object. That is, the distance between the object is calculated by using the substantial quantity of the hand trembling to the driving quantity according to the distance between the object and the driving quantity of the compensation actuator 2615 is adjusted by using the substantially calculated driving quantity of the compensation actuator to the hand trembling. Since the operation of FIG. 60 is identical to the compensation driving part 2615, the compensation suspension member 2611, the compensation actuator 2615, the displacement sensor 2617 and the servo controller 2619 shown in FIG. 26, the detailed explanation thereof will be omitted.

To change the zoom magnification consisting of the compensation lens group 4200 and the displacement lens group 4600, the controlling part applies the power source to the zoom actuator 4500 by the user's operation to move the compensation lens group 4200 along the first moving trajectory, and drives the second zoom driving part 4700 to move the displacement lens group 4600 along the second moving trajectory, thereby carrying out the zoom transition.

Meanwhile, during photographing the image of the object, the hand trembling of the user holding the photographing apparatus is transferred to the displacement lens group 4700, the displacement lens group 4600 maintaining the holding state by the compensation suspension member 2611 moves in the X direction orthogonal to the optical axis.

At this time, the displacement sensor 2617 installed in the second zoom driving part 4700 senses the movement of the second zoom driving part 4700, where the displacement lens group 4600 is fixed, and transfer the movement to the servo controller 2619.

When the servo controller 2619 considers that the displacement lens group 4600 moves in the X direction, it drives the compensation actuator 2613 to move the compensation driving part 2615 in the direction opposite to the direction that the displacement lens group 4.600 moves in order to restore the displacement lens group 4600 to the original state.

As such, although the hand trembling is transferred to the displacement lens group 4600, the displacement lens group 4600 always stays in the reference position by canceling movement of the compensation actuator 2613. Thus, the image of the object passing the displacement lens group 4600 to be photographed on the photographing element 4800 becomes always clear.

Fourth Embodiment

Figure 61:
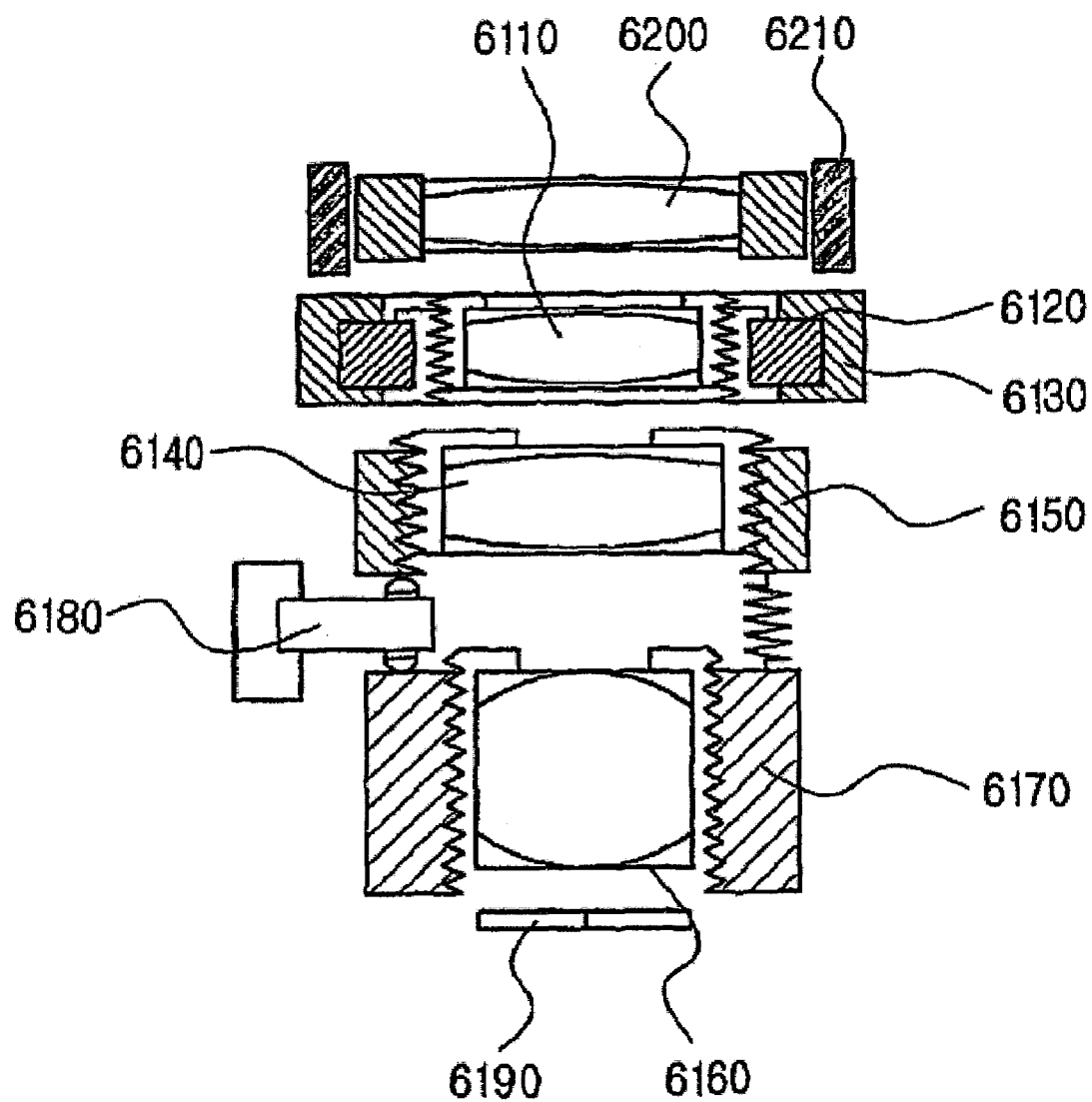
FIG. 61 is a view showing the constitution of an image photographing apparatus according to the third embodiment of the present invention.

FIG. 61 is a view showing the constitution of the image photographing apparatus according to the fourth embodiment of the present invention comprises, a focus lens group 6110; a focus actuator 6120 for adjusting the focusing of the focusing lens group 6110; a fixing part 6130 for supporting the focus actuator 6120; a compensation lens group 6140; a third zoom driving part 6150 for supporting the compensation lens group 6140; a displacement lens group 6160; a second zoom driving part 6170 for supporting the displacement lens group 6160; a zoom actuator 6180 for driving the third zoom driving part 6150 to move the compensation lens group 6140 along the first moving trajectory, and for driving the second zoom driving part 6170 to move the displacement lens group 6160 along the second moving trajectory; a photographing element 6190 for photographing an object image passing the compensation lens group 6140 and the displacement lens group 6160; and a controlling part for controlling the focus actuator 6120, the zoom actuator 6180 and the photographing element 6190.

The photographing element further comprises a fixing lens barrel 6210 for supporting the fixing lens group 6200.

Also, the image photographing apparatus comprises a focus driving part 6120 between the focus lens group 6110 and the focus actuator 6130. The focus driving part 6120 and the focus actuator 6130 have the constitution which is identical to the focus actuator 4300 shown in FIGS. 41-47, and the zoom actuator 6180 has the constitution identical to the zoom actuator shown in FIG. 59. Thus, the detailed explanation thereof will be omitted.

Though, the third zoom driving part 6150 comprises a fifth lens barrel combined with the compensation lens group 6140 in its interior and forming a third male screw on its outer circumference; and a sixth lens barrel forming a third female screw which is screw-combined with the third mail screw.

The image photographing element according to the fourth embodiment constituted as the above has the operation which is identical to the third embodiment of the present invention. Thus, the detailed explanation thereof will be omitted.

If the user pushes a photographing button on the key pad installed on the communication apparatus, the controlling part drives the photographing element 4800 to photograph the object image passing the fixing lens group 6200, the focusing Lens group 6110, the compensation lens group 6140 and the displacement lens group 6160. The photographing element 6190 converts the photographed image to an electrical signal to transfer it to the controlling part (not shown) in the main frame through a flexible PCV.

Figure 62:
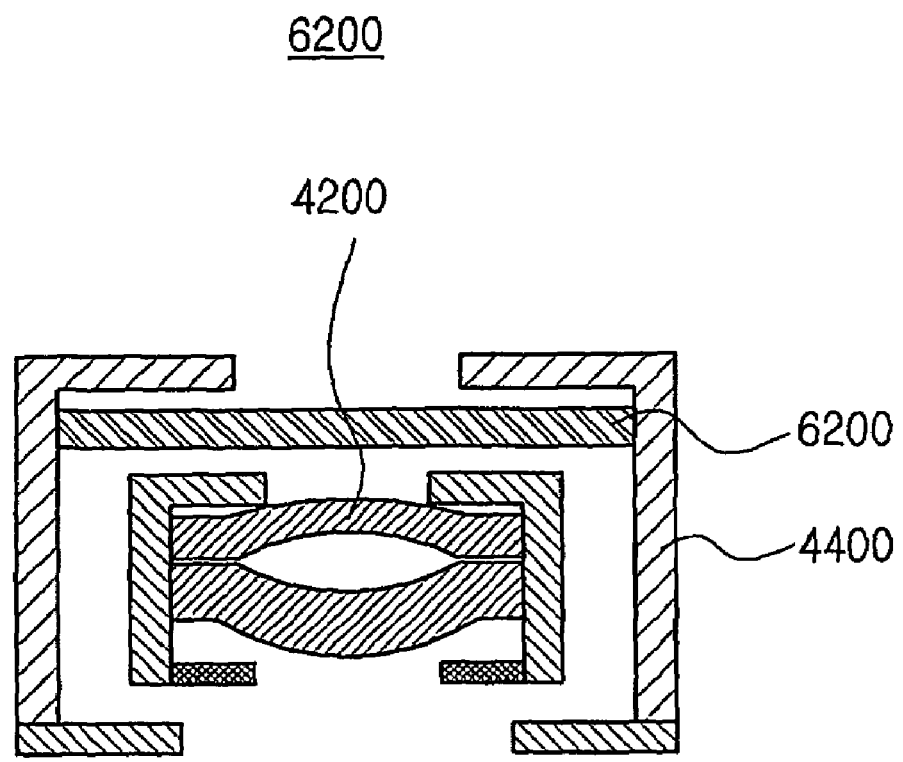
FIG. 62 is a longitudinal view showing the state that a shutter device is mounted on the image photographing apparatus shown in FIG. 43.
Figure 63:
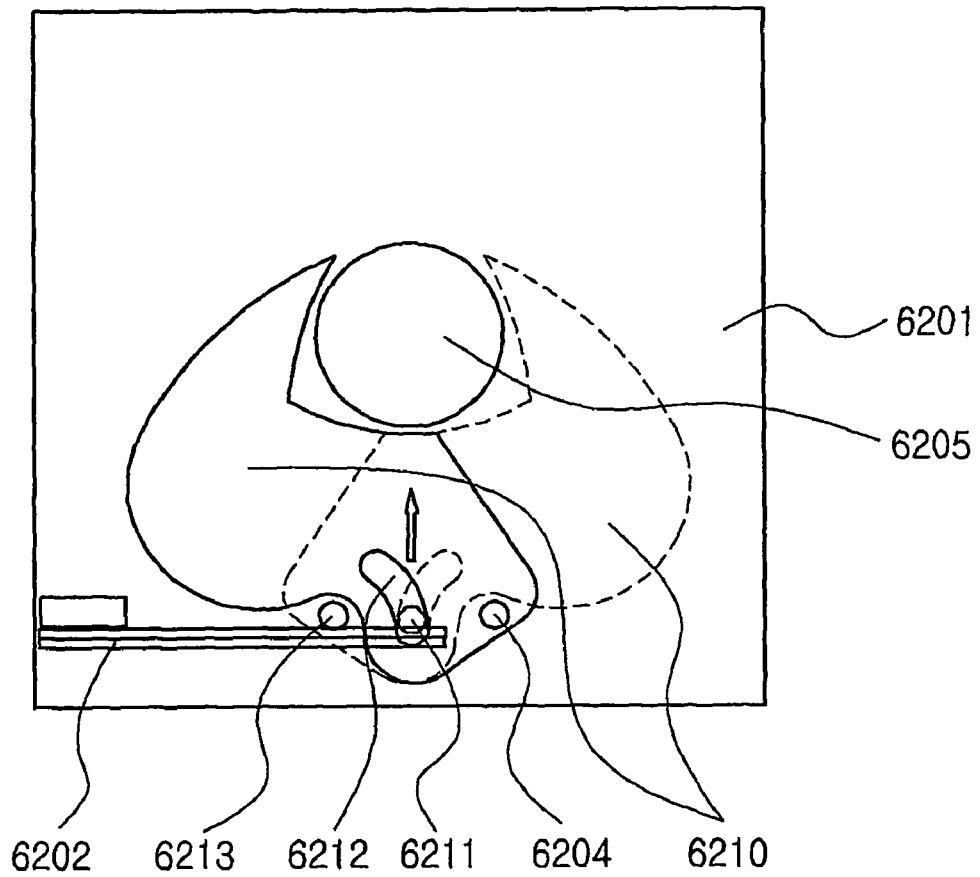
FIG. 63 is a schematic plan view.
Figure 64:
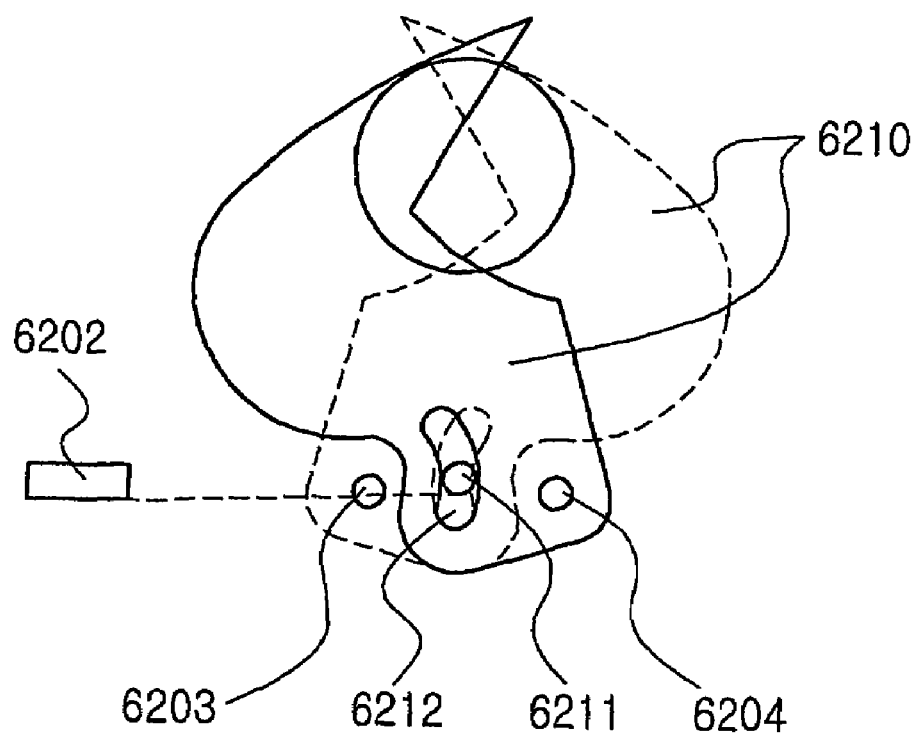
FIGS. 64 and 65 are views showing the using state of the shutter device shown in FIG. 62.
Figure 65:
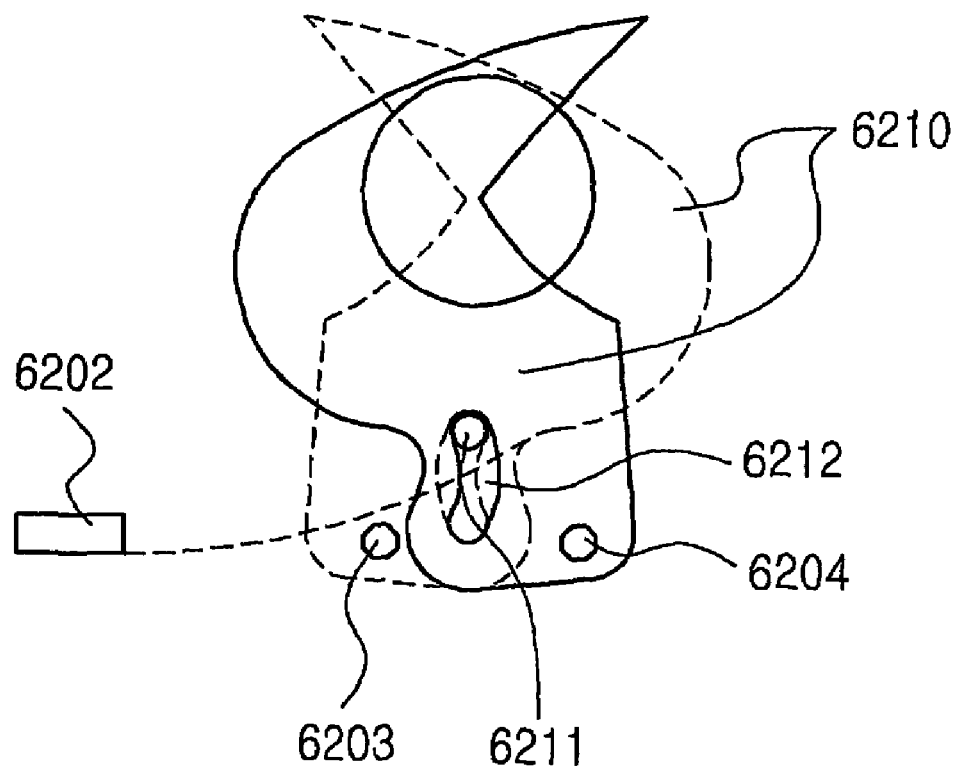

FIG. 62 is a view showing the shutter device 5200 installed between the compensation lens group 607 and the focus driving part 608 of the image photographing apparatus shown in FIG. 6, or installed between the compensation lens group 4200 and the first zoom driving part 4300 of the image photographing apparatus shown in FIG. 40. FIG. 63 is a view showing a plane view showing the constitution of the shutter device 6200, and FIGS. 64 and 65 are views showing the operation state of the shutter device 6200 shown in FIG. 63.

The shutter device 6200 of the present embodiment installed on the image photographing apparatus shown in FIG. 40 comprises a base 6201 fixed to the first zoom driving part 4400 and having a through-hole passing light to the compensation lens group 4200; a shutter part axially supported by the base 6201; a piezo ceramic driving part 6202 for driving the shutter part by receiving a power source; and a controlling part for supplying the power source to the piezo ceramic driving part 6202.

The piezo ceramic driving part 6202 has a shape of combining two materials having an expansion ratio of volume differentiated by supplying of the power source. The piezo ceramic driving part 6202 generates a displacement that the material having the higher expansion ratio bends to the material having the lower expansion ratio. The shutter part drives by using such property.

In addition, the shutter part comprises a shutter plate 6210 forming a rotation hole 6204 which is rotatably combined with a hinge shaft 6203 formed on the base 6201, and which opens and closes the light through-hole 6205 by rotational motion.

Herein, each pair of the shutter plates 6210 is installed on the opposite position based on the light through-hole 6205 to simultaneously open and close the light through-hole 6205 at both sides by the operation of the piezo ceramic driving part 6202.

Each shutter plate 6210 is axially supported in the base 6201 and forms a cam hole 6212 combined with a driving shaft 6211 of the piezo ceramic driving part 6202. When the driving shaft 6211 performs a straight line motion, each shutter plate 6210 performs a rotational motion to open and close the light through-hole 6205.

At this time, the controlling part functions as an iris which closes narrow limits of the light through-hole 6205 by applying a small amount of the power source to the piezo ceramic driving part 6202 to drive the shutter part within narrow limits, and the controlling part functions as a shutter which closes the light through-hole 6205 by applying a large amount of the power source to the piezo ceramic driving part 6202 to drive a large range of the shutter part.

Hereinafter, the operation of the shutter device having the above constitution will be explained by referring to FIGS. 64 and 65.

In order to photograph an image of an object, the shutter device 6200 fully opens the light through-hole 6205 so that the light can pass through the compensation lens group 4200. Thus, the image of the object can be brightly photographed in the photographing element.

At this time, the power source is not applied from the controlling part to the piezo ceramic driving part 6202, and a pair of the shutter plates 6210 maintains the opening state of the light through-hole 6205.

Meanwhile, when photographing the image of the object, as shown in FIG. 65, the shutter device 6200 instantaneously block the light to the compensation lens group 4200.

This process is as follows, first of all, the power source is applied from the controlling part to the piezo ceramic driving part 6202, the piezo ceramic driving part 6202 is bent, thereby moving the driving shaft 6211, and the driving shaft 6211 pushes the cam hole 6212 of a pair of shutter plates 6210. Accordingly, a pair of the shutter plates 6210 comes together at the both sides of the light through-hole 6205, thereby closing the light through-hole 6205. As such, since the two shutter plates 6210 are simultaneously come together from the both sides of the light through-hole, the light to the light through-hole 6205 can be blocked fast.

The image quality of the suspended image depends on the speed of the shutter device 6200. The shutter device 6200 of the present embodiment maximizes the moving speed of the shutter plate due to its, simple structure. Thus, a good quality of the suspended image can be photographed.

Meanwhile, in order to open the light through-hole 6205 after completing the photographing of the image, the controlling part blocks the power source supplied to the piezo ceramic driving part 6202. Accordingly, the piezo ceramic driving part 6202 is restored to the original state, and the driving shaft 6211 pushes the cam hole 6212 of a pair of the shutter plates 6210 in the converse direction. Thus, a pair of the shutter plates 6210 opens the light through-hole 6205.

Meanwhile, depending on the kind of the image photographing device, some parts of the light through-hole 6205 can be closed first to reduce the light quantity as shown in FIG. 65 without closing the light through-hole 6205 at once, and then the whole light through-hole 6205 is closed again. In this case, the controlling part functions as the iris first, which closes the light through-hole 6205 within narrow limits by applying a small amount of the power source to the piezo ceramic driving part 6202 to drive the shutter part within narrow limits. Then, the controlling part functions as the shutter which closes the whole light though hole 6205 by applying a large amount of the power source to the piezo ceramic driving part 6202 drive a large range of the shutter part.

Although the invention has been shown and described with respect to the specific preferred embodiments, it will be understood by those skilled in the art that various changes and modifications may be made without departing from the spirit and scope of the invention as defined in the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An image photographing apparatus comprising:
   a compensation lens group;
   a focusing driving part for fixing the compensation lens group, the focus driving part comprising: (i) a first lens barrel combined with the compensation lens group in its interior and forming a first male screw on its outer circumference; (ii) a second lens barrel combined with a focus actuator in its exterior and forming a first female screw, which is screw-combined with the first male screw on its inner circumference; and (iii) a tool groove installed on the first lens barrel to insert and rotate a tool;
   a focus actuator transferring the focusing driving part to an optical axis for controlling the focus of the compensation lens group;
   a fixing part for supporting the focus actuator;
   a photographing element for photographing an image of an object passing the compensation lens group; and
   a controlling part for controlling the focus actuator and the photographing element.

2. An image photographing apparatus comprising:
   a compensation lens group;
   a focus actuator for controlling the focusing of the compensation lens group;
   a first zoom driving part for supporting the focus actuator, the first zoom driving part comprising: (i) a first lens barrel combined with the compensation lens group in its interior and forming a first male screw on its outer circumference; and (ii) a second lens barrel combined with a focus actuator in its exterior and forming a first female screw, which is screw-combined with the first male screw on its inner circumference;
   a displacement lens group;
   a second zoom driving part for supporting the displacement lens group, the second zoom driving part comprising: (i) a third lens barrel combined with the displacement lens group in its interior and forming a second male screw on its outer circumference; and (ii) a fourth lens barrel combined with the focus actuator in its exterior and forming a second female screw, which is screw-combined with the first male screw on its inner circumference, at least one of the first lens barrel and the third lens barrel having a tool groove installed thereon to receive and rotate a tool inserted into the tool groove;
   a zoom actuator for driving the first zoom driving part to move the compensation lens group along a first moving trajectory, which is a zoom transition path, and driving the second zoom driving part to move the displacement lens group along a second moving trajectory, which is a path of a zoom transition path;
   a photographing element for photographing an image of an object passing the compensation lens group and the displacement lens group; and
   a controlling part for controlling the focus actuator, the zoom actuator and the photographing element.

3. An image photographing apparatus comprising:
   a focus lens group;
   a focus actuator for adjusting the focusing of the focusing lens group;
   a focus driving part between the focusing lens group and the focus actuator, wherein the focus driving part comprises: (i) a first lens barrel combined with the compensation lens group in its interior and forming a first male screw on its outer circumference; (ii) a second lens barrel combined with the focus actuator in its exterior and forming a first female screw, which is screw-combined with the first male screw on its inner circumference; and (iii) a tool groove installed on the first lens barrel to insert and rotate a tool;
   a fixing part for supporting the focus actuator;
   a compensation lens group;
   a first zoom driving part for supporting the compensation lens group;
   a displacement lens group;
   a second zoom driving part for supporting the displacement lens group;
   a zoom actuator for driving the first zoom driving part to move the compensation lens group along a first moving trajectory, and for driving the second zoom driving part to move the displacement lens group along a second moving trajectory;
   a photographing element for photographing an object image passing the compensation lens group and the displacement lens group; and
   a controlling part for controlling the focus actuator, the zoom actuator and the photographing element.

4. The image photographing apparatus of claim 3, the focus actuator comprising:
   a driving coil wound on one side of the focus driving part or the first zoom drifting part to be fixed, the driving coil having a flat part and being configured to receive current from the controlling part; and a magnet fixed to one side of the focus driving part or the first zoom driving part, wherein the polarity of the magnet is divided so that the magnetic flux passes over the flat part of the driving coil.

5. The image photographing apparatus of claim 4, the focus actuator comprising a restoration spring for restoring the focus driving part to an initial position.

6. The image photographing apparatus of claim 4, further comprising a yoke on a side of the magnet for circulating the magnetic flux.

7. An image photographing apparatus comprising:
a compensation lens group;
a focus driving part for fixing the compensation lens group;
a focus actuator transferring the focusing driving part to an optical axis for controlling the focus of the compensation lens group, the focus actuator comprising: (i) a driving coil wound on one side of the focus driving part or the first zoom driving part to be fixed, the driving coil having a flat part; and (ii) a magnet fixed to the other side of the focus driving part, wherein the magnet has a polarity which is divided so that a magnetic flux passes over the flat part of the driving coil;
a fixing part for supporting the focus actuator, the focus actuator further comprising a piezoelectric element installed between the compensation lens group and the fixing part or between the compensation lens group and the focusing driving part;
a photographing element for photographing an image of an object passing the compensation lens group; and
a controlling part for controlling the focus actuator and the photographing element, the controlling part configured to supply current to the driving coil to generate the magnetic flux.

8. The image photographing apparatus of claim 7, further comprising a yoke between the magnet and the focus driving part for increasing efficiency of the magnetic field generated by the magnet.

9. The image photographing apparatus of claim 7, further comprising a yoke between the magnet and the fixing part for increasing efficiency of the magnetic field generated by the magnet.

10. The image photographing apparatus of claim 7, the focus actuator further comprising an initial position fixing part for fixing the focus driving part to an initial position by a predetermined braking power.

11. The image photographing apparatus of claim 7, the focus actuator further comprising a specific magnification position fixing part for moving the focus driving part to a specific position so that the object image of the compensation lens group is projected with a specific magnification.

12. The image photographing apparatus of claim 7, the focus actuator further comprising a plurality of iron plate attached to a predetermined position between the magnet and the yoke, thereby directing the current respectively applied to the driving coil to the end direction.

13. The image photographing apparatus of claim 10, the initial position fixing part comprising a first magnetic substance fixed to the side, where the magnet of the focus driving part is fixed, not to be exposed to the range of the magnetic line of force on the side, where the magnet of the focus driving part is not fixed, and attracts the magnet in order to fix the focus driving part to the initial position.

14. The image photographing apparatus of claim 11, the specific magnification position comprising a second magnetic substance fixed to the side, where the magnet of the focus driving part is not fixed, not to be exposed to the range of the magnetic line of force, and attracts the magnet to fix the focus driving part to the initial position, in order to fix the focus driving part to a specific magnification position.

15. An image photographing apparatus comprising:
a compensation lens group;
a focusing driving part for fixing the compensation lens group;
a focus actuator transferring the focusing driving part along an optical axis for controlling the focus of the compensation lens group, the focus actuator comprising a restoration means for restoring the focus driving part to an initial position along the optical axis;
a fixing part for supporting the focus actuator;
a photographing element for photographing an image of an object passing the compensation lens group; and
a controlling part for controlling the focus actuator and the photographing element.

16. An image photographing apparatus comprising:
a compensation lens group;
a focus driving part for fixing the compensation lens group;
a focus actuator transferring the focusing driving part to an optical axis for controlling the focus of the compensation lens group the focus actuator comprising: (i) a driving part for receiving a power source from the controlling part to generate a dynamic force along the direction orthogonal to the optical axis; (ii) a cam part for receiving the dynamic force of the driving part to switch the dynamic force transferring the focus driving part in the direction of the optical axis; and (iii) a restoration means for restoring the driving part to an initial position;
a fixing part for supporting the focus actuator;
a photographing element for photographing an image of an object passing the compensation lens group; and
a controlling part for controlling the focus actuator and the photographing element.

17. The image photographing apparatus of claim 16, the driving part comprising:
a motor rotating by the power source supplied by the controlling part;
a spur gear combined with a center shaft of the motor to be rotated; and
a rotor forming a gear tooth combined with the spur gear and rotating by receiving the power source supplied by the controlling part.

18. The image photographing apparatus of claim 16, the driving part comprising:
a motor rotating by the power source supplied by the controlling part;
a lead screw combined with a rotation shaft of the motor; and
a screw holder combined with the lead screw to move along the direction orthogonal to the optical axis by rotation of the lead screw.

19. The image photographing apparatus of claim 16, the cam part comprising an inclined surface formed on the driving part for ascending the focus driving part in the direction of the optical axis, wherein the focus driving part forms a prominence contacting to the inclined surface.

20. An image photographing apparatus comprising:
a compensation lens group;
a focus driving part for fixing the compensation lens group;
a focus actuator transferring the focusing driving part to an optical axis for controlling the focus of the compensation lens group;
a fixing part for supporting the focus actuator, the focus actuator comprising a piezoelectric element installed between the compensation lens group and the fixing part or between the compensation lens group and the focus driving part;

a photographing element for photographing an image of an object passing the compensation lens group; and a controlling part for controlling the focus actuator and the photographing element, the controlling part configured to supply current to the focus actuator to drive the compensation lens group in the direction of the optical axis.

21. An image photographing apparatus comprising:
a compensation lens group;
a focus driving part for fixing the compensation lens group;
a focus actuator transferring the focusing driving part to an optical axis for controlling the focus of the compensation lens group;
a fixing part for supporting the focus actuator, the focus actuator comprising a suspension member supported between the fixing part and the focus driving part so that the focus driving part is controlled to be moved along the direction of the optical axis direction to limit the driving of the focus driving part in the direction excluding the driving direction, thereby guiding the focus driving part to be accurately driven along the direction of the optical axis;
a photographing element for photographing an image of an object passing the compensation lens group; and
a controlling part for controlling the focus actuator and the photographing element.

22. The image photographing apparatus of claim 21, the focus actuator comprising:
a magnet fixed to the fixing part or the focus driving part;
a driving coil fixed to the side of the fixing part or the focus driving part, where the magnet is not fixed, to be exposed to the magnetic field of the magnet, and, at the time of applying the current of the controlling part, wound to generate a force to drive the focus driving part in the direction of the optical axis by receiving the magnetic flux of the magnet; and
a magnetic substance fixed to the side where the driving coil is fixed, and moving the focus driving part by force attracted to the magnetic force of the magnet to fix the focus driving part to a predetermined position.

23. The image photographing apparatus of claim 21, the suspension member comprising a plate spring or a wire spring.

24. The image photographing apparatus of claim 23, the plate spring comprising:
an elastic transformed part transformed in the direction of the optical axis by narrowing the width between the fixing part and the focus driving part;
a plurality of first holes; and
first and second bosses inserted into a plurality of the first holes to fix the suspension member to the first zoom driving part and the focus driving part.

25. An image photographing apparatus comprising:
a compensation lens group;
a focusing driving part for fixing the compensation lens group;
a focus actuator transferring the focusing driving part in a direction of an optical axis for controlling the focus of the compensation lens group, the focus actuator comprising guide means for guiding the focus driving part to be driven in the direction of the optical axis;
a fixing part for supporting the focus actuator, the focus actuator further comprising a suspension member supported between the fixing part and the focus driving part so that the focus driving part is controlled to be moved along the direction of the optical axis to limit the driving of the focus driving part in the direction excluding the driving direction, thereby guiding the focus driving part to be accurately driven along the direction of the optical axis;
a photographing element for photographing an image of an object passing the compensation lens group; and
a controlling part for controlling the focus actuator and the photographing element.

26. The image photographing apparatus of claim 25, the guide means comprising:
a slide prominence formed on one side of the focus driving part in the direction of the optical axis; and
a slide groove formed on the side where the slide prominence of the focus driving part is not formed for guiding the slide prominence to be moved in the direction of the optical axis.

27. The image photographing apparatus of claim 25, the guide means comprising a guide shaft slidably combined to a guide hole formed on the focus driving means.

28. The image photographing apparatus of claim 25, the controlling part further comprising:
a controlling signal generating part for generating a low frequency amplitude modulation control signal for preventing a friction force for an initial predetermined driving time for supplying current to the driving coil, and for generating a high frequency amplitude modulation control signal after the initial predetermined driving time; and
a pulse width modulation signal outputting part for outputting the low frequency amplitude modulation control signal generated by the controlling signal generating part and a pulse width modulating signal outputting part having a lower frequency section and a high frequency section which switch on/off according to the high frequency amplitude modulation control signal to drive the driving coil of the focus actuator.

29. The image photographing apparatus of claim 25, the guide means further comprising three or more guide parts formed on the fixing part in the direction of the optical axis to guide the outer circumferential surface of the focus driving part in the direction of the optical axis.

30. The image photographing apparatus of claim 28, wherein the low frequency amplitude modulation controlling signal and the high low frequency amplitude modulation controlling signal have an identical duty ratio.

31. The image photographing apparatus of claim 30, a pulse width modulation signal outputting part comprising:
a transistor having an emitter connected to the ground, a base for receiving the low frequency amplitude modulation control signal and the high frequency amplitude modulation control signal generated by the controlling signal generating part, and a collector connected to a driving element; and
a resistor connected between the transistor and the base; and
a diode connected between the collector of the transistor and the power source.

32. An image photographing apparatus comprising:
a compensation lens group;
a focusing driving part for fixing the compensation lens group;
a focus actuator transferring the focusing driving part to an optical axis for controlling the focus of the compensation lens group, the focus actuator comprising:
(i) a compensation driving part installed between the compensation lens group and the focus driving part to drive the compensation lens group;
(ii) a compensating suspension member connected between the compensation driving part and the focus driving part to fix the compensation lens group to the focus driving part thereby become movable into the direction orthogonal to the optical axis of the compensation lens group;

(iii) a compensation actuator supported between the compensation driving part and the focus driving part to drive the compensation driving part in the direction orthogonal to the optical axis;

(iv) a displacement sensor installed on one side of the focus driving part for sensing the movement of the focus driving part in the direction orthogonal to the optical axis due to the hand trembling of the user; and (v) a servo controller driving the compensating actuator according to information of the displacement sensor to restore the focus driving part to the original state;

a fixing part for supporting the focus actuator;

a photographing element for photographing an image of an object passing the compensation lens group; and a controlling part for controlling the focus actuator and the photographing element.

33. The image photographing apparatus of claim 32, the compensating suspension member comprising a wire spring or a plate spring.

34. The image photographing apparatus of claim 32, the compensation actuator comprising one of a voice coil motor, a piezoelectric element and a ultrasonic motor.

35. An image photographing apparatus comprising:
a compensation lens group;
a focus actuator for controlling the focusing of the compensation lens group;
a first zoom driving part for supporting the focus actuator;
a displacement lens group;
a second zoom driving part for supporting the displacement lens group;
a zoom actuator for driving the first zoom driving part to move the compensation lens group along a first moving trajectory, which is a zoom transition path, and driving the second zoom driving part to move the displacement lens group along a second moving trajectory, which is a path of a zoom transition path, the zoom actuator comprising:

(i) an actuation source;

(ii) a first zoom driving member for driving the first zoom driving part to move a compensation lens group along a first moving trajectory, which is a zoom transition path;

(iii) a second zoom driving member for receiving a dynamic force from the actuation source and driving the second zoom driving part to move the displacement lens group along a second moving trajectory, which is a zoom transition path; and (iv) restoration means for restoring the first zoom driving part and the second zoom driving part to the original state;

a photographing element for photographing an image of an object passing the compensation lens group and the displacement lens group; and a controlling part for controlling the focus actuator, the zoom actuator and the photographing element.

36. The image photographing apparatus of claim 35, the actuation source comprising:
a rotation driving part for generating a rotary force by control of the controlling part; and
a rotor for receiving a dynamic force of the rotation driving part to be rotated.

37. The image photographing apparatus of claim 36, the first zoom driving member comprising:
a first inclined surface ascending the first zoom driving part by rotation of the rotor to move the compensation lens group along the first moving trajectory.

38. The image photographing apparatus of claim 35, the actuation source comprising:
a motor for receiving a power source from the controlling part to be rotated;
a spur gear combined with a center shaft of the motor to be rotated; and
a rotor forming a gear tooth combined with the spur gear.

39. The image photographing apparatus of claim 35, the actuation source comprising:
a motor for receiving a power source from the controlling part to be rotated;
a lead screw combined with the rotation shaft of the motor; and
a screw holder combined with the lead screw to move in the direction orthogonal to the optical axis by rotation of the lead screw.

40. The image photographing apparatus of claim 39, the first zoom driving member comprising a first inclined surface formed on the screw holder and ascending the first zoom driving part in the direction of the optical axis when the screw holder moves in the direction orthogonal to the optical axis in order to move the compensation lens group along the first moving trajectory.

41. The image photographing apparatus of claim 36, the second zoom driving member comprising a second inclined surface ascending the second zoom driving part by rotation of the rotor to move the displacement lens group along the second moving trajectory.

42. The image photographing apparatus of claim 39, the screw holder comprising a guide shaft for guiding the movement of the screw holder.

43. The image photographing apparatus of claim 40, the second zoom driving member comprising a second inclined surface formed on the screw holder and ascending the second zoom driving part in the direction of the optical axis when the screw holder moves in the direction orthogonal to the optical axis in order to move the second zoom lens group along the second moving trajectory.

44. An image photographing apparatus comprising:
a compensation lens group;
a focus actuator for controlling the focusing of the compensation lens group;
a first zoom driving part for supporting the focus actuator;
a displacement lens group;
a second zoom driving part for supporting the displacement lens group;
a zoom actuator for driving the first zoom driving part to move the compensation lens group along a first moving trajectory, which is a zoom transition path, and driving the second zoom driving part to move the displacement lens group along a second moving trajectory, which is a path of a zoom transition path, the zoom actuator comprising:

(i) a stator for receiving a power source from the controlling part and having coils to generate a magnetic field having first and second polarities, which are divided into a plurality of sections and which are alternated;

(ii) two ring-shaped magnets, which are integrally assembled and in which its polarity is divided into a first polarity and a second polarity, so as to be exposed to the magnetic field generated from the coils;

(iii) an assembly member for assembling the two ring-shaped magnets to have a 90 degree of phase;
(iv) an upper part of the rotator for receiving a rotation force when current is applied to the first coil;
(v) a lower part of the rotator for receiving a rotation force when current is applied to the second coil;
(vi) a rotator assembling member for integrally assembling the two rotators to have 90 degree of phase difference with each other;
(vii) a pair of a first rotator and a first stator for driving the compensation driving part;
(viii) a first lens barrel for fixing the compensation lens group; and
(ix) a first cam part for converting the rotation force of the first rotator to a feed force in the direction of an optical axis to and transferring it to the first lens barrel;
a photographing element for photographing an image of an object passing the compensation lens group and the displacement lens group; and
a controlling part for controlling the focus actuator, the zoom actuator and the photographing element.

45. The image photographing apparatus of claim 44, the stator comprising:
a magnetic substance formed by laminating two members, and having a plurality of upper cores, which respectively correspond to an identical first polarity divided from the two-ring shaped magnets;
a magnetic substance having a plurality of lower cores, which respectively correspond to an identical second polarity divided from at least one of the two-ring shaped magnets and which are respectively inserted into the upper cores; and
a first driving coil wound on an outer circumference of a combined substance of the upper core with the lower core.

46. The image photographing apparatus of claim 44, the second zoom actuator comprising:
a second stator for receiving the power source from the controlling part, and having a second coil for generating a magnetic field having first and second polarities which are divided into a plurality of sections and which are respectively alternated;
a second rotator having a second magnet in which first and second polarities are divided to be exposed to each divided magnetic field generated from the second coil, and performing a rotational motion at the time of applying current to the second coil;
a second lens barrel for fixing the compensation lens group; and
a second cam part for converting the rotational force of the first rotator to a feed force in the direction of the optical axis and transferring it to the second lens barrel.

47. The image photographing apparatus of claim 45, the first rotator comprising a first rotation barrel forming a first trajectory groove consistent with the first moving trajectory, and the first cam part comprising:
a first cam shaft fixed to the first lens barrel, and inserted into the first trajectory groove; and
a first guide barrel forming a first slot for guiding the first cam shaft such that it only moves in the direction of the optical axis.

48. The image photographing apparatus of claim 45, the second rotator comprising:
a third lens barrel for fixing the zoom lens group;
a second cam part for converting the rotation force of the second rotator to feed force in the direction of the optical axis to transfer it to the third lens barrel; and
a second rotation barrel fixed by at least one of the two-ring shaped magnets and forming a second trajectory groove consistent with the second moving trajectory.

49. The image photographing apparatus of claim 45, the first cam part comprising:
a first magnet;
a first cam barrel formed on a cross-section of the first rotation barrel and forming a first cam surface for moving the first lens barrel along the first moving trajectory;
a second cam barrel formed on a cross-section of the third rotation barrel and forming a second cam surface for moving the first lens barrel along the first moving trajectory; and
an elastic member generating a predetermined elasticity for pushing the first lens barrel to the cam barrel.

50. The image photographing apparatus of claim 46, the second stator comprising:
a third magnetic substance having a plurality of third cores respectively corresponding to the same first polarity divided from the second magnet;
a fourth magnetic substance having a plurality of fourth cores respectively corresponding to the same second polarity divided from the second magnet and respectively inserted into the third cores; and
the second coil wound around the outer circumference of the third cores and the fourth cores while the fourth cores are combined between each third core.

51. The image photographing apparatus of claim 46, the second rotator comprising:
a second magnet; and
a second rotation barrel forming a second trajectory groove consistent with the second moving trajectory,
said second cam part comprises:
a second cam shaft fixed to the fourth lens barrel and inserted into the second trajectory groove; and
a second guide barrel forming a second slot for guiding the second cam shaft such that it only moves in the direction of the optical axis.

52. The image photographing apparatus of claim 49, wherein the first cam surface is formed as a double row in symmetrical position, and at least two portions of the first lens barrel respectively contact the first cam surface.

53. An image photographing apparatus comprising:
a focus lens group;
a focus actuator for adjusting the focusing of the focusing lens group;
a fixing part for supporting the focus actuator;
a compensation lens group;
a first zoom driving part for supporting the compensation lens group;
a displacement lens group;
a second zoom driving part for supporting the displacement lens group;
a zoom actuator for driving the first zoom driving part to move the compensation lens group along a first moving trajectory, and for driving the second zoom driving part to move the displacement lens group along a second moving trajectory, the zoom actuator comprising:
(i) a first zoom driving member for driving the first zoom driving part to move a compensation lens group along the first moving trajectory;
(ii) a second zoom driving member for receiving a dynamic force from the actuation source and driving the second zoom driving part to move the displacement lens group along the second moving trajectory; and (iii) restoration means for restoring the first zoom driving part and the second zoom driving part to an original state;
a photographing element for photographing an object image passing the compensation lens group and the displacement lens group; and
a controlling part for controlling the focus actuator, the zoom actuator and the photographing element, the focus actuator comprising a piezoelectric element installed between the compensation lens group and the first zoom driving part, and receiving the current from the controlling part to drive the first zoom driving part in the direction of the optical axis.

54. An image photographing apparatus comprising:
a focus lens group;
a focus actuator for adjusting the focusing of the focusing lens group;
a fixing part for supporting the focus actuator;
a compensation lens group;
a first zoom driving part for supporting the compensation lens group, the first zoom driving part comprising: (i) a first lens barrel combined with the compensation lens group in its interior and forming a first male screw on its outer circumference; (ii) a second lens barrel combined with a focus actuator in its exterior and forming a first female screw, which is screw-combined with the first male screw on its inner circumference; and (iii) a tool groove installed on the first lens barrel to insert and rotate a tool;
a displacement lens group;
a second zoom driving part for supporting the displacement lens group, the second zoom driving part comprising: (i) a fourth lens barrel combined with the displacement lens group in its interior and forming a second male screw on its outer circumference; and (ii) a fourth lens barrel forming a second female screw, which is screw-combined with the second male screw on its inner circumference;
a zoom actuator for driving the first zoom driving part to move the compensation lens group along a first moving trajectory, and for driving the second zoom driving part to move the displacement lens group along a second moving trajectory;
a photographing element for photographing an object image passing the compensation lens group and the displacement lens group; and
a controlling part for controlling the focus actuator, the zoom actuator and the photographing element.

55. An image photographing apparatus comprising:
a focus lens group;
a focus actuator for adjusting the focusing of the focusing lens group;
a fixing part for supporting the focus actuator;
a compensation lens group;
a first zoom driving part for supporting the compensation lens group, the first zoom driving part comprising: (i) a first lens barrel combined with the compensation lens group in its interior and forming a first male screw on its outer circumference; and (ii) a second lens barrel forming a first female screw which is screw-combined with the first mail screw; and (iii) a tool groove installed on the first lens barrel to insert and rotate a tool;
a displacement lens group;
a second zoom driving part for supporting the displacement lens group;
a zoom actuator for driving the first zoom driving part to move the compensation lens group along a first moving trajectory, and for driving the second zoom driving part to move the displacement lens group along a second moving trajectory;
a photographing element for photographing an object image passing the compensation lens group and the displacement lens group; and
a controlling part for controlling the focus actuator, the zoom actuator and the photographing element.

56. An image photographing apparatus comprising:
a focus lens group;
a focus actuator for adjusting the focusing of the focusing lens group;
a fixing part for supporting the focus actuator;
a compensation lens group;
a first zoom driving part for supporting the compensation lens group;
a displacement lens group;
a second zoom driving part for supporting the displacement lens group;
a zoom actuator for driving the first zoom driving part to move the compensation lens group along a first moving trajectory, and for driving the second zoom driving part to move the displacement lens group along a second moving trajectory, the zoom actuator comprising:
  (i) an actuation source;
  (ii) a first zoom driving member for receiving a dynamic force from the actuation source and driving the first zoom driving part to move a compensation lens group along the first moving trajectory, which is a first zoom transition path;
  (iii) a second zoom driving member for receiving a dynamic force from the actuation source and driving the second zoom driving part to move the displacement lens group along the second moving trajectory, which is a second zoom transition path; and
  (iv) restoration means for restoring the first zoom driving member to an initial position thereof and for restoring the second zoom driving member to an initial position thereof;
a photographing element for photographing an object image passing the compensation lens group and the displacement lens group; and
a controlling part for controlling the focus actuator, the zoom actuator and the photographing element.

57. The image photographing apparatus of claim 56, the actuation source comprising:
a rotation driving part for generating a rotary force by control of the controlling part; and a rotor for receiving a dynamic force of the rotation driving part to be rotated.

58. The image photographing apparatus of claim 57, the first zoom driving member comprising a first inclined surface ascending the first zoom driving part by rotation of the rotor to move the compensation lens group along the second moving trajectory, and the second zoom driving member comprising a second inclined surface ascending the second zoom driving part by rotation of the rotor to move the displacement lens group along the second moving trajectory.

59. The image photographing apparatus of claim 57, the actuation source comprising:
a yoke;
a coil wounded on the yoke and receiving a power source from the controlling part for magnetizing the yoke; and
a rotor rotatably installed on the yoke, thereby facing the yoke, and consisting of a magnet rotating according to the direction to which the current applied to the coil.

60. The image photographing apparatus of claim 57, the actuation source comprising:
- a motor for receiving a power source from the controlling part to be rotated;
- a rotor forming a spur gear combined with the spur gear.

61. The image photographing apparatus as claimed in claim 57, the actuation source comprising:
- a motor for receiving a power source from the controlling part to be rotated;
- a lead screw combined with the rotation shaft of the motor; and
- a screw holder combined with the lead screw to move in the direction orthogonal to the optical axis by rotation of the lead screw.

62. The image photographing apparatus of claim 61, the first zoom driving member comprising a third inclined surface formed on the screw holder and ascending the first zoom driving part in the direction of the optical axis when the screw holder moves in the direction orthogonal to the optical axis in order to move the compensation lens group along the second moving trajectory, and the second zoom driving member comprising a fourth inclined surface formed on the screw holder and ascending the second zoom driving part in the direction of the optical axis when the screw holder moves in the direction orthogonal to the optical axis in order to move the displacement lens group along the second moving trajectory.

63. An image photographing apparatus comprising:
- a focus lens group;
- a focus actuator for adjusting the focusing of the focusing lens group;
- a fixing part for supporting the focus actuator;
- a compensation lens group;
- a third zoom driving part for supporting the compensation lens group;
- a displacement lens group;
- a second zoom driving part for supporting the displacement lens group;
- a zoom actuator for driving the third zoom driving part to move the compensation lens group along the first moving trajectory, and for driving the second zoom driving part to move the displacement lens group along the second moving trajectory;
- a photographing element for photographing an object image passing the compensation lens group and the displacement lens group;
- a controlling part for controlling the focus actuator, the zoom actuator and the photographing element; and
- first restoration means for restoring the first zoom driving part and the second zoom driving part to the original state.

64. An image photographing apparatus comprising:
- a compensation lens group;
- a focusing driving part for fixing the compensation lens group;
- a focus actuator transferring the focusing driving part along an optical axis for controlling the focus of the compensation lens group;
- a fixing part for supporting the focus actuator;
- a photographing element for photographing an image of an object passing the compensation lens group;
- restoration means for restoring the focus driving part to an initial position thereof;
- a controlling part for controlling the focus actuator and the photographing element; and
- a brake device fixed to the focus driving part for controlling the driving of the focus driving part.

65. The image photographing apparatus of claim 64, the brake device comprising:
- a rotation shaft installed on the focus driving part;
- a brake driving part rotatably installed on the rotation shaft;
- a spring for pushing the brake driving part in a direction;
- a permanent magnet installed on a predetermined position of the brake driving part; and
- a driving coil installed adjacent to the brake driving part in a predetermined position of the first zoom driving part.

66. The image photographing apparatus of claim 65, wherein:
- when the current is not applied to the driving coil, the brake driving part contacts the focus driving part, thereby fixing the focus driving part to the brake driving part by friction force; and
- when the current is applied to the driving coil, the brake driving part is attracted to the driving coil by cooperation of the magnetic force generated by the driving coil with the permanent magnet installed on the brake driving part so that the contact of the brake driving part to the focus driving part is cut, thereby freely moving the focus driving part.

67. An image photographing apparatus comprising:
- a compensation lens group;
- a focus actuator for controlling the focusing of the compensation lens group;
- a fixing part for supporting the focus actuator;
- a first zoom driving part for supporting the focus actuator, the focus actuator comprising a piezoelectric element installed between the compensation lens group and the fixing part or between the compensation lens group and the first zoom driving part;
- a displacement lens group;
- a second zoom driving part for supporting the displacement lens group;
- a zoom actuator for driving the first zoom driving part to move the compensation lens group along a first moving trajectory, which is a first zoom transition path, and driving the second zoom driving part to move the displacement lens group along a second moving trajectory, which is a second zoom transition path;
- a photographing element for photographing an image of an object passing the compensation lens group and the displacement lens group;
- a controlling part for controlling the focus actuator, the zoom actuator and the photographing element; and
- a brake device fixed to the first zoom driving part or the second zoom driving part to control the driving of the first zoom driving part or the second zoom driving part.

68. The image photographing apparatus of claim 67, the brake device comprising:
- a rotation shaft installed on the second zoom driving part or the third driving part;
- a brake driving part rotatably installed on the rotation shaft;
- a spring for pushing the brake driving part in a direction;
- a permanent magnet installed on a predetermined position of the brake driving part; and
- a driving coil installed adjacent to the brake driving part in a predetermined position of the second zoom driving part or the third zoom driving part.

69. The image photographing apparatus of claim 68, wherein:
- when the current is not applied to the driving coil, the brake driving part contacts the second zoom driving part or the third zoom driving part, thereby fixing the second zoom driving part or the third zoom driving part to the brake driving part by friction force; and when the current is applied to the driving coil, the brake driving part is attracted to the driving coil by cooperation of the magnetic force generated by the driving coil with the permanent magnet installed on the brake driving part so that the contact of the brake driving part to the second zoom driving part or the third zoom driving part is cut, thereby freely moving the second zoom driving part or the third zoom driving part.

70. An image photographing apparatus comprising:
a compensation lens group;
a focusing driving part for fixing the compensation lens group;
a focus actuator transferring the focusing driving part to an optical axis for controlling the focus of the compensation lens group;
a fixing part for supporting the focus actuator, the focus actuator comprising a piezoelectric element installed between the compensation lens group and the fixing part or between the compensation lens group and the focusing driving part;
a photographing element for photographing an image of an object passing the compensation lens group;
a controlling part for controlling the focus actuator and the photographing element; and
a shutter device installed between the compensation lens group and the focus driving part, or installed between the compensation lens group and the fixing part, thereby controlling the light quantity.

71. The image photographing apparatus of claim 70, the shutter device comprising:
a base fixed to the first zoom driving part and having a light through-hole passing light through the compensation lens group;
a shutter part axially supported by the base; and
a piezo ceramic driving part for driving the shutter part by receiving a power source.

72. The image photographing apparatus of claim 70, the shutter device comprising:
a shutter plate forming a rotation hole which is rotatably combined with a hinge shaft formed on the base, and which opens and closes the light through-hole by rotational motion.

73. The image photographing apparatus of claim 71, wherein the controlling part functions as an iris and is configured to close narrow limits of the light through-hole by applying a small amount of the power source to the piezo ceramic driving part to drive the shutter part within narrow limits, and the controlling part functions as a shutter which closes the hole light through-hole by applying a large amount of the power source to the piezo ceramic driving part to drive a large range of the shutter part.

74. The image photographing apparatus of claim 72, the shutter plate is characterized in being installed on the opposite position based on the light through-hole to simultaneously open and close the light through-hole at both sides by the operation of the piezo ceramic driving part.

75. The image photographing apparatus of claim 74, wherein each shutter plate is axially supported in the base and forms a cam hole combined with a driving shaft of the piezo ceramic driving part, so that when the driving shaft performs a straight line motion, each said shutter plate performs a rotational motion to open and close the light through-hole.

* * * * *